United States Patent

[11] 3,536,194

[72] Inventor Warren D. Novak
Chappaqua, New York

[21] Appl. No. 618,698
[22] Filed Feb. 27, 1967
[45] Patented Oct. 27, 1970
[73] Assignee The Mosler Safe Company
Hamilton, Ohio
a corporation of New York

[54] DOCUMENT RETRIEVAL AND HANDLING SYSTEM
20 Claims, 51 Drawing Figs.

[52] U.S. Cl. .... 209/80.5, 212/27, 212/77
[51] Int. Cl. .... B07c 5/36
[50] Field of Search .... 209/110, 80.5, 110.5; 74/222; 312/223, 319; 340/174.1(C); 212/27, 77

[56] References Cited

UNITED STATES PATENTS

| | | | |
|---|---|---|---|
| 2,386,520 | 10/1945 | Watson et al. | 312/223 |
| 2,707,666 | 5/1955 | Becker | 312/319 |
| 2,779,652 | 1/1957 | Orr | 312/319 |
| 3,199,674 | 8/1965 | Kalthoff et al. | 209/80.5 |
| 3,225,770 | 12/1965 | Lasley et al. | 312/223 |
| 3,243,780 | 3/1966 | Bendick et al. | 340/174.1 |
| 3,297,379 | 1/1967 | Artaud | 312/223 |

*Primary Examiner*—Allen N. Knowles
*Attorney*—Wood, Herron & Evans

ABSTRACT: A retrieval system is disclosed having a pair of spaced parallel storage racks, each having 1000 numbered and addressable storage compartments arranged in a fifty column by twenty row matrix configuration. Normally positioned in each of the numbered storage compartments is a cartridge holding up to 100 randomly arranged cards, each of which is code notched along its lower edge to permit digital addressing for selecting a card from a deck of cards stored in the cartridge. A cartridge receiving station for retrieving cards from a cartridge, selectively or in bulk, is positioned behind one of the racks beneath a delivery port formed therein. A cartridge transporting device for transporting cartridges between their respective storage compartments and the cartridge receiving station is also provided. The cartridge transporting device includes a carriage, which travels between the racks, for transporting cartridges between their storage compartments and the delivery port. Further included is a card and/or cartridge address entry device to permit an operator to initiate delivery of a cartridge to the cartridge receiving station where one or more of the cards may be retrieved.

INVENTOR
Warren D. Novak
BY
Wood, Herron and Evans
ATTORNEYS

INVENTOR.
Warren D. Novak
BY
Wood, Herron and Evans
ATTORNEYS

INVENTOR
Warren D. Novak
BY
Wood, Herron & Evans
ATTORNEYS

INVENTOR
Warren D. Novak
BY
Wood, Herron and Evans
ATTORNEYS

Patented Oct. 27, 1970 3,536,194

INVENTOR
Warren D. Novak
BY
Wood, Herron and Evans
ATTORNEYS

INVENTOR
Warren D. Novak
BY
Wood, Herron and Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR
Warren D. Novak
BY
Wood, Herron and Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR
Warren D. Novak
BY
Wood, Herron and Evans
ATTORNEYS

INVENTOR
Warren D. Novak
BY
Wood, Herron and Evans
ATTORNEYS

INVENTOR
Warren D. Novak
BY
Wood, Herron and Evans
ATTORNEYS

INVENTOR
Warren D. Novak
BY
Wood, Herron and Evans
ATTORNEYS

INVENTOR.
Warren D. Novak
BY Wood, Herron and Evans
ATTORNEYS

INVENTOR
Warren D. Novak
BY
Wood, Herron and Evans
ATTORNEYS

INVENTOR
Warren D. Novak
BY
Wood, Herron and Evans
ATTORNEYS

INVENTOR.
Warren D. Novak
BY
Wood, Herron and Evans
ATTORNEYS

INVENTOR
Warren D. Novak
BY
Wood, Herron & Evans
ATTORNEYS

INVENTOR.
Warren D. Novak
BY
Wood, Herron and Evans
ATTORNEYS

INVENTOR.
Warren D. Novak
BY
Wood, Herron and Evans
ATTORNEYS

INVENTOR
Warren D. Novak
BY
Wood, Herron and Evans
ATTORNEYS

Patented Oct. 27, 1970

3,536,194

INVENTOR.
Warren D. Novak
BY
Wood, Herron and Evans
ATTORNEYS

INVENTOR.
Warren D. Novak
BY
Wood, Herron and Evans
ATTORNEYS

DOCUMENT RETRIEVAL AND HANDLING SYSTEM

DESCRIPTION OF THE INVENTION

This invention relates to document retrieval and handling systems and, more specifically, to document retrieval and handling systems in which documents are randomly stored in containers located at addressable stations and from which documents are automatically retrievable and returnable either selectively or in bulk.

Due to the widespread practice of storing information on cards, as, for example, aperture cards, tabulating cards, microfiches and the like, the principles of this invention are described with respect to a retrieval and handling system designed for use with cards. Of course, it is to be understood that although this invention possesses a high degree of utility in systems in which the storage medium takes the form of a card, the principles of this invention are also applicable to systems in which the documents are of a nature other than cards. For example, it is contemplated that the principles of this invention may be used in systems in which the documents take the form of ledger sheets, engineering drawings, legal documents, photographs, maps, and the like.

The desirability of mechanizing card storage and retrieval has been appreciated for many years. Mechanization permits cards to be obtained from storage more quickly than is ordinarily possible using conventional manual retrieval techniques. In addition, with mechanization, the clerical worker is removed from the card retrieval process, eliminating much of the human error normally attendant nonmechanized systems. Consequently, the reliability and accuracy of the retrieval operation is increased, while the probability that documents, when returned to the file, are misfiled, preventing their future retrieval, is decreased. Finally, mechanization of the card system, by eliminating the need for the filing clerk, produces long range cost savings, as well as a reduction in personnel problems caused by job dissatisfaction typically associated with routine work such as filing.

While the advantages of mechanized card retrieval are both numerous and well recognized, to date widespread mechanization has not always been a practical solution to the retrieval problem, particularly for the smaller user. The reasons for this are many. One principal reason is that many of the mechanized card retrieval systems presently or formerly available are overly complex, raising the cost of card storage and retrieval to a point where the switch from nonmechanized retrieval to mechanized retrieval is not economically justifiable.

It has been a primary objective of this invention to provide a card retrieval system which is markedly simpler than prior art systems in structure as well as operation. This objective has been accomplished in accordance with the principles of this invention by providing a unique card storage system having a pair of spaced parallel storage racks, each having a plurality of individually numbered and addressable storage compartments. Normally positioned in each of the numbered storage compartments is a container or cartridge holding a plurality of randomly arranged cards. The cards are coded to permit, in one mode of operation, digital addressing for selection of a card from a deck of cards stored in a cartridge.

Also included are direct and bulk access stations for selective and bulk retrieval of cards from a cartridge. The direct and bulk access stations are positioned behind the racks beneath direct and bulk delivery or access ports which, in practice, are empty storage compartments. Associated with the storage compartments and access ports is a carriage assembly which travels in the space between the racks for transferring cartridges between the access ports and the numbered storage compartments. Also provided are conveying assemblies which connect the direct and bulk access ports with the direct and bulk access stations for transferring cartridges between the ports and stations. The system further includes a card and/or cartridge address entry device to permit an operator to initiate delivery of a cartridge to the bulk access station where its entire contents are accessible to the operator, or delivery of a cartridge to the direct access station from which one or more individual cards may be selected for viewing, card-to-card or card-to-roll film duplication, removal, or the like.

In a preferred form of this invention, the racks are arranged in a matrix configuration having 50 vertical columns and 20 horizontal rows of storage compartments which are consecutively numbered from 000 to 999, yielding a total of 2,000 addressable storage compartments. Each of the cartridges is adapted to hold 100 edge notched cards bearing information in the form of microfilm inserts. With this arrangement, each card is identified by a six digit address. The first digit identifies the particular rack in which the cartridge having the desired card is located. The second, third and fourth digits identify the storage compartment of the rack in which the cartridge having the desired card is located, while the last two digits identify the particular card within a designated cartridge.

In response to the entry into the system of a six digit address identifying a particular one of the 200,000 stored cards, the carriage advances to a position opposite the storage compartment containing the card, extracts the cartridge and transfers it to the carriage, and then advances to the direct access port. Once in this position, the cartridge is inserted through the direct access port and conveyed by the conveyor assembly to the direct access station. At the direct access station the desired card is selected and conveyed to an associated viewing device, which causes a visual reproduction of the microfilmed information to be presented on a television screen. When the viewing operation is completed, the card is conveyed to the cartridge and the cartridge transported through the direct access port. It is then transferred to the carriage and the carriage returned to the appropriate storage compartment where the cartridge is reinserted for storage, completing the retrieval operation.

In response to the entry into the system of a four digit address identifying a particular cartridge, the carriage advances to a position opposite the selected cartridge, extracts the cartridge and transfers it to the carriage which thereafter transports it to a position opposite the bulk access port. At the bulk access port, the cartridge is removed from the carriage and inserted through the bulk access port. It is then conveyed to the bulk access station where its entire contents are accessible to the operator. Return of a cartridge from the bulk access station to its respective storage compartment is accomplished in the same manner as the return of a cartridge from the direct access station.

The system of this invention has a number of very practical advantages. For example, the system is extremely compact in that it requires only 20 square feet of floor space to store 200,000 aperture cards. Besides being compact, the system is open-ended in the sense that by increasing the number of basic storage file units or modules, the system capacity can be increased, thereby preventing the user from outgrowing the system and the system from becoming obsolete.

With this invention, the system output, that is, the number of cards retrieved per unit time, is easily increased. This is accomplished by merely adding delivery ports and access stations, the addition of extra carriages not being necessary. For example, by merely adding an additional delivery port and direct access station, it is possible, in an application where the average time spent by an operator in reviewing a retrieved card is roughly equal to the combined retrieval and return time, to approximately double the number of cards retrieved per hour.

The system of this invention has an inherent cost saving feature in that one carriage services two racks of storage compartments. The system also has an inherent time saving feature, which functions to decrease the average retrieval cycle time. Specifically, since the delivery ports may be located in a central portion of the racks the distance between the storage compartments and the delivery ports, on an average, is lower than systems in which the cartridges, once retrieved, are transported for processing to positions remote from the storage racks. Finally, the system of this invention has inherent error reducing properties. Specifically, since the cards are randomly stored in the cartridges, cards cannot be misfiled by returning them to the wrong place within a given cartridge. Hence, information is not lost.

Another advantage is that preexisting card systems are easily adapted for use with the system of this invention by merely providing the card edges with the notched card addresses. Hence, there is no need to transfer existing stored data to new cards. In fact, in most preexisting systems the cards do not contain information along their bottom edges, therefore, card notching for the purpose of adapting the cards for use with the system of this invention does not even result in a loss of information.

A further advantage of the invention is that the system can be made secure and the integrity of the file increased by merely encasing the storage racks in a housing or enclosure thereby preventing unauthorized access to the stored cards. Such protection is accomplished without interfering with carriage motion or card selection.

Another common problem with the card retrieval systems of the prior art is that they frequently require rather elaborate and expensive schemes for properly registering and aligning the cartridges in their respective storage compartments upon return thereto by the carriage. Such alignment and registration is necessary in order that the carriage can properly engage the cartridge to permit subsequent extractions. In a high capacity system, the cost of the system can be greatly increased if each and every storage compartment and cartridge requires some intricate aligning mechanism for properly registering the cartridges in their respective storage compartments. Such increased expense is obviously to be avoided.

It has been a further and equally important object of this invention to provide a card retrieval system in which the cartridges are easily inserted into their respective storage compartments and properly registered for subsequent retrieval by the carriage. This objective has been accomplished by the very simple, but yet effective combination of a detent lug positioned on the bottom of the cartridge, a locating slot formed in the bottom of the storage compartment in which the detent lug seats, and a cartridge stop located in the upper rear portion of the storage compartment which abuts the cartridge as it is inserted into its storage compartment. In operation, when a cartridge is inserted into the storage compartment and its upper rear corner strikes the cartridge abutment, a reaction force is exerted on the upper rear corner of the cartridge which creates a moment tending to drive the front of the cartridge downwardly. This forces the detent lug into the locating slot, thereby registering the cartridge in its storage compartment.

A very important practical advantage of this registering arrangement is that cartridges do not bounce back, failing to properly seat, when inserted into their storage compartments, and thereby project into the carriage space. Thus, the likelihood of a collision between a moving carriage and a projecting cartridge, resulting in damage to either or both the cartridge and/or the carriage, is eliminated. A further advantage of this arrangement, in addition to the fact that it enables the cartridge, upon reinsertion, to properly register in its storage compartment, is that the various elements of the registering arrangement can be provided with a minimum of expense. For example, if, as is preferred, the cartridges are manufactured of molded plastic, the lug may be formed during the molding process with negligible additional expense. Likewise, if, as preferred, the storage compartments are fabricated of interlocking vertical and horizontal separators, the locating slot may be formed during the fabrication process with negligible additional expense. Finally, the cartridge abutments or stops may take the form of horizontal rods, molded tubes, or the like extending between the walls of the storage compartments and, hence, be provided inexpensively.

It has been a further objective of this invention to provide a retrieval system which permits an operator, in time of emergency such as main power failure, to quickly and easily obtain access to any cartridge stored in the machine without use of special tools. This objective has been accomplished in this invention by providing cartridge stops which can, from the rear of a storage rack, be readily removed from their normal position in a pocket, thereby permitting an operator to remove the cartridge from storage. In a preferred embodiment of this invention, the cartridge stop takes the form of a pair of shouldered plugs and a flexible sleeve. The plugs at one end each engage different side walls of a pocket and at their other end each are inserted into opposite ends of the sleeve. The central flexible sleeve of this cartridge stop permits the stop, when properly positioned in a cartridge, to be flexed in the middle by the index finger of an operator. This renders the opposite stop ends readily disengageable from their respective pocket walls and the stop easily removed from the pocket, allowing the cartridge to be withdrawn from storage through the back of the pocket.

It has been another objective of this invention to provide a cartridge extractor and inserter which is simple in structure, yet reliable in operation. This objective has been accomplished in this invention by utilizing a fundamentally different concept of cartridge manipulation involving the use of a tang and pusher wheel mounted on opposite points of an endless drive chain. The chain is trained over two sprockets disposed adjacent different ones of the racks of storage compartments. In operation, the tang engages a recess extension formed on the lower front portion of the cartridge and either transfers engaged cartridges onto or off of the chain, depending on the direction of chain motion. The relationship of the tang to the cartridge recess is such that it is oriented at a 45° angle upon engagement with the cartridge for imparting both lifting and withdrawing motion, thereby enabling the cartridge detent lug to disengage the locating slot and the cartridge to be extracted in one continuous motion. The pusher wheel, following preliminary cartridge insertion and positioning by the tang, operates to guarantee that the cartridge properly locates in its storage compartment to effect complete seating of the cartridge lug in its associated locating slot.

It has been found that this simple arrangement of a chain mounted tang and pusher wheel provides a cartridge extraction and insertion system which is substantially 100 percent error free in operation.

Another serious disadvantage of existing retrieval systems is that the various moving parts which actually perform the retrieving function are large and bulky, involving high mass and inertia, and consequently have inherently slow response characteristics. Thus, the retrieval cycle time is unduly high.

It has been an additional objective of this invention to provide a carriage assembly which is extremely lightweight and compact and, hence, capable of achieving greater accelerations and decelerations and, therefore, faster speeds and cycle times. This objective has been accomplished in accordance with further principles of this invention by utilizing a unique cable arrangement for driving the X, Y and Z carriage components in their mutually perpendicular directions which permits the X, Y and Z motors to be stationarily mounted and, hence, the carriage not burdened with the additional mass of three motors.

The X direction carriage component consists of a pair of parallel, closely spaced vertical guide rods. These are relatively fixed and have wheels at their upper and lower ends which engage upper and lower horizontal tracks for guiding the movement of the rods in the X direction. An effectively endless drive cable is provided to transmit motion to the X carriage component. This X drive cable is trained over suitably disposed fixed pulleys for movement across the top of the rack, down one side, and across the bottom, and then back upon itself in the form of a closed loop. The X carriage component connects at its upper and lower ends to similarly directed reaches of the upper and lower cables, respectively, and is driven in the ± X direction by a stationary bidirectional motor having a drum over which the cable is wrapped.

The Y direction carriage component includes a pair of vertical, spaced parallel side plates mounted between the vertical guide rods forming the X carriage component. A cable for imparting positioning motion to the Y carriage component is provided having its opposite ends fixed at upper and lower corners of one side of the racks. Starting from the upper and lower fixed ends, the Y cable has horizontal reaches extending, respectively, over to the upper and lower ends of the X carriage guide rods and then to the Y carriage component where they train over pulleys secured thereto. From the Y carriage component the reaches are directed back upon themselves to the upper and lower ends of the X guide rods where they train over pulleys fixed thereto, continuing in a horizontal direction to upper and lower rack corners opposite the corners to which the cable ends are fixed. At these corners, the cable reaches train over fixed pulleys and join, forming a common vertical reach which is wrapped around a drive drum for imparting motion to the drive cable to thereby position the Y carriage component.

The Z cable, which drives the tang and wheel via the endless chain, includes a horizontal reach which runs along the bottom of the racks and trains over fixed pulleys located at opposite sides thereof. This horizontal reach at one end is wrapped around a drive drum and then directed back upon itself in a horizontal direction to the bottom of the X guide rods as is the other end of the horizontal reach. At the bottom of the X guide rods the reaches train over pulleys fixed thereto whereupon they are directed vertically, joining at a point where they train over suitably disposed pulleys fixed to the upper ends of the X guide rods. One of the vertical reaches is drivingly connected to a sprocket over which the endless chain is trained for imparting motion to the tang and pusher wheel.

In addition to providing a carriage assembly having stationary motors and, hence, reduced mass and inertia, allowing faster speeds and cycle times, the above cable drive arrangement has a further and very important advantage. Specifically, by permitting the Z drive drum to be disengaged by use of an electrically operated clutch during periods of X and Y carriage motion, the X, Y and Z cable drives become independent, enabling selective and independent operation of the X, Y and Z carriage components.

A further and very important advantage of the cable arrangement of this invention, particularly of the Z drive cable, is that functions other than tang and pusher wheel movement can be independently accomplished on the carriage by merely duplicating the Z cable. For example, if it were desired to equip the carriage with a positive acting cartridge lock in the form of a clamp which mechanically grips the cartridge, a second Z cable could be provided to actuate the clamp when desired to lock and unlock the cartridge. As a further example, by making the Z carriage component rotatable through 180° about a vertical axis, it is possible to make the Z carriage component single-acting in the cartridge withdrawal movement, rather than double-acting as in the present embodiment. This Z carriage rotating function can be performed by a third independent cable drive which properly orients the Z carriage component with respect to the wall from which a cartridge is to be inserted or removed.

These and other objectives and advantages of the invention will become more readily apparent from the following detailed description of the drawings in which:

FIG. 1 is a perspective view of the card retrieving and handling system of this invention, showing in particular the console and card storage units, FIG. 2 is a diagrammatic illustration of the keyboard used for entering card and/or cartridge addresses, initiating the various system control functions, and displaying the system status, FIG. 3 is a perspective view partially broken away of the card storage unit showing the carriage, the front and rear storage walls, and the direct and bulk access ports and conveyors, FIG. 4 is a front elevational view of the rear storage wall showing the direct and bulk access ports, the carriage assembly, and the digital storage compartment numbering scheme, FIG. 5 is a diagrammatic illustration of an aperture card showing the microfilm insert, the sorting rod receiving apertures, and the code notches, FIG. 6 is a diagrammatic illustration of the Y and Z carriage components showing the tang and recessed cartridge extension at a point in the retrieval cycle immediately following the initiation of cartridge extraction, FIG. 7 is a diagrammatic illustration of the Y and Z carriage components showing the tang and cartridge after the cartridge has been transferred from its storage compartment to the carriage, FIG. 8 is a diagrammatic illustration of the direct access port and the Y and Z carriage components showing the tang and the recessed cartridge extension prior to transfer of the cartridge from the direct access port to the carriage, FIG. 9 is a diagrammatic illustration showing the Y and Z carriage components, and the direct access port, conveyor assembly and station after a cartridge has been positioned in the cartridge holder and the conveyor assembly dropped to its lower position, FIG. 10 is a diagrammatic illustration of the direct access port and conveyor assembly showing the conveyor aligned with the bottom of the direct access port in the course of transporting a cartridge from the direct access station to the direct access port for subsequent transfer to the carriage, FIG. 11 is a diagrammatic illustration of the Y and Z carriage components showing the pusher wheel tapping a cartridge into its storage compartment, FIG. 12 is a perspective view of a cartridge showing the tang-engaging recesses, the detent lug, the opening in the cartridge bottom, the sorting rod receiving apertures, the spider finger receiving apertures, and the compression finger receiving notches, FIG. 13 is a perspective view partially broken away showing one form of storage compartment, including the locating slot and the cartridge stop, FIG. 14 is a diagrammatic illustration of the X, Y and Z drive cable arrangement, including the drive drums and motors, FIG. 15 is a front elevational view partially broken away of the X, Y and Z carriage components, FIG. 16 is a cross-sectional view taken along line 16–16 of FIG. 15, FIG. 17 is a cross-sectional view taken along line 17–17 of FIG. 15, FIG. 18 is a cross-sectional view taken along line 18–18 of FIG. 15, FIG. 19 is a cross-sectional view taken along line 19–19 of FIG. 15, FIG. 20 is a cross-sectional view taken along line 20–20 of FIG. 18, FIG. 21 is an enlarged side elevational view of the pusher wheel assembly which forms part of the Z carriage component, FIG. 22 is a diagrammatic illustration showing in detail the tang and recessed cartridge extension at a point in the cartridge extraction cycle immediately following the engagement of the tang and recessed extension, FIG. 23 is a diagrammatic illustration of the tang and recessed cartridge extension at a point in the cartridge insertion cycle immediately following the disengagement of the tang and recessed extension, FIG. 24 is a diagrammatic illustration of the cartridge, the recessed cartridge extension and the pusher wheel assembly at a point in the cartridge insertion cycle just prior to disenagagement of the pusher assembly and the recessed cartridge extension, FIG. 25 is a plan view of the direct access conveyor assembly, FIG. 26 is a cross-sectional view taken along line 26–26 of FIG. 25, FIG. 27 is a cross-sectional view taken along line 27–27 of FIG. 26, FIG. 28 is a side elevational view of the direct access conveyor assembly showing its relationship in its lowermost position to the bottoms of the cartridge holder and direct access port, FIG. 29 is a vertical cross-sectional view taken through an access port gate assembly showing the cartridge gate in its lowermost, port-blocking position prior to being struck by a cartridge, FIG. 30 is a vertical cross-sectional view taken through an access gate assembly showing the cartridge gate in its lowermost position immediately after having been struck by the upper corner of a cartridge, FIG. 31 is a vertical cross-sectional view showing the relationship of certain of the components of the bulk and direct access stations, FIG. 32 is a vertical cross-sectional view taken through the direct access station showing the platen and blower assemblies, the cartridge holder, the spider, the sorting bars, and the various positioning and timing cams, FIG. 33 is a diagrammatic illustration showing the relative positions of the blower nozzle, the cards and cartridge, sorting rods, and lower drive and pressure rolls after the timing cam has been driven to cam position 2, FIG. 34 is a diagrammatic illustration of the relative positions of the blower nozzle, the cards and cartridge holder, sorting rods, and lower drive and pressure rolls after the timing cam has been driven to position 3 following the selection operation, FIG. 35 is a diagrammatic illustration showing the relative positions of the blower nozzle, the cards and cartridge holder, sorting rods and lower drive and pressure rolls following the card compression phase of the retrieval cycle, FIG. 36 is a diagrammatic illustration of the cards and cartridge holder, blower nozzle, sorting rods and lower drive and pressure rolls when the driving cam has been driven to position 1, FIG. 37 is an enlarged cross-sectional view of a portion of the sorting rod and its associated detent depicted in FIG. 32, FIG. 38 is a cross-sectional view taken along line 38–38 of FIG. 32, FIG. 39 is a cross-sectional view taken along line 39–39 of FIG. 32, FIGS. 40A, 40B and 40C are, respectively, plots of the displacement of the cartridge holder and its associated support, the interposer-bearing plate, and the blower nozzle versus angular rotation of their associated cam drive assemblies, FIGS. 41, 42 and 43 are schematic circuit diagrams of the direct and bulk access stations control circuit, FIGS. 44 and 45 are schematic circuit diagrams of the keyboard digit memory and sequencer, FIG. 46 is a schematic circuit diagram of the Z servo control circuit, FIG. 47 is a schematic circuit diagram of the X servo control circuit, FIG. 48 is a schematic circuit diagram of the Y servo control circuit, FIG. 49 is a schematic circuit diagram of the Z programmer circuit, FIG. 50 is a perspective view of a portion of the cartridge showing in detail the detent lug and the recessed front extension, and FIG. 51 is a diagrammatic illustration of a pressure plate positionable in the cartridge between the deck of cards and the cartridge wall through which the spider fingers pass.

FIG. 52 is a cross-sectional view of a preferred construction of a cartridge stop, showing its relation to the storage compartment side walls.

GENERAL DESCRIPTION

One preferred form of an information retrieval system embodying the concepts of this invention, as shown more particularly in FIG. 1, includes a storage unit 10 and a console unit or utilization device 11. The storage unit 10, more specifically, includes a pair of vertically disposed, spaced parallel racks or arrays 12 and 13 housed in an enclosure 9. Each of the arrays or racks 12 and 13, herein termed the front and rear storage walls, respectively, has 1,000 individually numbered and addressable storage compartments or pockets 15 (FIG. 13) arranged in a matrix configuration having 50 vertical columns and 20 horizontal rows. Normally positioned in each of the storage compartments 15 is a molded plastic magazine or cartridge 16 shown particularly in FIG. 12, containing 100 randomly stored cards 50. The cards 50, one of which is shown in FIG. 5, have notches 52 in their lower edges 19 to permit, in one mode of operation, digital addressing of the cards within a particular cartridge 16.

A servo-operated cartridge selector or carriage assembly 18 is provided which travels in a carriage space 17 between the front and rear storage walls 12 and 13. As used herein, the fronts of the storage walls 12 and 13 are the surfaces facing the carriage space 17. The carriage 18, in response to digital addresses entered into a keyboard 23 of the console unit 11, is selectively positionable opposite the compartment 15 for retrieving selected ones of the cartridges 16 normally positioned in the numbered storage compartments, transporting them from the storage unit 10 to the console unit 11 for processing, and thereafter returning them to their respective storage compartments.

The console unit 11 includes a card selector or direct access station 22 for selecting the edge-coded cards from a cartridge in response to addresses entered into the keyboard 23. The direct access station 22 is positioned behind the front storage wall 12 beneath a direct access port or delivery station 54 (see FIG. 3). The delivery station 54 is an empty storage compartment into which retrieved cartridges are disposed by the carriage 18 and subsequently transferred to the direct access station 22 by a conveying assembly 21 (see FIG. 26). Cooperating with the card selector 22 is a platen viewing device 24 which, in response to the insertion therein of a card selected by the selector 22 from the retrieved cartridge conveyed thereto, projects on a television screen 25 an image of information, such as a microfilm insert 20, stored on the selected card 50 (see FIG. 5). Positioned above the viewing device 24 is a platen gate 26 which permits cards selected from a retrieved cartridge to be manually removed for data modification or the like, as well as which permits new or modified cards to be infiled to the retrieved cartridge.

Adjacent the direct access station 22 is located a bulk access station 28. This access station is also located adjacent an empty storage compartment or delivery station 53, herein termed the bulk access port (see FIG. 3). The servo-operated carriage assembly 18 serves the bulk access station 28 for retrieving and transporting, in response to addresses entered into the keyboard 23, selected cartridges 16 for delivery to the bulk access station. Included in the bulk access station 28 is a vertically reciprocable ram 29 (see FIG. 31) for elevating the complete deck of cards 50 of a retrieved cartridge 16 sufficiently to cause their upper edges 27 (see FIG. 5) to pass through and above a bulk transfer slot 30 for manual removal of one or more of the cards.

In general, the keyboard 23 is constructed to permit an operator to selectively deliver a cartridge 16 to the direct access station 22 from which one or more individual cards 50 of the retrieved cartridge may be selected successively for viewing or delivery to the platen gate 26 for manual removal, or to convey a cartridge to the bulk access station 28 where the entire cartridge and its card contents are accessible to the console operator via the slot 30. The keyboard 23 contains keys 600-609, 625-628, and 617-622 for performing the various functions to be described in detail, such as, entering the card and/or cartridge address, electrically energizing the operating components of the system, initiating the retrieval of a card and/or cartridge, returning a retrieved card to its cartridge and/or a retrieved cartridge to its storage compartment, and resetting the system control circuitry. The keyboard, in addition, includes appropriate indicating devices 611-616 and 626-627, as well as indicators associated with keys 622, 618, 626, 628 for providing visual indications of the status of the various operating components, such as the presence, as well as the digits, of an address entered into the keyboard, the presence of a cartridge in the direct access or bulk access stations 22 and 28, the absence of a desired card from a retrieved cartridge located in the direct access station 22, and the like.

Each of the cards in the storage unit 10 is identified by a six digit address. The first digit, which corresponds to the hundred thousands position is either a 0 or a 1 and identifies either the front or rear storage wall 12 or 13, respectively, in which the card is located. The second, third and fourth digits, which correspond, respectively, to the ten thousands, thousands, and hundreds position, identify the storage compartment or pocket 16 of the selected storage wall 12 or 13 in which the cartridge is normally located. The last two address digits, which correspond respectively to the tens and units positions, identify the particular card 50 within a given cartridge 16.

In one mode of operation, namely, the direct access mode, in response to the entry of a six digit address into the keyboard 23, the servo-operated carriage 18 advances to the specified compartment 15, extracts from the compartment and transfers to the carriage the desired cartridge 16, and then advances to the direct access port 54 (FIG. 3). Once in this position, the cartridge 16 is inserted into and through the direct access port 54 and subsequently transported by the conveyor assembly 21 to the direct access station 22 whereupon the desired card 50 is selected and conveyed upward to the viewing device 24, resulting in a visual reproduction of the microfilm information 20 on the card being presented on the television screen 25.

Should removal of the selected card be desired for date modification, card replacement, destruction or the like, the platen gate 26 is opened and the card expelled for manual removal through slot 14. Upon return of the selected card 50 or a substitute to the cartridge 16 by inserting the same into the platen gate 26 and actuating the return key 620, if the selected card has been removed, or, if it has not been removed, by depressing the return key 620, suitable control circuitry to be described, is actuated to transport the cartridge back through the direct access port 54 whereupon it is deposited on the carriage 18 and transported to its storage compartment 15 for reinsertion therein, thereby completing the retrieval operation.

In the bulk access mode of operation only the address for the selected compartment, which includes four digits corresponding to the storage wall 12 or 13 and pocket designation in that storage wall, is entered into the keyboard. The last two digits of the address identifying the desired card 50 within a cartridge 16 are not entered. In this mode, the carriage 18 advances to a position opposite the selected cartridge 16, extracts the cartridge and transfers it to the carriage, and thereafter transports the cartridge to a position opposite the bulk access port 53. At the bulk access port, the cartridge is removed from the carriage and inserted in and through the bulk access port 53 and thence conveyed to the bulk access station 28 via a conveyor assembly 261A and 262A (FIG. 31) similar to that used in conjunction with direct access port 54. Once the cartridge is in the bulk access station 28, a ram 29 (FIG. 31) is actuated to urge the cards contained therein upward through the bulk transfer slot 30, thereby enabling the operator to remove one or more of the cards contained within the cartridge or, if desired, the entire cartridge. Upon return of the cartridge 16 to the bulk access station 28 by inserting it down through the bulk transfer slot 30 and depressing the return key 620, the cartridge is conveyed back through the bulk access port 53 where it is transferred to the carriage 18. The carriage then advances to the appropriate storage compartment 15 where the cartridge 16 is transferred from the carriage and reinserted into its own storage compartment, completing the bulk access retrieval cycle.

DETAILED DESCRIPTION

Cards

Figures 5, 6, 7, 8, 12:
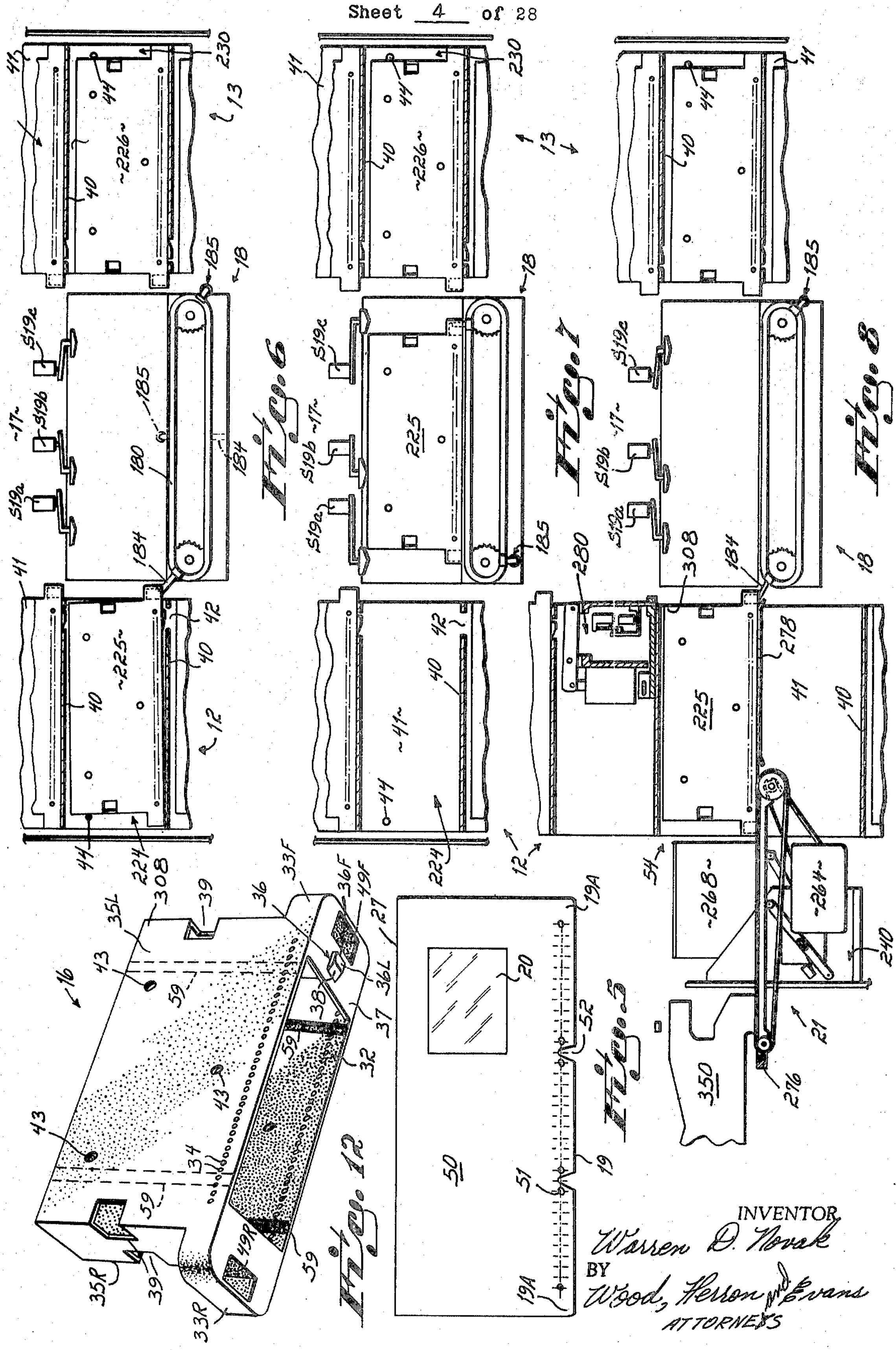

As shown in FIG. 5, the card 50 adapted to be stored in the cartridges 16 is preferably approximately the size of a conventional punch card. The card is provided with a microfilm insert 20 containing an image comprising the stored information. Along its lower edge 19, the card 50 is provided with a plurality of equally spaced apertures 51 arranged in a horizontal row. The apertures 51 define adjacent code locations or notch sites and are adapted to be selectively provided with one or more notches 52 to facilitate, in cooperation with the sorting rods 370 (FIG. 33) of the direct access station 22 to be described, selection of a desired card from a deck of stored cards in a manner similar to that practiced in the well-known McBee Key Sort Card Selection System. Specifically, the difference between the conventional McBee System and the Mosler system is that in the latter system the sorting rods retain undesired cards leaving the desired card available for selection and removal from the deck, while in the McBee system the sorting rods positively engage the desired card for selection and extraction from the deck. In the system used herein different pairs of apertures 51 of each card are provided with notches 52 in accordance with a digital coding scheme. When a card is to be selected, the sorting rods corresponding to the location of the notches formed in the desired card are inserted into the appropriate apertures of the cards in the deck. Since only the desired card has a notch pattern conforming to the inserted pair of sorting rods, only that card is free to be withdrawn from the deck by, for example, a jet of gas directed through the cartridge opening 32 against the bottom edges of the cards of the deck. The other cards are restrained by one or both of the inserted sorting rods.

Preferably, the corners 19A and 19B of the lower card edge 19 are rounded to permit easy insertion of the cards 50 into their respective cartridges.

Cartridges

As shown in FIG. 12, the cartridges 16 normally positioned in the individual storage compartments 15 are preferably constructed so as to hold a deck of one hundred edge notched cards 50, each card being approximately the size of the conventional punch card. Consequently, the cartridges 16 are dimensioned approximately one and one-half inches wide by three and three-eights inches high by seven and one-half inches deep. Of course, the cartridge 16 may be larger or smaller, as desired, depending on the nature of the contents it is desired to receive and store. The cartridges 16, which preferably are constructed of impact resistant molded plastic, are open at the top to allow cards 50 to be inserted and withdrawn, and only partially closed at the bottom to support the cards at their opposite bottom corners 19A as well as to permit a stream of gas to be directed upwardly through the opening 32 against the bottom edges 19 of the cards to separate and raise a selected card from the remainder of the deck of cards.

Each of the cartridges 16 is further provided with front and rear extensions 33F and 33R, respectively, having downwardly opening recesses 49F and 49R, respectively. The recesses 49 are adapted to be engaged by a tang 184 (FIGS. 22 and 23) associated with the carriage assembly 18, in a manner to be described, to permit transfer of the cartridges 16 between the storage compartments 15 and access ports 53 and 54 and the carriage during the retrieval process.

To permit card sorting rods 370 (FIG. 33) associated with the direct access station 22 to engage the lower notched and/or apertured edges 19 of cards stored in a cartridge 16 positioned at the direct access station 22 during the course of a card selection operation, a horizontal row of spaced apertures 34 is formed in the lower edge of each of the left and right sides 35L and 35R of the cartridge.

Figure 50:
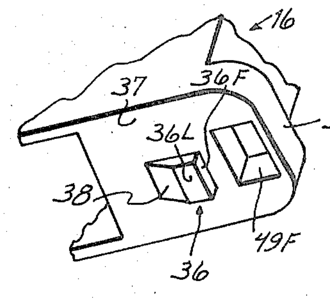

A depending detent lug 36 is formed on the bottom surface 37 of the front extension 33F of the cartridge 16. The detent lug 36 is positioned so as to seat in an appropriately located cartridge positioning slot 42 (FIG. 13) formed in the bottom supporting surface 40 of each pocket 15 in which cartridges are stored. The front side 36F of the detent lug 36, as shown in FIGS. 12 and 50, is substantially perpendicular to the bottom surface 37 of the cartridge 16 so as to provide proper locking of the cartridge in its storage pocket 15 when the cartridge is positioned with the detent lug engaged with, and seated in, the cartridge positioning slot 42. By cartridge locking, as the term is used herein, is meant restraining a cartridge 16 located in its pocket 15 against movement in a horizontal plane in a direction toward the carriage operating space 17 without first raising the front extension 33F sufficiently to bring the lower surface 36L of the detent lug 36 above the upper surface of the bottom of the storage compartment, thereby fully unseating and disengaging the lug 36 from the cartridge positioning slot 42. The rear surface 38 of the detent lug 36 is downwardly and forwardly sloping providing an inclined or cam surface. This permits the cartridge 16, when its bottom surface 37 is seated on the bottom of the pocket 15, to slide into the pocket the full extent and the detent lug 36 to drop in its associated cartridge positioning slot 42 to thereby complete the cartridge insertion operation without first applying a vertically directed lifting force to the cartridge for the purpose of raising the bottom surface 36L of the lug above the front edge of the compartment bottom.

The cartridge 16, at each of its four vertical corner edges, has a portion 39 of the mating surfaces removed. This permits compression finger shoulders 432 and 433 (FIG. 38) provided in the direct access station 22 to enter the cartridge for compressing the deck of cards 50 stored therein against one of the cartridge sides 35 so as to provide a space between the compressed deck of cards and the other opposite cartridge side in which cards may be infiled or reinserted into the cartridge.

Figure 51:
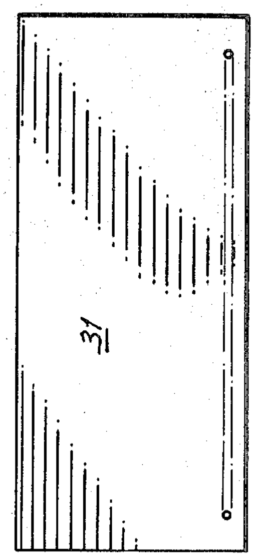

The cartridge 16 further includes in each of its sides 35 a set of three apertures 43. The two sets of apertures 43 alternatively receive a set of three fingers 413 (FIG. 33) forming part of the direct access station 22 for the purpose of properly positioning and aligning the cards within a cartridge prior to the entry of the sorting rods 370 into the cartridge and card apertures 34 and 51, respectively, so as to prevent the cards in the cartridge from being damaged by the entering sorting rods, and to properly align the cards with the nozzle 336 and drive and pressure rolls 470L and 471L for a purpose to be described. A pressure distributing plate 31 located in the cartridge between the deck of cards and the cartridge wall through which the three fingers 413 pass is provided to distribute the pressure exerted by the three fingers 413 equally to the entire card surface. The plate 31, as shown in FIG. 51, is preferably a molded plastic sheet approximately the size of a card 50 and is provided with a row of apertures along its bottom edge to accommodate the sorting rods 370 which enter the deck of cards to facilitate card selection.

The cartridge 16 further includes four vertically disposed slots 59 formed in the interior of the cartridge side walls 35, the slots 59 being arranged in pairs on the respective side walls 35L and 35R. The four slots 59 permit a set of four vertically reciprocable fingers 65 (FIG. 31) to become positioned between the cartridge walls with which they are associated and the outermost cards of a deck positioned in a cartridge positioned at the bulk access station. This permits all of the cards of a deck, including the outermost cards thereof, to be lifted upwardly out of the cartridge in response to movement of ram 29.

Storage Walls

As shown more particularly in FIGS. 1, 3, 4, and 13, the compartmentalized arrays or racks comprising the front and rear storage walls 12 and 13 are each constructed of interlocking horizontally and vertically disposed separators 40 and 41, respectively, forming a grid, lattice or matrix 50 columns wide by 20 rows high of individual pockets 15 for storing cartridges 16. The horizontal spacing between the vertical separators 41 and the vertical spacing between the horizontal separators 40 as well as the depth of both the horizontal and vertical separators is such as to conveniently accommodate cartridges 16. Specifically, the spacing of separators 40 and 41 is slightly in excess of the height and width, respectively, of a cartridge 16 to permit easy withdrawal and insertion of cartridges into their associated pockets 15. The depth of the separators 40 and 41 should at least be sufficiently long to permit the cartridge to be inserted into its associated pocket 15 without protruding into the carriage space 17 between the front and rear storage walls 12 and 13 except to the extent necessary to permit the engagement and withdrawal of cartridges from their pockets for transfer to the carriage 18 in a manner to hereinafter be described.

The marginal portion of the horizontal separator 40 nearest the carriage operating space 17 of each card storing pocket 15 is provided with a cartridge locating slot 42. The slot 42 is preferably of rectangular cross section to accommodate and seat the cartridge locating lug 36 depending from the bottom 37 of the cartridge. As shown in FIGS. 6—8 and 13, the cartridge locating slot 42 is positioned relative to the carriage operating space 17 such that when the lug 36 is seated in the cartridge locating slot 42 the rear end of the cartridge abuts a cartridge stop 44, to be described, leaving the front recessed extension 33F of the cartridge projecting into the carriage operating space 17 a distance sufficient to permit the tang 184 (FIG. 22) of the carriage assembly 18 to engage the front cartridge recess 49F for withdrawing and transferring the cartridge into the carriage.

In addition to the 50 vertical columns of pockets each of which contains 20 pockets yielding a total of 1,000 addressable cartridge storing pockets per storage wall, two additional vertical columns are provided in each of the front and rear storage walls 12 and 13. Specifically, columns 55 and 56 are located in the rear wall 13 while columns 57 and 58 are located in the front wall 12. Located in the columns 57 and 58 are the bulk access and direct access ports 53 and 54 to be described in detail. While the pockets in the columns 57 and 58 located above and below the bulk and direct ports 53 and 54 could be used for storing cartridges for retrieval, they preferably are not used for this purpose. Rather, they are either left empty or alternatively used to store empty cartridges for improving the appearance of the storage unit 10 should the storage unit 10 housing 9 be constructed of transparent material.

Disposed opposite the columns 57 and 58 of the front storage wall 12 are similar unused columns of pockets 55 and 56 in the rear wall 13. While the pockets of these columns, like the pockets of columns 57 and 58 located above and below the bulk and direct access ports 53 and 54 could be used for storing cartridges for retrieval, they are for convenience either left empty or used to store empty cartridges for the sake of appearance.

Figure 3:
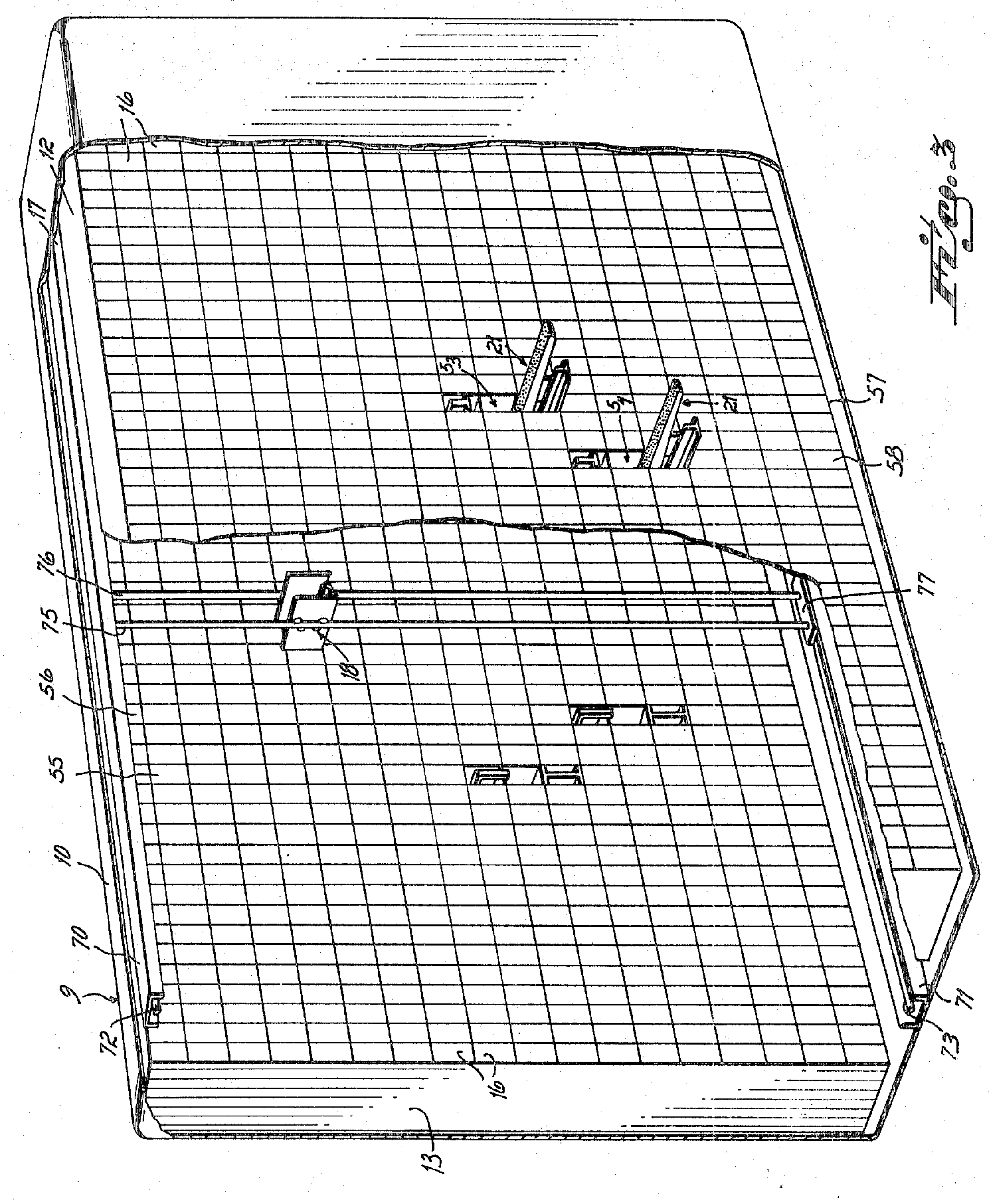

As depicted in FIG. 3, columns 55 and 56 are provided with access ports should it be desired to provide the storage unit 10 with an additional console unit. Such an additional console unit could be used if, for example, it was desired to have more than one direct access and/or bulk station associated with each storage unit to thereby increase the card retrieval and/or viewing capabilities of the retrieval system.

Figures 13, 39, 52:
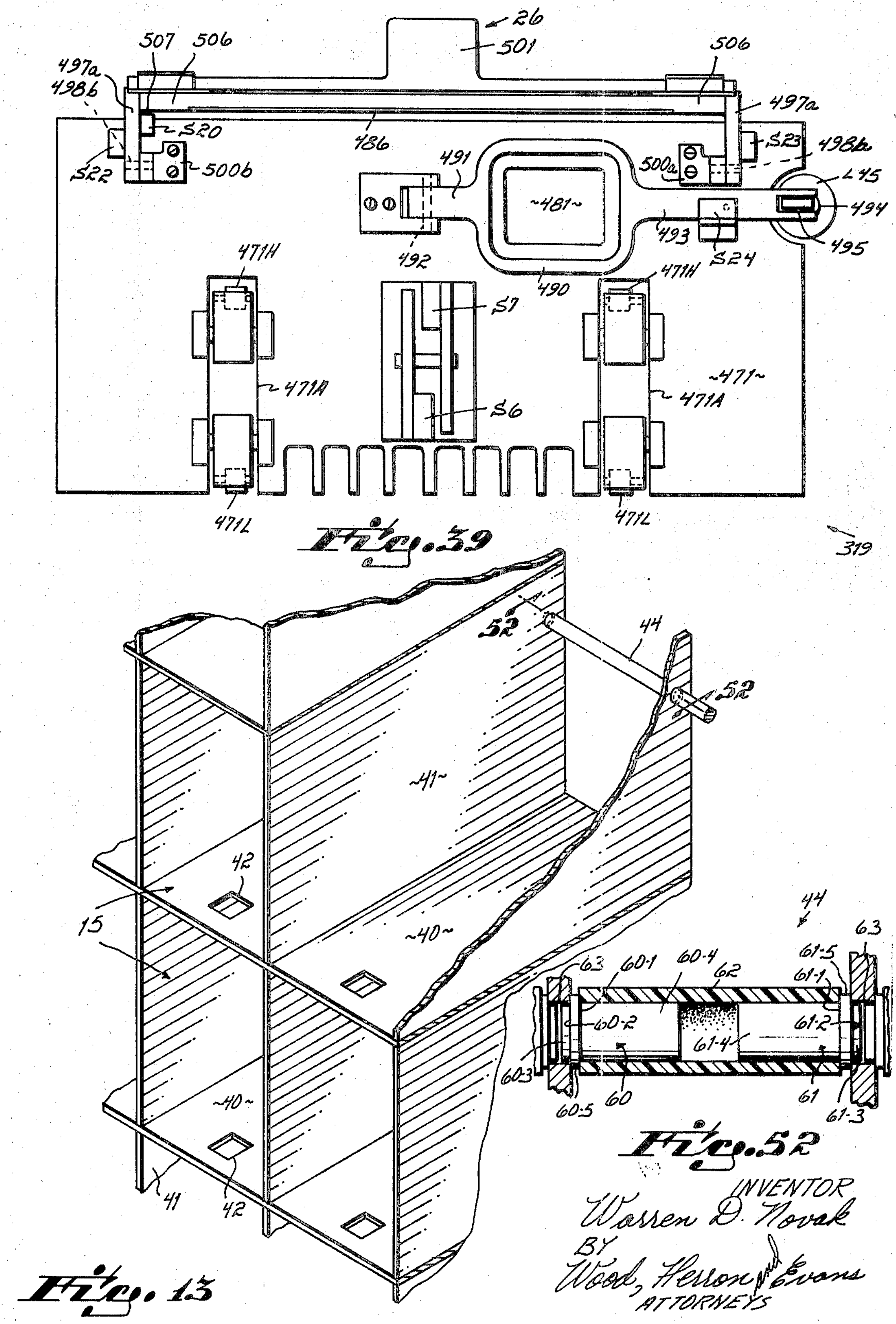
Figure 24:
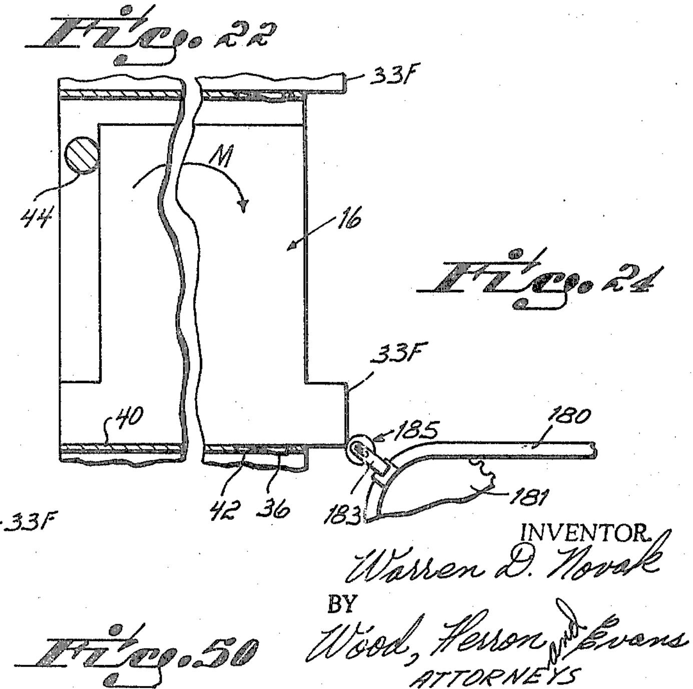

Each of the pockets 15 in which cards are stored contains a cartridge stop 44 located in the upper rear portion of the pocket as best shown in FIGS. 13 and 24. The cartridge stop 44 is a horizontal rod extending between adjacent vertically disposed separators 41 which define the sides of the individual pockets 15. The location of the stop 44 relative to the pocket geometry is such that it abuts the upper rear corner of the cartridge as it is returned to its storage compartment. This engagement results in the application to the cartridge of a reaction force which generates a moment M tending to rotate the cartridge in a manner such that the detent lug 36 is driven downwardly, seating in the location slot 42. The cartridge stop 44, in combination with the detent lug 36, cooperates to prevent the cartridge 16 from bouncing out of its storage compartment, and thereby preventing the lug 36 from properly seating in the slot 42. This, in turn reduces the chances that a cartridge, following reinsertion into its pocket, projects an undue amount into the carriage space 17 providing a potential obstruction to carriage movement and a risk of cartridge damage.

The cartridge stop 44, as shown in FIG. 52, preferably includes a pair of round stepped diameter plugs 60 and 61, having inner shoulders 60-1 and 61-1, respectively, and outer shoulders 60-2 and 61-2, respectively. The cartridge stop 44 also includes a resilient sleeve or tube 62. The outer and inner shoulders 60-2 and 60-1 of plug 60 separate, respectively, a pocket wall engaging plug end 60-3 and a sleeve engaging plug end 60-4 from a central large diameter plug portion 60-5. The outer and inner shoulders 61-2 and 61-1, respectively, of the plug 61 separate, respectively, a cartridge wall engaging plug end 61-3 and a sleeve engaging plug end 61-4. The inside diameter of the sleeve 62 and the diameter of the plug ends 60-4 and 61-4 are dimensioned such that plug ends each fit within, and are snugly embraced by, opposite ends of the sleeve. The outer ends of the plugs 60-3 and 61-3 loosely fit into appropriately located holes 63 formed in the side walls 41 of the pocket. The axial length of each of the plug ends 60-3 and 61-3 is less than one-half the thickness of the pocket side wall 41, thereby preventing the stops of adjacent plugs from mechanically interfering with each other when assembled in the pockets. The distance separating the shoulders 60-2 and 61-2 of an assembled stop is equal to or slightly less than the width of a pocket into which a cartridge seats. Thus, when the composite stop is properly located in a pocket, the sleeve 62 is not axially compressed. The axial length of the inner plug ends 60-4 and 61-4 is less than one-half the axial length of the sleeve 62, thereby enabling the sleeve to flex at the center for reasons to become apparent hereinafter.

The thickness of the sleeve wall is such that when the plug ends 60-4 and 61-4 are inserted in opposite ends of the sleeve, the outside diameter of the sleeve exceeds the diameter of the central portions 60-2 and 61-2 of the plugs 60 and 61, respectively, by an amount sufficient to permit the sleeve wall to act as a resilient, compressible cushion for a cartridge abutting against the cartridge stop 44 during insertion of a cartridge into its pocket. This cushioning effect provided by the sleeve 62 reduces the noise resulting from a cartridge abutting the stop 44 and prevents undesirable stressing of the cartridge even after repeated collisions with the stop.

The stop 44 is properly positioned in a pocket by first seating one of the ends 60-3 or 61-3 in its associated hole 63 and then, while slightly flexing the sleeve 62 at its center, urging the other of the ends 60-3 or 61-3 into seating relationship with its associated hole 63. Removal of a stop 44 is accomplished by exerting force on the sleeve at its center in a direction normal to the sleeve axis, thereby bowing or flexing the sleeve and allowing its ends 60-3 and 61-3 to disengage and unseat from their respective holes 63 to facilitate subsequent removal.

An advantage of this preferred form of cartridge stop 44, in addition to reducing the noise during impact with a cartridge, is that it is easily removed to permit access to a pocket from the rear of a storage wall for removal of a cartridge from its pocket during an emergency such as a power failure. Such removal of a stop requires no special tools, but can be done using an operator's index finger. This preferred stop is also easily inserted in a pocket during fabrication of a system without special tools. Finally, this preferred stop reduces the tolerance problems normally encountered in manufacturing since it inherently has the capability to adapt to errors in placement of the holes 63, relative to each other and to the front edge of the pocket, errors in cartridge size, etc.

Digital Addressing Format

Each of the 200,000 cards capable of being stored in the storage unit 10 is identified by a six digit address. The first digit of the card address, corresponding to the hundred-thousands position, identifies the particular one of the storage walls 12 or 13 in which the card is stored. In this embodiment, there are two walls, namely, a front storage wall 12 and a rear storage wall 13; consequently, there are two possible digit values for the first address digit. These are conveniently designated digit 0 corresponding to the front storage wall 12 and digit 1 corresponding to the rear storage wall 13.

The second, third and fourth card address digit positions corresponding to the ten thousands, thousands, and hundreds position, respectively, identify a particular storage compartment of one of the walls 12 or 13 in which the card is normally stored. Since each of the storage walls 12 and 13 contains 1,000 compartments in which cards are stored in cartridges, all of the 1,000 digital combinations afforded by the three digits are used in numbering the storage compartments of each wall in which cards are stored. Consequently, the second, third, and fourth digits of the card address may be any of the 1,000 digital numbers between 000 and 999. In practice, since the card storing compartments of each storage wall are arranged in 20 horizontal rows of 50 compartments each, it has been found convenient to number the card-storing compartments consecutively from 000 to 999 starting at the lower corner of a wall and ending at the upper, diagonally opposite corner.

Figure 4:
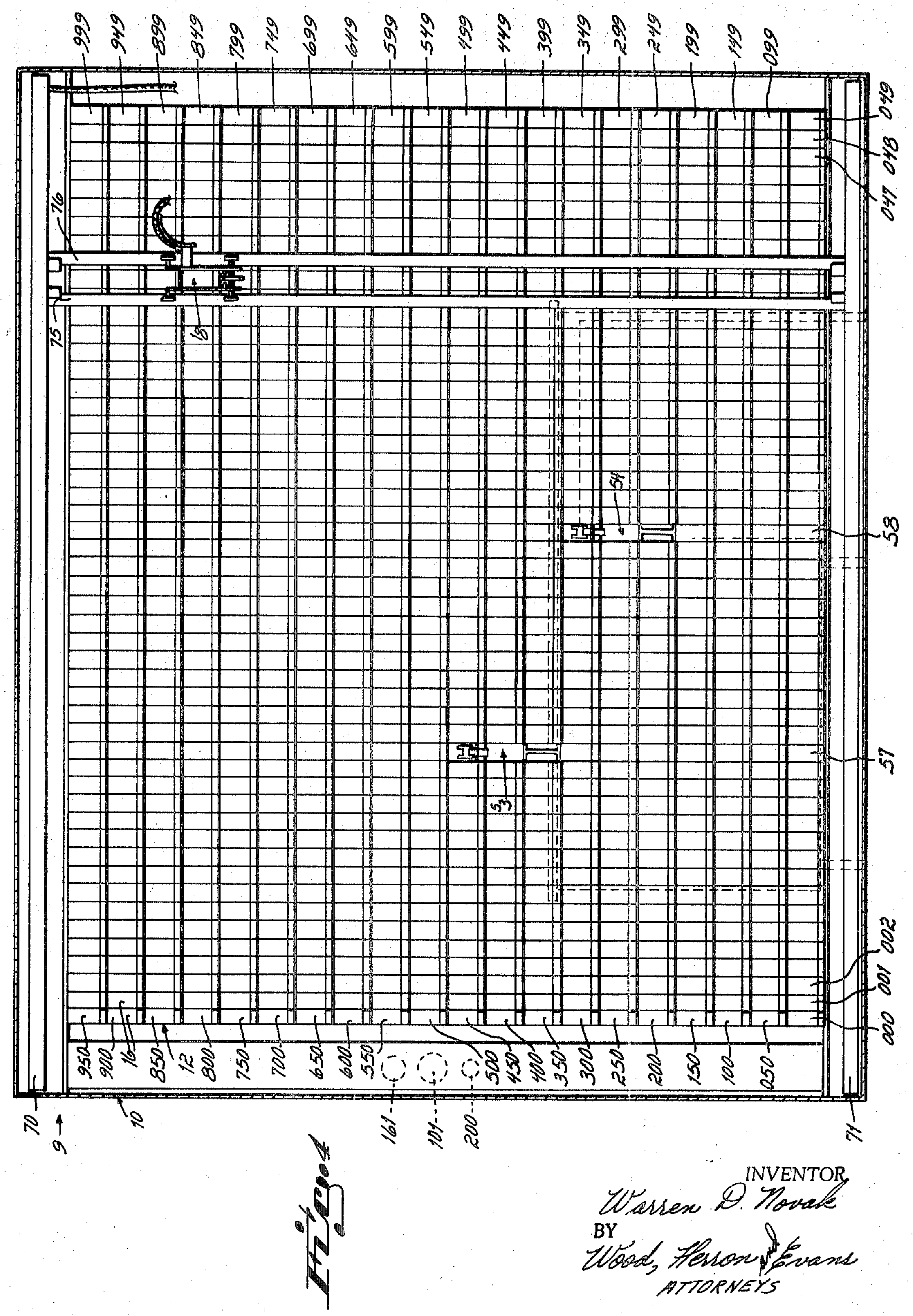

Specifically, as shown in FIG. 4, the lowermost horizontal row of card-storing pockets 15 of front storage wall 12 is consecutively numbered from 000 to 049 starting at the left edge of the storage wall, except for the pockets of columns 57—58 and 55—56 of the front and rear storage walls which contain presently used as well as spare bulk and direct access ports. The next lowest horizontal row starting at the same edge is likewise numbered consecutively from 050 to 099. Similarly, the third lowest horizontal row starting at the same edge is numbered consecutively from 100 to 149. In like manner, the remaining horizontal rows of the front storage wall 12 are numbered leaving the uppermost horizontal row starting at the same left edge numbered consecutively from 950 to 999. The numbering of the compartments of the rear storage wall 13 is such that each storage compartment bears the same three digit number as the storage compartment of the front storage wall 12 located directly opposite it.

In consecutively numbering the storage compartments 15 of the horizontal rows, the two vertical columns 57 and 58 of the front storage wall 12 and the columns 55 and 56 of the rear storage wall 13 are not included. In these columns 57, 58, 55, and 56, except for the bulk and direct access ports and the pockets housing their associated port gates 280 (FIGS. 30 and 31), the storage compartments are not in fact used, but rather are either left empty or filled with empty cartridges for the purpose of providing a pleasing appearance.

Y-Carriage Component

The Y-Carriage component as shown in FIGS. 3, 4, 14, 15, 18, 19 and 20 includes a pair of spaced parallel side plates 120 and 121 disposed substantially perpendicular to the front and rear storage walls 12 and 13. The side plates 120 and 121 are mounted adjacent to and centrally disposed of the guide rods 75 and 76, respectively. The side plates 120 and 121 are maintained relative to each other in the orientation described by two cylindrical spacers and a rectangular pulley block 123 screwed at their ends to the plates 120 and 121. The side plates 120 and 121 are at their lower ends spaced from each other by two cylindrical spacers and a rectangular pulley block 129. These parts are also fastened to the side plates by screws.

To permit vertical motion of spaced plates 120 and 121 relative to the vertical guide rods 75 and 76, four pairs of guide wheels 130 are provided, there being an upper and lower pair associated with each side plate and guide rod. Each of these pairs of guide wheels 130 is mounted for rotation about horizontally disposed pins 131 at a distance established by spacer 132 to embrace opposite portions of guide rods 75 and 76, thereby preventing the plates 120 and 121 from moving in the Z-direction relative to the guide rods. Also provided are four guide wheels 133, the guide wheels being divided into upper and lower pairs whose wheels are adapted to engage opposed portions of guide rods 75 and 76. Specifically, the wheels 133 are mounted for rotation about pins 134 supported by ears 135 extending from and secured to the side plates 120 and 121. The wheels 133 lie in a plane defined by the guide rods 75 and 76. The function of the guide wheels 133 is to prevent the side plates 120 and 121 from moving in the X-direction relative to the guide rods 75 and 76.

The Y-carriage component further includes a pair of cartridge shelf members 145 which are secured to different ones of the inner opposed surfaces of the side plates 120 and 121. The shelf members 145 have an upper surface 146 which is substantially horizontal and are adapted to support cartridges 16 extracted from the storage unit 10 and transferred to the carriage.

To centrally locate a cartridge between the side plates 120 and 121, four pairs of guide wheels 150 are provided, there being an upper and lower set of guide wheels associated with each side plate 120 and 121. Each of the guide wheels 150 is mounted for rotation about a vertical axis on a pin 151 secured at its ends to opposed arms of a yoke 152. The yokes 152 which are fastened to the side plates 120 and 121 by suitable fasteners 153 are constructed of resilient material such as leaf spring stock to bias the wheels 150 into the space 149 between the side plates 120 and 121. A cartridge 16 seated on the upper surface 146 of the shelf member 145 has, in the course of being transferred to or from the carriage, its side walls 35 in rolling engagement with the spring biased wheels 150 and is thereby centrally positioned in the space 149 between the side plates 120 and 121.

Figure 14:
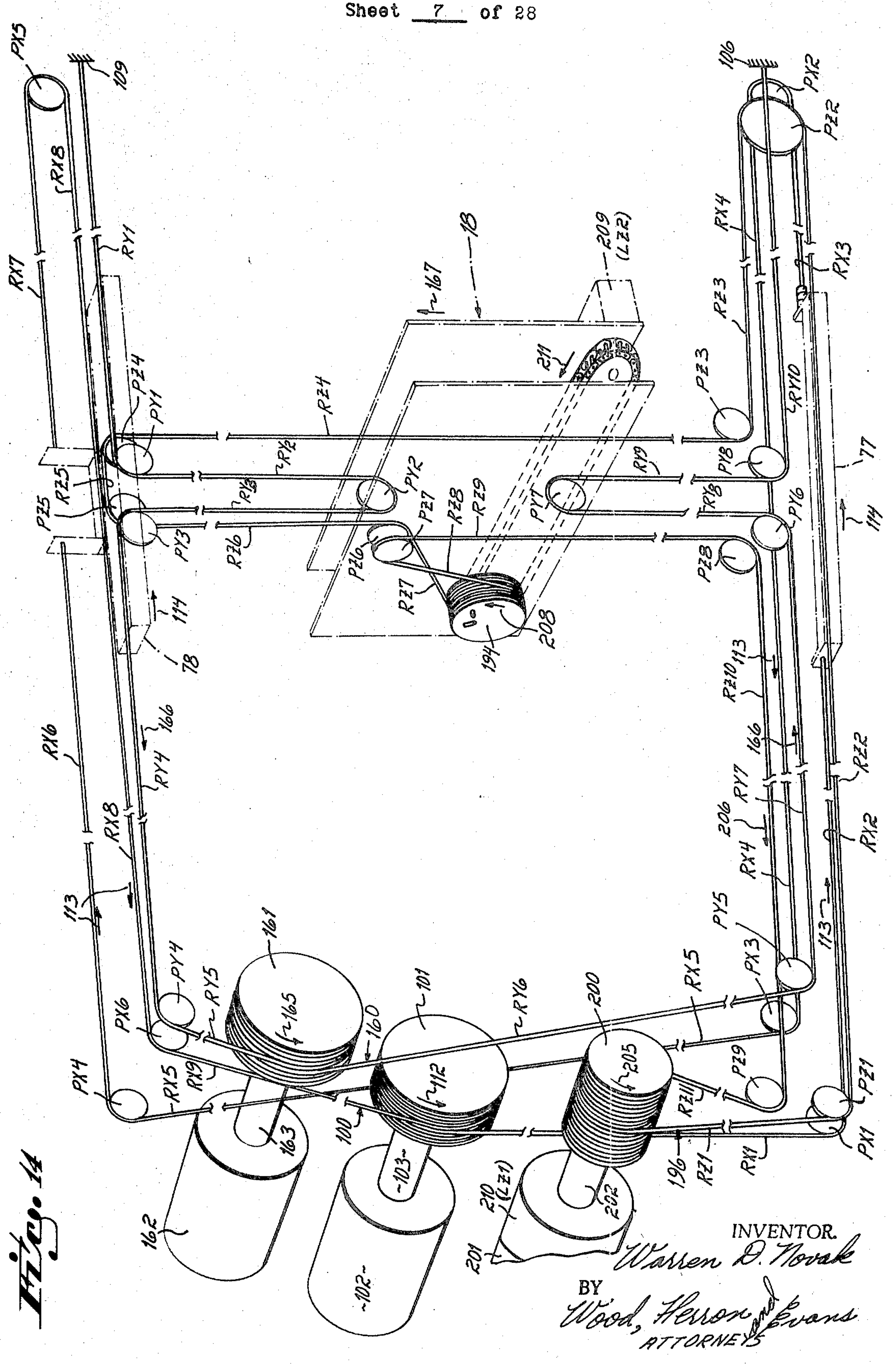
Figure 15:
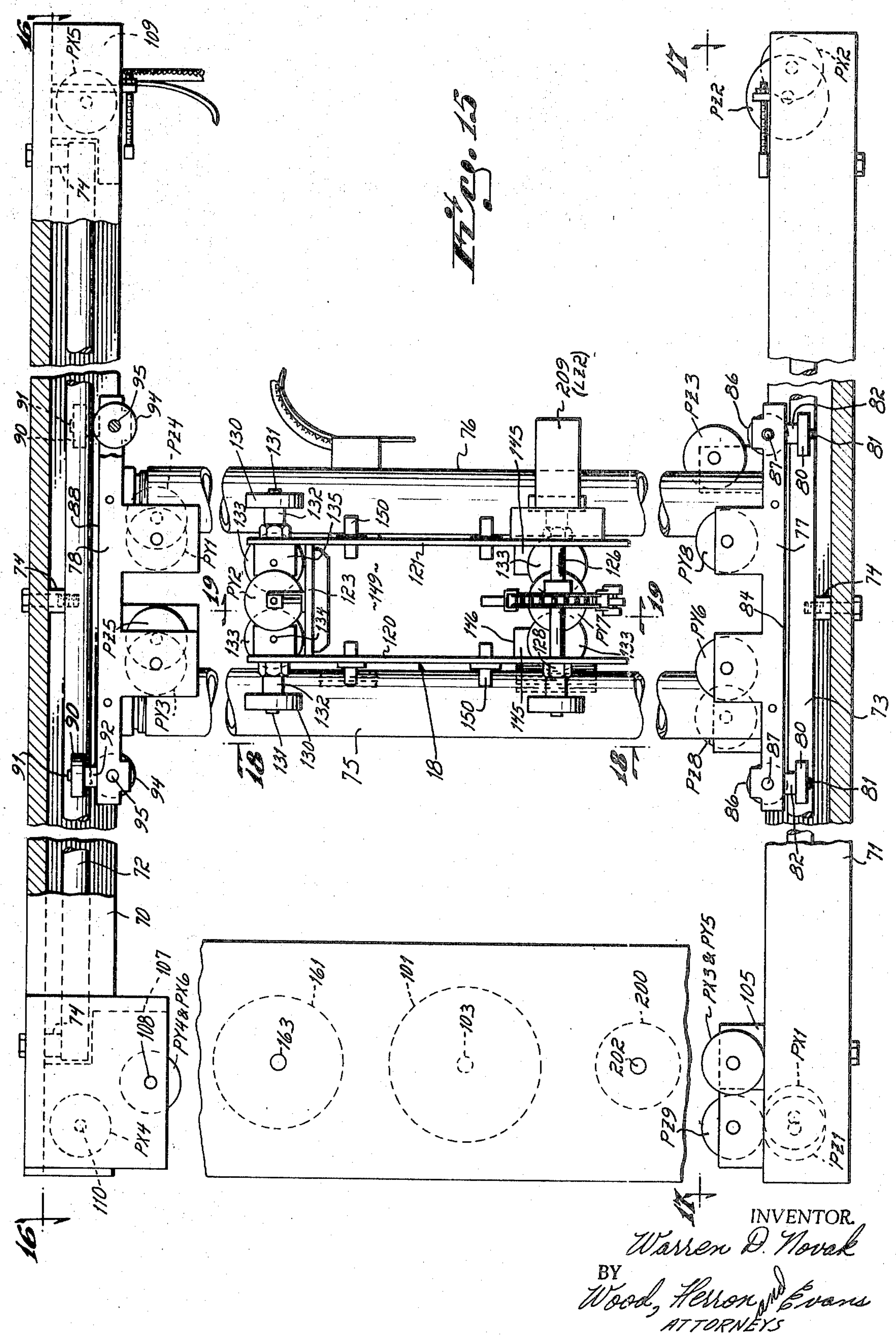
Figure 16:
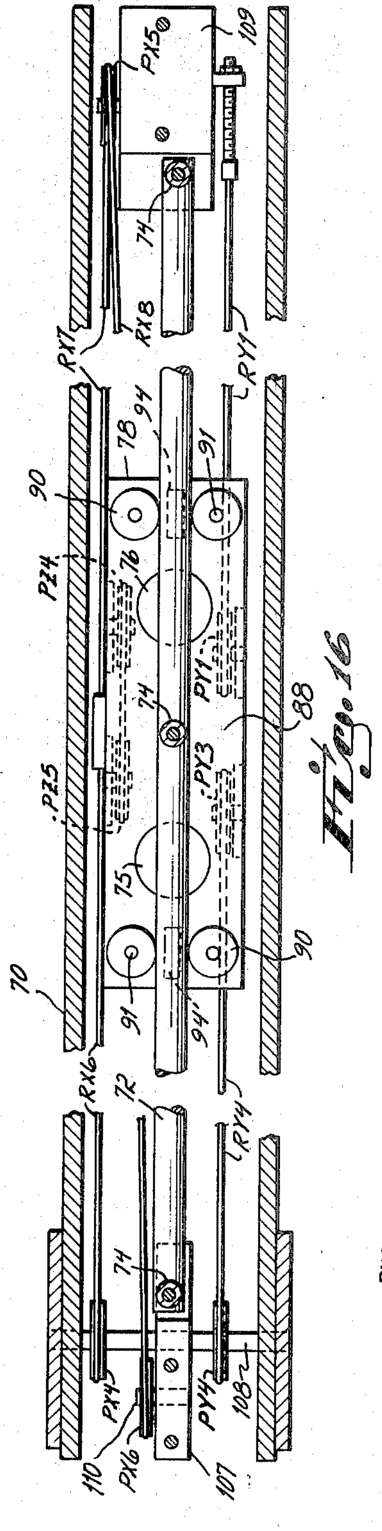
Figure 17:
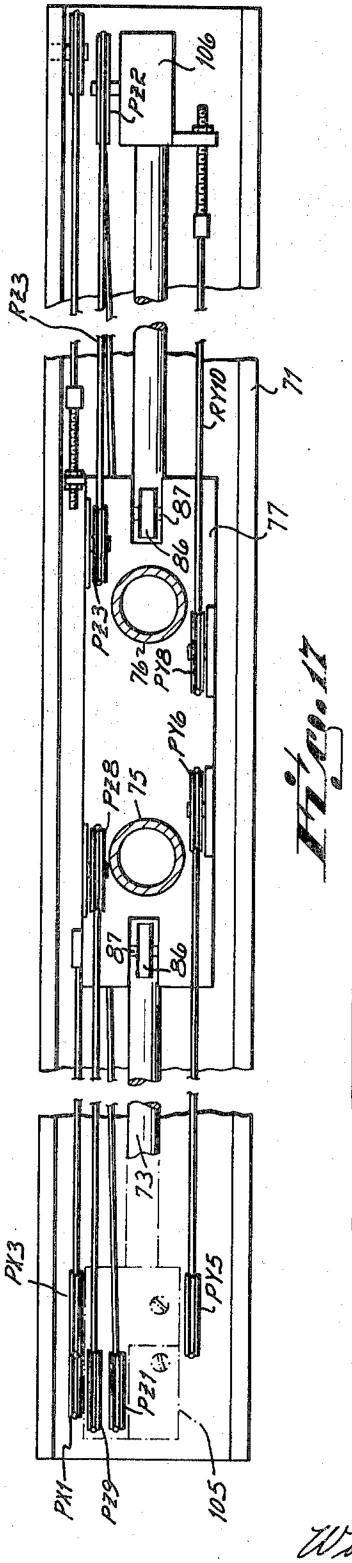
Figure 21:
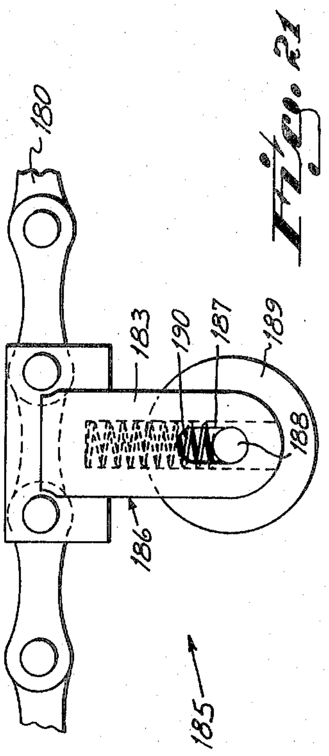

A Y-drive cable 160, in combination with a Y-drive drum 161 which is driven by a Y-servo motor 162 via a shaft 163, provides vertical positioning motion for the Y-carriage component. The Y-drive cable 160, as best shown in FIG. 14, includes a first horizontal reach $R_y$1 which at one end is fastened to the stationary block 109, and at its other end is trained over a pulley $P_y$1 mounted for rotation on a pin secured to the upper guide block 78. A second vertical reach $R_y$2 connected at one end to reach $R_y$1 is trained over a pulley $P_y$2 mounted for rotation on a pin connected to the spacer 123. Reach $R_y$2 in turn connects to a vertical reach $R_y$3 which is trained over a pulley $P_y$3 mounted for rotation on a pin secured to the upper guide block 78. A horizontal reach $R_y$4 connected to the reach $R_y$3 trains over a pulley $P_y$4 mounted for rotation on the fixed shaft 108. A vertical reach $R_y$5 is connected to reach $R_y$4 at its upper end and is wrapped about the drum 161 and its lower end fixed thereto to provide positive nonslipping engagement with the Y drive drum 161. A vertical reach $R_y$6 which, at its upper end wraps around the drum 161, is fixed to drum 161 to provide positive nonslipping contact between the drum and cable. Reach $R_y$6, at its lower end, trains over a pulley $P_y$5 rotatably mounted to the journal block 105. Reaches $R_y$7, $R_y$8, $R_y$9 and $R_y$10 train over pulleys $P_y$6, $P_y$7 and $P_y$8 in a manner similar to reaches $R_y$1, $R_y$2, $R_y$3 and $R_y$4. Pulleys $P_y$6 and $P_y$8, like pulleys $P_y$1 and $P_y$3, are rotatably mounted to a guide block, in this case guide block 77. Pulley $P_y$7, like pulley $P_y$2, is rotatably mounted to a side plate spacer, in this case a spacer 129. The end of reach $R_y$10, like the end of reach $R_y$1, is secured to a stationary block 106.

In operation, when the Y-drive drum 161 rotates in the direction of the arrow 165, the reaches $R_{y2}$—$R_{y9}$ move in the direction of the arrows 166, driving the Y-carriage component in the direction of arrow 167. In like manner, rotation of the Y-drive drum 161 in a direction opposite to the arrows 165, drives the reaches $R_{y2}$—$R_{y9}$ in a direction opposite to the arrows 166, thereby imparting motion to the Y-carriage component in a direction opposite to the arrow 167.

X Carriage Component

The carriage 18 includes X, Y, and Z direction components for providing independent positioning motion in the X, Y, and Z directions as defined by the labeled directional arrows depicted in FIG. 14. The X carriage component, as shown more particularly in FIGS. 3, 4, 15, 16, 17, and 20, includes upper and lower parallel channel members 70 and 71. The channel members 70 and 71 have a substantially U-shaped cross section, as shown in FIG. 3, with the leg portions of the lower channel members disposed upwardly and downwardly, respectively. The channel members 70 and 71 are positioned in the carriage space 17 equidistant the front and rear storage walls 12 and 13 with the lower and upper channel members 71 and 70 substantially aligned with the bottom and top edges of the storage walls. Upper and lower guide rails 72 and 73 are centrally disposed between the leg portions of the U-shaped members 70 and 71, respectively, and secured in a position spaced from the central portion of the U-shaped members by spacing elements 74. The guide rails 72 and 73 extend substantially the entire width of the storage unit 10.

A pair of spaced vertical guide rods 75 and 76 extending substantially the entire vertical height of the storage unit 10 span the guide rails 72 and 73. The vertical guide rods 75 and 76 at their lower and upper ends are rigidly secured to lower and upper guide blocks 77 and 78, respectively. The blocks 77 and 78 are adapted to be guided by the guide rails 72 and 73 for transverse motion in the X direction, carrying with them the vertical rods 75 and 76.

The lower guide block 77 is provided with four guide wheels 80 which are mounted for rotation about vertically disposed pins 81 at a distance from the lower surface 84 of the guide block 77 established by a spacer 82 concentrically mounted on the pin 81 between the wheels 80 and the lower surface 84 of the guide block 77. The lower guide block 77 is also provided with a pair of centrally disposed slots formed in the end portions thereof in which are positioned a pair of guide wheels 86 mounted for rotation about horizontally disposed pins 87 secured at their ends to the slot-defining wall portions of the lower guide block ends. The dimensions and location of the wheels 80 and 86 are such that the lower guide block 77 is parallel to, and centrally disposed of, the guide rail 73. The dimensions and position of the wheels 80 and 86 are also such that the planes in which they lie pass through the axis of the guide rail 73.

The upper guide block 78, like the lower guide block 77, is also provided with a set of four guide wheels 90 mounted for rotation about vertically disposed pins 91 at a distance from the upper surface 88 of the guide block 78 established by spacers 92. The upper guide block 78, like the lower guide block 77, has a pair of centrally disposed slots formed in its opposite ends into which are positioned a set of wheels 94 for rotation about horizontally disposed pins 95 anchored at their ends to the slot-defining end walls of the guide block 78. The wheels 94 lie in a plane passing through the axis of the guide rail 72. The orientation of the wheels 90 and 94 relative to each other as well as to the guide rail 72 and guide block 78 is such that the guide block is parallel to the guide rails 72 as well as centrally disposed thereof. In addition, the spacers 92, like the spacers 82, are dimensioned such that the plane of wheels 90 passes through the axis of the guide rail 72.

The vertical rods 75 and 76 in combination with the upper and lower guide blocks 78, 77 form a substantially rigid body adapted to move in the X direction in a plane parallel to, and equidistant from, the front and rear storage walls 12 and 13.

Selective positioning of the X carriage component to any point along the X axis is produced by an endless X-drive cable 100, as shown in FIG. 14. The X-drive cable 100 is wrapped around an X-drive drum 101 a plurality of times and terminated to provide a nonslipping, positive engagement between the drum and the cable. The drum 101 in turn is driven by an X-servo motor 102 via a shaft 103. The X-cable 100 includes a first vertical reach $R_x$1 which is trained over a pulley $P_x$1 rotatably mounted to a journal block 105 (shown in phantom in FIG. 17) secured to the lower channel member 71. A second horizontal reach $R_x$2 is connected between reach $R_x$1 and the lower guide block 77. A horizontal reach $R_x$3 connected to the other side of the guide block 77 trains over a pulley $P_x$2 rotatably mounted to the channel member 71. The X-drive cable 100 further includes the horizontal reach $R_x4$ trained under a pulley $P_{x3}$ mounted to the journal block 105 for rotation about a horizontal axis. The reach $R_{x4}$ connects to a vertical reach $R_{x5}$ which is trained over a pulley $P_{x4}$ rotatably mounted to a journal block 107 (FIG. 16) on a rod 110. A horizontal reach $R_{x6}$ is connected to the upper guide block 78. The other side of the guide block is connected to a reach $R_{x7}$ which is trained around a pulley $P_{x5}$ rotatably mounted to a journal block 109 (FIG. 16) secured to the channel member 70. A horizontal reach $R_{x8}$ also forming part of the X-drive cable is connected to reach $R_{x7}$ and is trained over a pulley $P_{x6}$ rotatably mounted about a rod 108. A vertical reach $R_{x9}$, which completes the X-drive cable, is connected between reach $R_{x8}$ and the drum 101.

In operation, when the X-drive drum 101 rotates in the direction of arrow 112, the various reaches $R_{x1}$—$R_{x9}$ of the X-drive cable move in the direction of arrows 113, translating in the direction of arrow 114 the upper and lower guide blocks 78 and 77, to which the X-drive cable 100 is secured, as well as the vertically disposed guide rods 75 and 76. In like manner, rotation of the X-drive drum 101 in a direction opposite to the arrow 112 drives the various reaches $R_{x1}$—$R_{x9}$ of the X-drive cable in a direction opposite to the arrows 113, driving the upper and lower guide blocks 77 and 78 and the rods 75 and 76 in a direction opposite to the arrows 114.

Z-Direction Carriage Component

The Z direction carriage component as shown more particularly in FIGS. 14, 15, 19, 20, 21, 22, 23, and 24 includes an endless drive chain 180 trained over a pair of sprockets 181 and 182. The sprockets 181 and 182 are mounted on shafts 127 and 126, respectively, for rotation about an axis which is parallel to the X-direction of motion. The sprockets 181 and 182 are spaced equidistant from the side plates 120 and 121 and at a height such that the upper reach of the drive chain is substantially flush with the cartridge support surface 146 of the shelf members 145. A tang 184 is fixed to the chain 180 at a point opposite a wheel assembly 185 which is also secured to the chain 180. The wheel assembly 185, as shown more particularly in FIG. 21, includes a yoke 186 disposed substantially perpendicular to the reach of the chain 180 to which it is secured. The two spaced parallel arms 183 of the yoke 186 are provided with slots 187 which are adapted to receive the ends of a pin 188 on which is rotatably mounted the wheel 189. Two coil springs 190 are located in holes inside the arms 183 of the yoke 186 and they urge the pin 188 outwardly, that is, in a direction away from the chain reach to which the wheel is mounted.

Motion is transmitted to the chain 180 by the sprocket 181 which itself is keyed to the shaft 127. The shaft 127 in turn is keyed to a drum 194 about which the Z drive cable 196 is wrapped a number of times and terminated to provide positive engagement between the Z drive cable and the drum.

A chain support 197 shown in FIGS. 18 and 19 extends between and is secured to shelf members 145 and thereby is fastened to the side plates 120 and 121 at a point immediately below the lower surface of the upper chain reach. This supports the upper chain reach in a substantially horizontal plane, thereby maintaining the upper surface of the upper chain reach substantially flush with the support surface 146 of the shelf member 145 and also prevents interference of the chain with Y pulley $P_{y7}$.

The Z drive cable 196, as shown more particularly in FIG. 14, is in the form of an effectively endless cable and is wrapped around the Z drive drum 200 which is driven by the Z-servo motor 201 via a clutch 210 and a shaft 202. The cable 196 is wrapped around the drum 200 a number of times and terminated to provide nonslipping positive engagement between the drum and the cable. Connecting the drum 200 and the drum 194 are two sets of reaches. The first set includes reaches $R_z1$, $R_z2$, $R_z3$, $R_z4$, $R_z5$, $R_z6$ and $R_z7$, which are trained successively over pulleys $P_z1$, $P_z2$, $P_z3$, $P_z4$, $P_z5$ and P6. Pulleys $P_z1$, $P_z2$, $P_z3$, $P_z4$, $P_z5$ and $P_z6$ are rotatably mounted to journal blocks 105 and 106 (see FIG. 17), lower guide block 77, upper guide block 78, and side plate 120, respectively. The second set of reaches connecting the drums 194 and 200 and forming the other half of the Z drive cable 196 includes reaches $R_z8$, $R_z9$, $R_z10$ and $R_{z11}$, trained successively over pulleys $P_{z7}$, $P_{z8}$and $P_{z9}$. Pulleys $P_{z7}$, P BACKGROUND OF THE INVENTION and P 1. Field of the Invention are rotatably mounted to side plate 120, the lower guide block 77, and the journal block 105, respectively.

In operation, when the drive drum 200 is rotated in the direction of the arrow 205, the reaches $R_{z1}$—$R_{z11}$ are driven in the direction of arrows 206, driving the drum 194 and sprockets 181 and 182 in the direction of the arrows 208, in turn, driving the chain 180 in the direction of the arrows 211. In a like manner, if the Z drive drum 200 is driven in a direction opposite to the arrows 205, the reaches $R_{z1}$—$R_{z11}$, the drum 194, sprockets 181 and 182, and chain 180 are driven in a direction opposite the arrows 205, 206, 208 and 211, respectively.

The operation of the X-drive cable 100 is independent of the operation of the Y-drive cable 160 and vice versa. For example, should the X-drive drum 101 be rotated in the direction of arrow 112, driving the various reaches of the cable 100 in the direction of arrow 113, in turn, driving the guide blocks 77 and 78 as well as the guide rods 75 and 76 in the direction of arrow 114, the Y-drive drum 161 is free to remain stationary. With the Y-drive drum 161 stationary, the total length of the reaches $R_{y1}$, $R_{y2}$, $R_{y3}$, $R_{y4}$ and $R_{y5}$, as well as the total length of the reaches $R_{y6}$, $R_{y7}$, $R_{y8}$, $R_{y9}$ and $R_{y10}$ remain constant. However, reaches $R_{y1}$ and $R_{y10}$ shorten equally, while reaches $R_{y4}$ and $R_{y7}$ lengthen equally and in an amount corresponding to the shortening of reaches $R_{y1}$ and $R_{y10}$. Thus, the total length of the reaches $R_{y2}$ and $R_{y3}$ and the total lengths of the reaches $R_{y8}$ and $R_{y9}$, which determine the Y coordinate of the Y carriage component, is free to remain constant, maintaining the Y coordinate of the Y carriage component constant notwithstanding carriage motion in the X direction.

Should the Y-drive drum 161 be rotated in the direction of arrow 165 driving to the reaches $R_{y2}$—$R_{y9}$ in the direction of arrow 166, and moving the Y carriage component in the direction of arrow 167, the X-drive drum 101 is free to remain stationary, thereby preventing motion from being imparted to the X carriage component. In fact, motion of the Y carriage component results in absolutely no motion being imparted to the X cable reaches $R_{x1}$—$R_{x9}$. The independent nature of the X and Y carriage components, which permits one of the two carriage components to be moved without imparting motion to the other, also permits each of them to be moved in their respective directions without interfering with the motion of the other in its own direction.

To render the Z carriage component independent of the X and Y carriage components, the motor 201 is provided with the clutch 210 and the sprocket 182 is provided with a brake 209. The clutch 210 and the brake 209 operate together, the brake being engaged when the clutch 210 is disengaged and the clutch 210 being engaged when the brake is disengaged. More specifically, when the X or Y carriage components are being driven, the brake 209 is applied preventing any motion from being imparted to the chain 180 by the cable driven drum 194. Simultaneously with the application of the brake 209, the clutch 210 is disengaged permitting the drum 200 to idle or free wheel relative to the Z motor shaft 202. The free wheeling of the drum 200 permits adjustments in the lengths of the Z reaches which necessarily occur when the Z carriage component is moved in either the X or Y direction or both in response to motion of either the X or Y carriage component or both.

When Z direction motion of the Z carriage component is desired, the X servo motor and Y servo motor 102 and 162 are stopped, preventing rotation of the drums 101 and 161 which prevents X motion of the X carriage component and Y motion of the Y carriage component, respectively. With the X and Y carriage components maintained stationary, the clutch 210 engaged, and the brake 209 disengaged, rotation of the Z drive drum 200 in response to rotation of the Z drive motor 201 operates to impart Z direction motion to the chain 180.

Conveyor Transport Assembly

The conveyor transport 21 which is effective to transfer cartridges between the direct access station 22 and the direct access port 54 includes a U-shaped channel member 240 having upstanding sides 241 and 242 joined by a horizontal connecting member 243, as shown more particularly in FIGS. 25, 26, 27 and 28. The U-shaped channel member 240 further includes a pair of flanges 244 and 245 extending laterally from the vertical edges of the left-hand ends of side members 241 and 242. The flanges 244 and 245 permit the conveyor transport to be conveniently mounted to the direct access station 22.

A U-shaped platform 247 having depending sides is connected to the channel member 240 by a parallel motion mechanism including links 248 and 249. The parallel links 248 and 249 at their lower extremities are pivotally supported by pins 250 and 251. The pins 250 and 251 extend transversely of the channel member 240 and have their ends secured in the side members 241 and 242. The parallel links 248 and 249 at their upper extremities are connected to the platform 247 by pins 252 and 253. The pins 252 and 253 are secured to the underneath surface of the platform 247. The platform 247 is provided with platform extensions 255 and 256 at each of its ends. These platform extensions 255 and 256, in addition to extending the length of the platform 247, also serves to rotatably support on a set of pins 257 and 258, respectively, a set of drums 259 and 260, respectively, over which a pair of conveyor belts 261 and 262 are adapted to run. The extension 255 also rotatably supports on the pin 257 a sprocket 263.

A conveyor motor 264 having a shaft 265 upon which is mounted a sprocket 266 is secured to the outside of the side channel member 242 for driving the conveyor belts 261 and 262 via a chain 267 which trains over the motor driven sprocket 266 and the sprocket 263. A rotary solenoid L39 having a shaft 271 is mounted to the outside surface of the channel side member 241 with the shaft passing through a suitable aperture formed in the side member 241. Secured to the end of the shaft 271 is eccentrically mounted pin 272 which travels in a slot 274 formed in the parallel link 248.

The conveyor assembly 21 further includes a pair of spaced parallel upstanding cartridge guides 268 and 269 suitably connected at their lower edges to the depending legs of channel member 247. The guides 268 and 269 are adjacent the conveyor belts 262 and 261, respectively, and function to guide a cartridge while moving on the conveyor belts.

In use, the left-hand end 275 of the conveyor assembly 21 is positioned adjacent a cartridge holder 350 (see FIG. 38) located at the direct access station 22. When so positioned, the left-hand end 275 of conveyor assembly 21 cooperates with a cartridge supporting shelf 276 of the cartridge holder 350 of station 22 and the platform 247 of the conveyor assembly. The right-hand end 277 of the conveyor assembly 21 in use is adapted to extend into the direct access port 54. When so positioned, the right-hand end 277 of the conveyor assembly 21 cooperates with a cartridge support shelf 278 forming the bottom of the direct access port 54 with which it is associated.

Figures 27, 28:
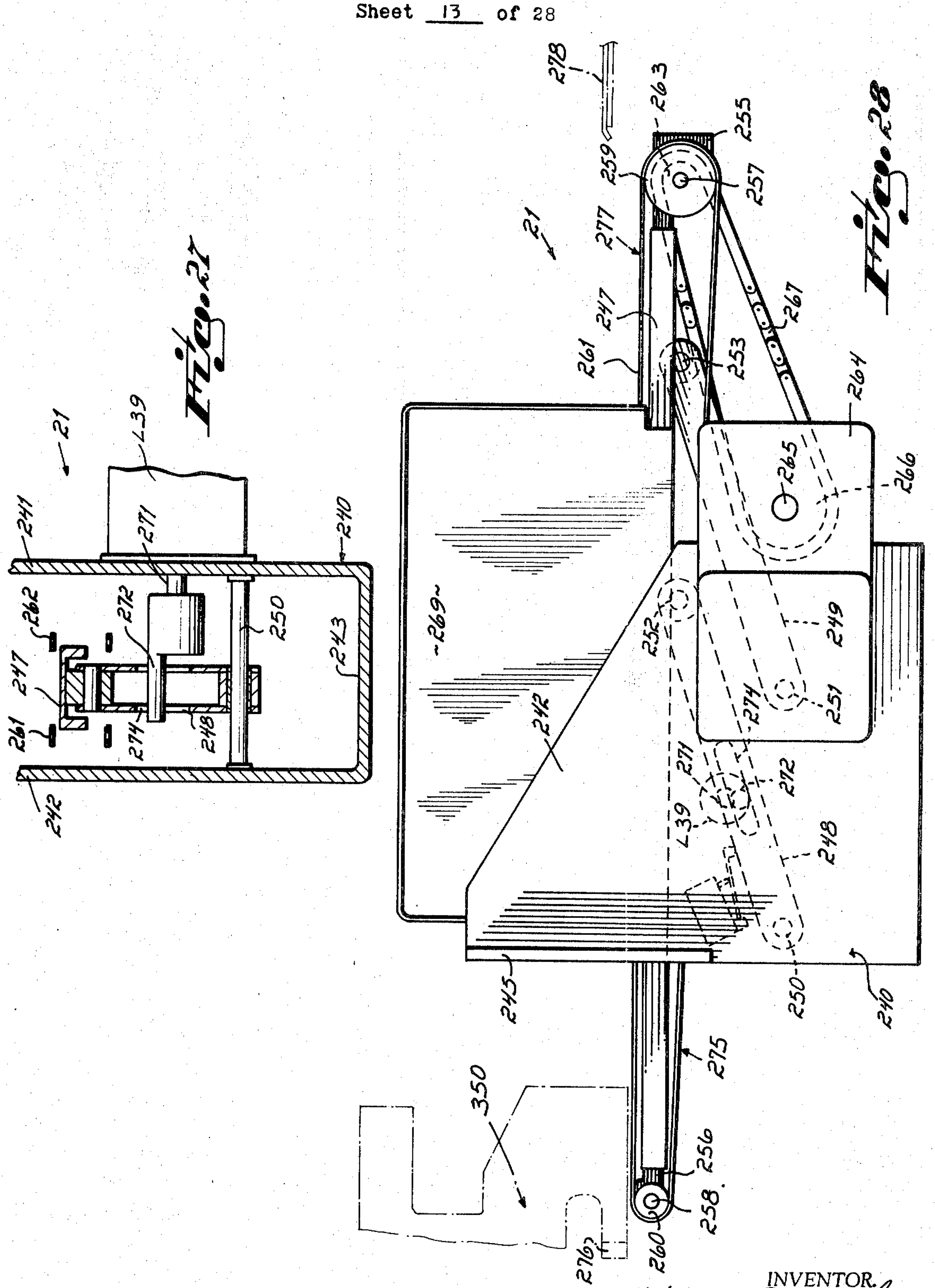

In operation, when it is desired to transfer a cartridge between the direct access port 54 and the direct access station 22, the platform 247 carrying the moving conveyor belts 261 and 262 is elevated by energizing the solenoid L39 in a sense such that the eccentric pin 272 is driven counterclockwise, as viewed in FIG. 28. This motion of the pin 272 causes the parallel link 248 to be pivoted about its lower end by the pin 250 in a counterclockwise direction, effectively raising the platform 247 and the belts 261 and 262. Specifically, the platform 247 and the belts 261 and 262 are raised relative to the shelf 276 of the direct access station 22 and the shelf 278 of the direct access port 54 from the position shown in FIG. 28 to the position shown in FIG. 26.

Figures 25, 26:
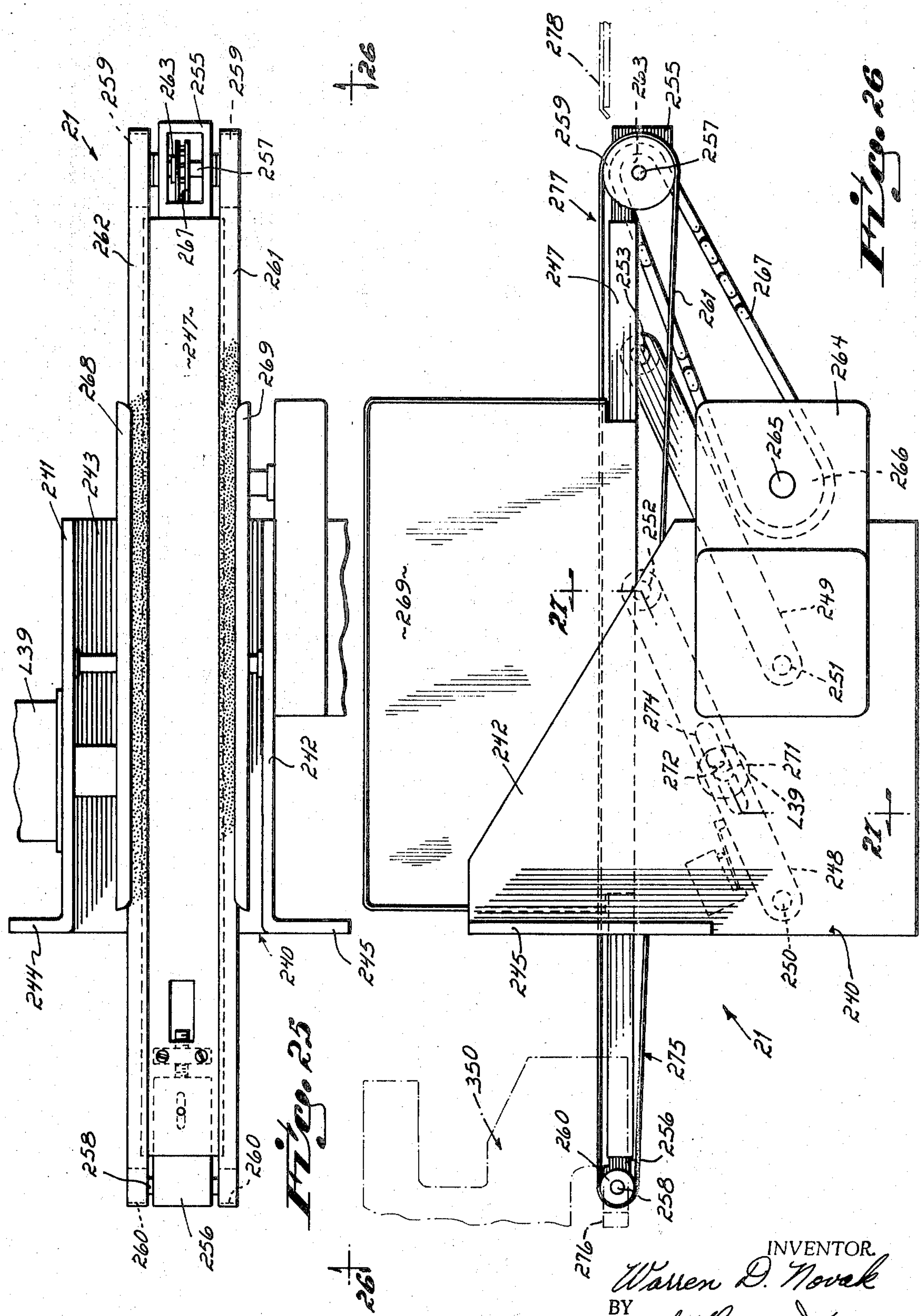

With the platform 247 raised to the position shown in FIG. 26, the upper runs of the belts 261 and 262 are substantially parallel with the shelf 278 of the direct access port 54. With the upper conveyor belt runs so located, a cartridge inserted into the direct access port 54 by the carriage has its bottom surface 37 engaged by the right-hand end of the conveyor belts whereupon it is picked up by the conveyor and transported across the platform 247 for insertion into the direct access station cartridge holder 350. Likewise, a cartridge being transferred from the cartridge holder 350 to the direct access port 54 is frictionally driven by the right-hand conveyor belt ends onto the shelf 278 of the direct access port.

In addition, with the platform 247 in its upper position, as shown in FIG. 26, the left-hand ends of the conveyor belts 261 and 262 are located slightly above the shelf 276 of the cartridge holder 350. With the upper conveyor runs so located relative to the shelf 276, a cartridge positioned on the conveyor belts and being transported to the direct access station 22 is transferred onto the shelf 276 without the risk of having the lower leading edge of the cartridge abut the shelf 276 and thereby prevent it from being fully transferred onto the shelf. In addition, with the conveyor runs so located relative to the shelf 276, when it is desired to transfer cartridges from the direct access station cartridge holder 350 to the platform 247, the upper conveyor runs being located slightly above the shelf 276 effectively raise the cartridge off the shelf insuring that there is the degree of frictional engagement between the conveyor belts 261 and 262 and the bottom surface 37 of the cartridge necessary for picking it up and conveying it from the direct access station 22 to the conveyor platform 247.

When a cartridge has been transported from the direct access port 54 to the access station 22, the platform 247 and conveyor belts 261 and 262 are lowered, permitting the cartridge to properly seat on the shelf 276. Lowering of the platform 247 and the conveyor belts 261 and 262 is effected by operating the solenoid L39 such that the eccentric pin 272 pivots the parallel link 248 at its lower end about the pin 250, dropping the platform 247 and the conveyor belts 261 and 262 to a point beneath the upper surface of the shelf 276, effectively clearing the bottom surface of a cartridge positioned on the shelf 276, as shown more particularly in FIG. 28.

Cooperating with the bulk access station 28 and the bulk access port 53 is a bulk access conveyor assembly (not shown in detail) which is substantially identical in principle to the conveyor assembly 21, although simpler in construction. The bulk access conveyor assembly performs for the bulk access station what the direct access conveyor assembly 21 achieves for the direct access station 22, namely, the conveying of cartridges between the bulk access port 53 and the bulk access station 28.

Figure 31:
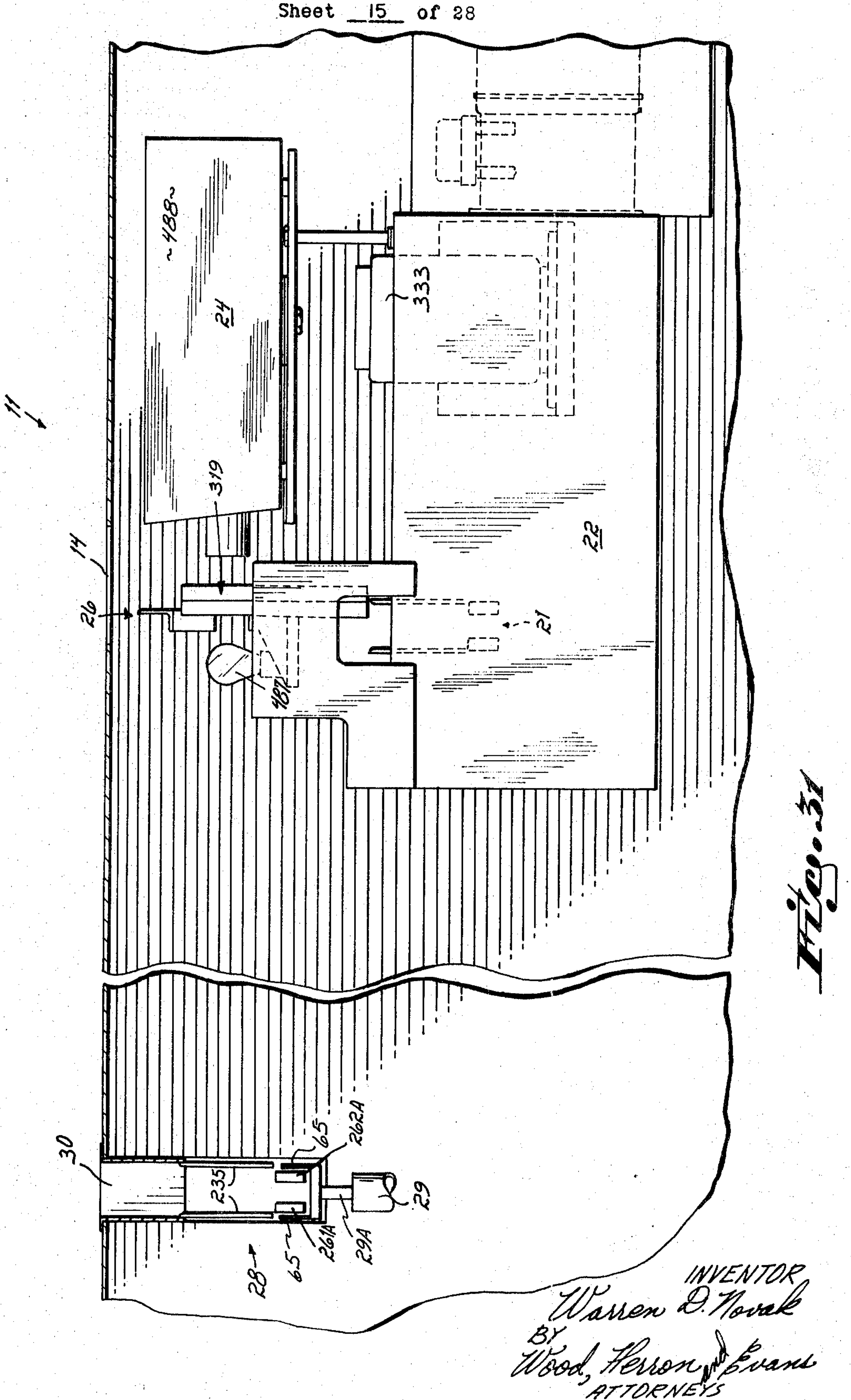

The bulk access conveyor assembly (not shown in detail), like the direct access conveyor assembly 27, includes a pair of spaced conveyor belts 261A and 262A, end views of which are shown in FIG. 31. The conveyor belts 261A and 262A are mounted on suitably spaced sprockets (not shown) such that the upper runs of the conveyor belts are substantially horizontal and, at one end, flush with the bottom of the bulk access port 53. The ends of the conveyor belts 261A and 262A opposite the ends associated with the bulk access port 53 extend into the bulk access station 28 a distance less than the length of a cartridge for reasons to become apparent, permitting a cartridge to be conveyed to, and fully inserted in, the bulk access station 22. Cooperating with those portions of the conveyor belts 261A and 262A extending into the bulk access station 28 are a pair of upstanding cartridge guide members 235 disposed parallel to the conveyor belts. The guide members 235 are spaced apart a distance slightly greater than the width of a cartridge and function to properly position, in the bulk access station 28, a cartridge transported from the bulk access port 53 to the bulk access station.

Also cooperating with the conveyor belts 261A and 262A is the ram 29 and a cartridge clamp (not shown). The cartridge clamp is actuated by a solenoid L43 (shown only in FIG. 43) which becomes energized when a switch S17 (also shown only in FIG. 43) is tripped by the arrival of a cartridge in the bulk access station 28. The ram 29 includes a plunger 29A vertically reciprocable in response to the actuation of a card lift solenoid L42, and a set of four vertical fingers 65 mounted to the plunger 29A and spaced such as to slide in different ones of slots 59 formed in the interior of the walls 35 of a cartridge when the ram 29 is lifted. The solenoid L42 is energized when a switch S16 (shown only in the circuit of FIG. 43) is tripped when a cartridge properly positioned in the bulk access station is clamped by the cartridge clamp (not shown). The solenoid L42 is deenergized thereby lowering the ram when the return key 620 is actuated. Lowering of the ram trips switch S17 deenergizing the clamping solenoid L43 to thereby unclamp the cartridge. The plunger 29A associated with the solenoid L42 is positioned in the bulk access station beyond the conveyor belts 261A and 262A at a point such that when a cartridge is properly positioned in the bulk access station the fingers 65 are aligned with the slots 59 in the cartridge walls 35. Upward plunger motion urges the fingers 65 into the slots 59 of the cartridge walls 35, driving the cards upwardly to a point wherein the cards extend through the bulk transfer slot 30 for inspection or manual removal. The plunger 29A is lowered to return the cards to the cartridge for subsequent transfer of the cartridge to the bulk access port and thence to the carriage for return to the appropriate storage compartment, when the return key 620 is actuated, deenergizing the solenoid L42. The fingers 65, by seating in the slots 59 of the cartridge wall during card removal, insure that all the cards in the cartridge, including the ones adjacent the cartridge walls, are urged upwardly for removal when the solenoid L42 is energized.

Figure 41:
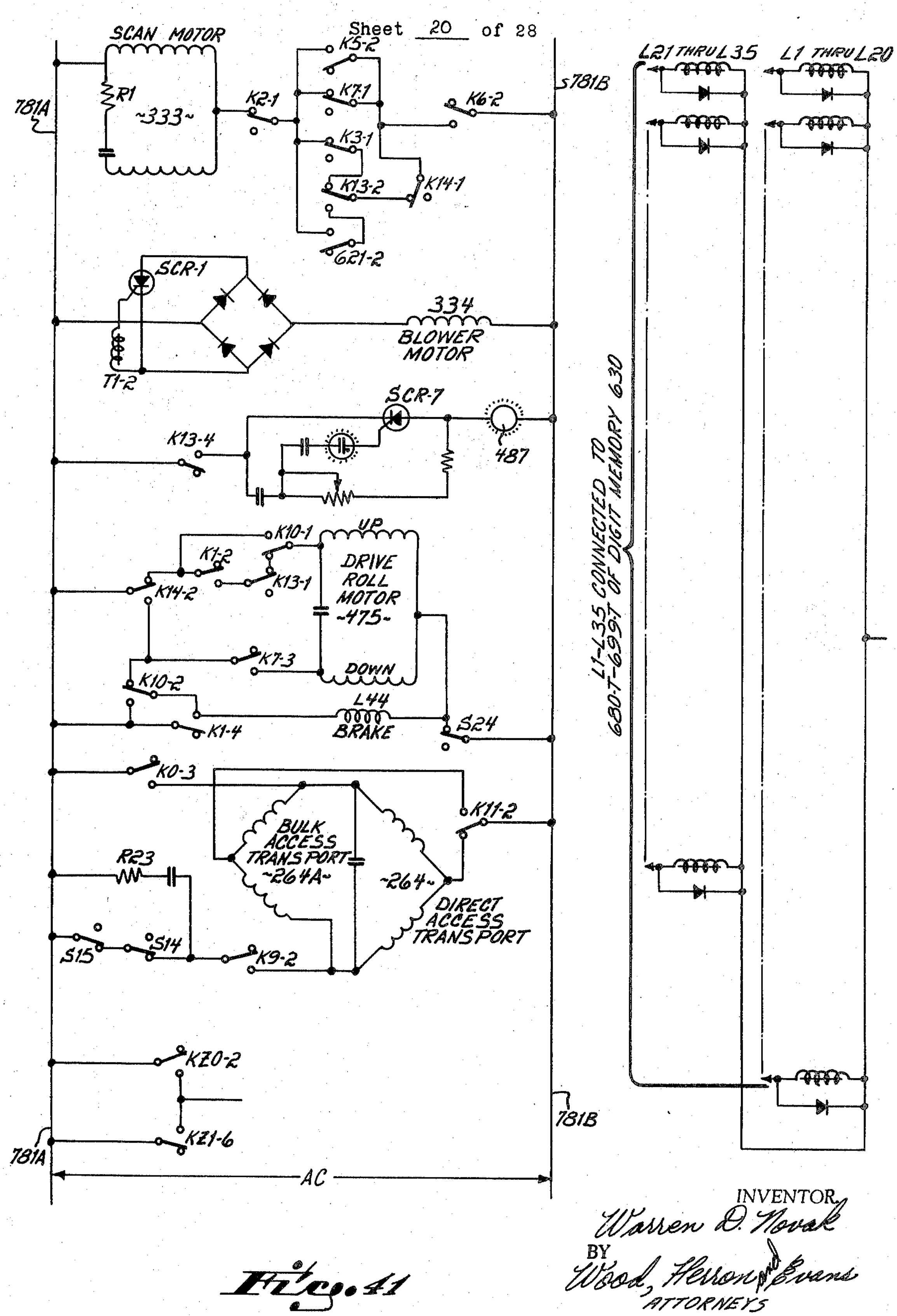

The conveyor belts 261A and 262A are drivingly coupled to a motor 264A (shown only in the circuit of FIG. 41). The motor 264A which drives belts 261A and 262A of the bulk access transport assembly is connected in parallel with the motor 264 which drives the belts 261 and 262 of the direct access transport assembly 21. Consequently, the belts 261—262 and 261A and 262A, when driven, operate in the same direction and for the same period of time.

The sprockets mounting the conveyor belts 261A and 262A of the bulk access conveyor are not shiftable in the vertical direction, as are the sprockets 259 and 260 and the belts 261 and 262 of the direct access conveyor assembly. Lowering of the bulk access conveyor belts when a cartridge is positioned in the bulk access station 28 is unnecessary since the cartridge, upon arrival at the bulk access station is elevated by the ram 29, raising the cartridge off the belts 261A and 262A and thereby preventing belt wear.

As those skilled in the art will appreciate, it is possible with minor modifications to provide for elevation of the cartridge, as well as the cards, at the bulk access station. However, it has been found in practice that it is not desirable to permit the cartridge to be removed by the operator inasmuch as it is possible that, upon return of the cartridge to the bulk access station, the cartridge will have been reversed end for end causing the detent 36 to be mispositioned. This then prevents the cartridge, upon return to its storage compartment, from properly registering therein since its detent 36 is now at the rear of the pocket rather than at the front where it can seat in the slot 42.

Transfer of Cartridge to and from Storage Compartment and Access Ports

Prior to extraction of a cartridge 16 from its associated storage compartment 15, the bottom surface 37 of the cartridge is in contact with and supported by the upper surface of the horizontal separator 40 comprising the bottom of the storage pocket. In addition, the detent lug 36 is seated in the cartridge locating slot 42 and the rear end of the cartridge abuts the cartridge stop 44 as depicted, for example, by the cartridges on the right-hand storage wall of FIGS. 6—9. Assuming that the tang 184 is in its normal home position as shown in FIG. 19, that the carriage is located opposite the storage compartment in which the cartridge 225 is located, and that the surface 146 of the cartridge supporting shelf 145, is flush with the bottom surface of the storage compartment 224, the extraction cycle is initiated by having the X and Y servo drive movement completed so that their respective null circuits have closed, and thus empowered the Z servo drive to begin its cycle, energizing the Z-servo motor 201, disengaging the brake 209, and engaging the clutch 210. For cartridge extraction, clutch 210 is energized and energization of the Z-servo motor 201 is in a sense such that the shaft 202, drums 200 and 194, and sprockets 181 and 182 are rotated in the direction of the arrows 205 and 208 as viewed in FIG. 14. Rotation of these members in this sense then drives the tang 184 from the position shown in FIG. 19 to the position shown in FIGS. 6 and 22 causing the tang 184 to engage the recess 49F.

Figure 20:
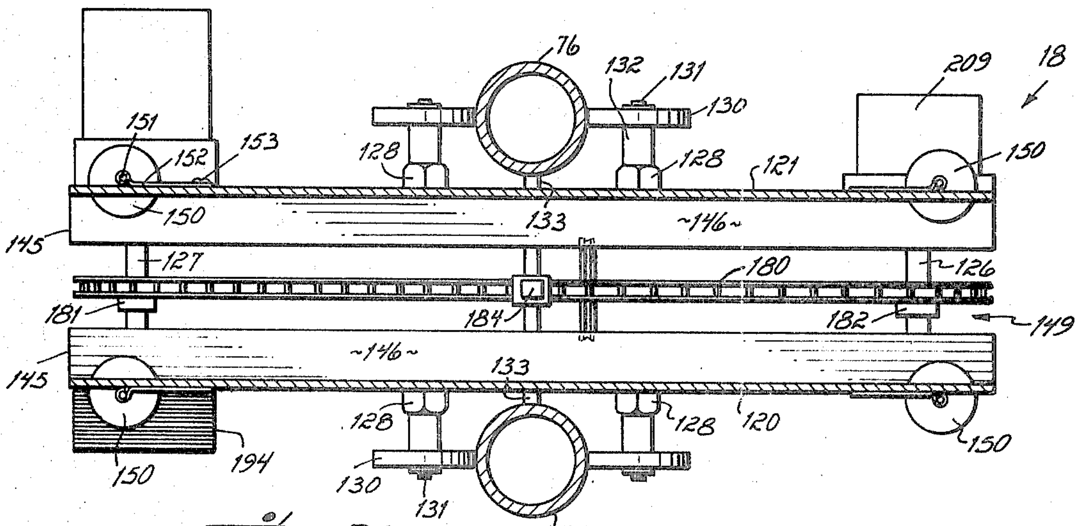
Figure 22:
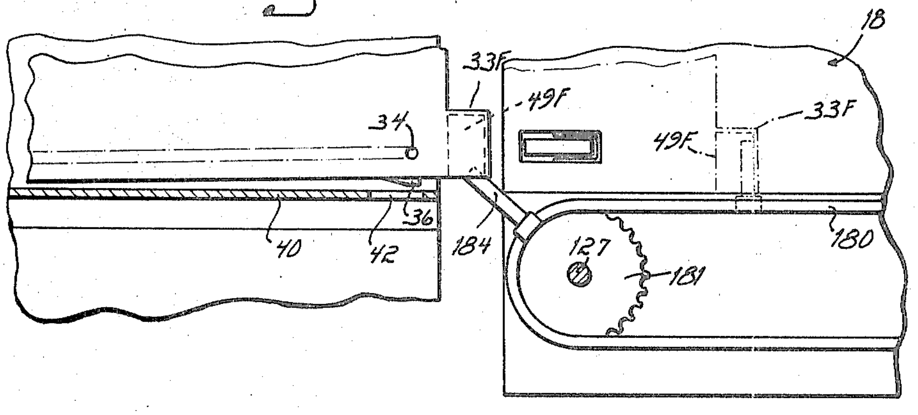
Figure 23:
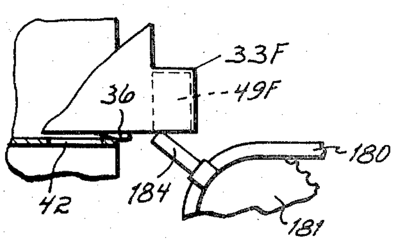

When the tang 184 initiates engagement of the recess 49F, the tang 184 is angled at approximately 45° to the horizontal as shown best in FIGS. 6 and 22. With the tang so oriented, the force exerted by the tang on the front cartridge extension 33F of the cartridge 225 of FIG. 6 is such as to have substantially equal components in both the vertical and horizontal directions. The vertical component is effective to left the front cartridge extension 33F upwardly thereby disengaging the detent lug 36 from the cartridge locating slot 42, as shown in detail in FIG. 22. The horizontal component of force exerted by the tang 184 on the front cartridge extension 33F, which is directed toward the carriage space 17 in the direction of cartridge extraction is effective to slide the cartridge 225 toward the right as viewed in FIGS. 6 and 20, extracting it from its storage compartment 224. Continued motion of the tang 184 to the right transfers the cartridge 225 to a position on the support surface 146 of the shelf member 145 shown in phantom in FIG. 20. Further rotation of the sprocket 181 driving the tang 184 rightwardly as viewed in FIG. 20, is effective to transfer the cartridge 225 completely onto the shelf members 145 as shown in FIG. 7. At this point, the extraction of a cartridge from its associated storage compartment is complete and the Z-servo motor 201 is deenergized, the clutch 210 disengaged, and the brake 209 applied to thereby prevent further movement of the tang 184 which, if it did occur, would cause the cartridge 225 to project from the carriage, possibly resulting in damage to the cartridge.

Extraction of a cartridge 226 positioned in the storage wall opposite that in which the cartridge 225 is stored is effected in substantially the same manner as extraction of the cartridge 226, except that the Z-servo motor 201 is energized in a sense such as to drive the tang 184 in the direction opposite to that described above, from the position shown in FIG. 19. This opposite rotation is effective to engage the tang 184 with the recess 49F of the cartridge 226, withdrawing it leftwardly from its storage compartment 230 onto the cartridge support shelf members 145 of the carriage.

Figure 9:
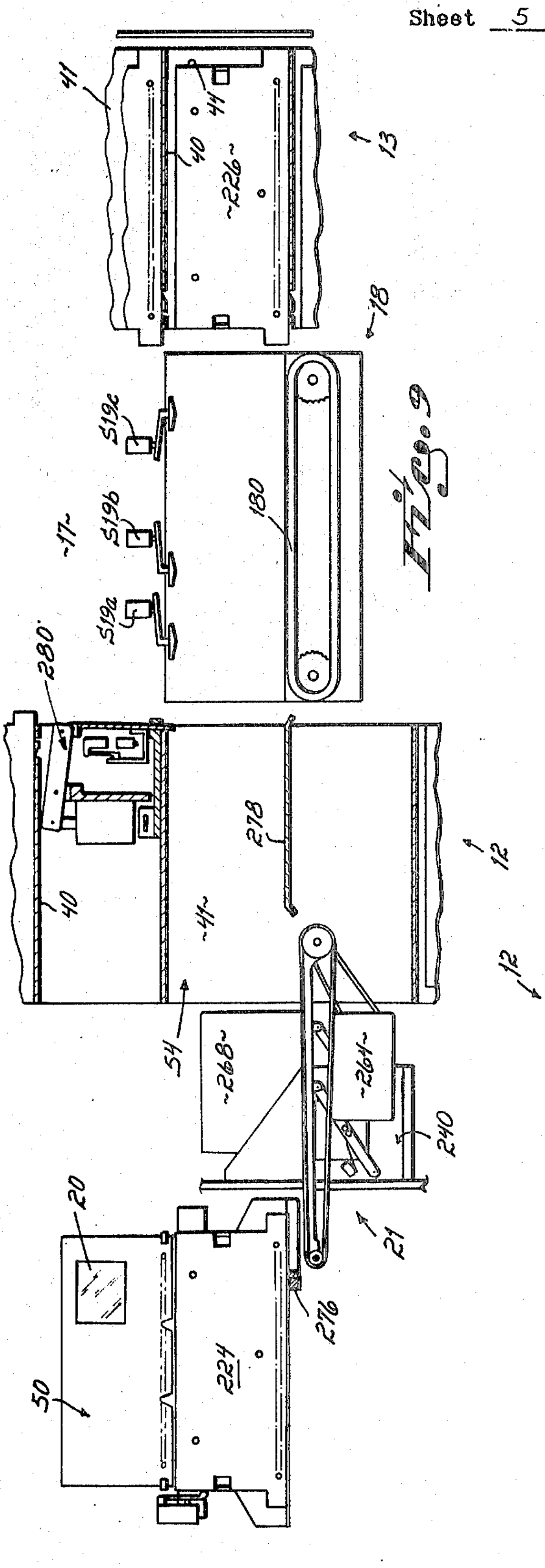

The cartridge 225, once extracted from its associated storage compartment 224 and transferred to the carriage as shown in FIG. 7, is thereafter transferred to the direct or bulk access port 54 or 53, as the case may be, by driving the X and Y servo motors 102 and 162 in a manner such that the carriage is driven to a position opposite, for example, the direct access port 54, as shown in FIG. 8. In this position, the upper surface 146 of the shelf members 145 is substantially flush with the bottom 278 of the access port 54. When the carriage 225 has been so positioned opposite the access port 54, the X and Y servo motors 102 and 162 are deenergized, the Z-servo motor clutch 210 engaged, and the Z-servo brake 209 disengaged. Transfer of the cartridge 225 from the carriage to the access port 54 is then effected by energizing the Z-servo motor 201 in a sense such that the tang 184 moves leftwardly from the position shown in FIG. 7, sliding the cartridge 225 across the shelf members 145 onto the bottom 278 of the access port 54. Continued rotation of the Z-servo motor 201 in the same sense causes the tang 184 to move downwardly disengaging it from the front recess 49F. The Z-servo motor 201 is further driven in the same sense to bring the tang 184 to the home position shown in FIG. 19. With the tang 184 in the home position, the servo motor 201 is deenergized, the clutch 210 disengaged, and the brake 209 applied. Once the cartridge 225 is fully inserted into the access port 54, the raised conveyor assembly (FIG. 8) transports it to the access station 22 or 28 whereupon the conveyor platform 247 is lowered (FIG. 9).

Should the cartridge 226 have been extracted from its storage compartment 230 and transferred to the carriage, transfer to the access port 54 is effected in substantially the same manner as described above with respect to the transfer of the cartridge 225 from the carriage to the access port 54. Such a transfer is effected, however, with a lesser degree of travel of the tang 184. Specifically, with a cartridge 226 on the carriage, the tang 184, while engaged with the recess 49F of the cartridge 226, is located above the sprocket 181 where it obviously needs to be driven to effect withdrawal of a cartridge 226 from a compartment 230 and transferal to the carriage.

Figure 10:
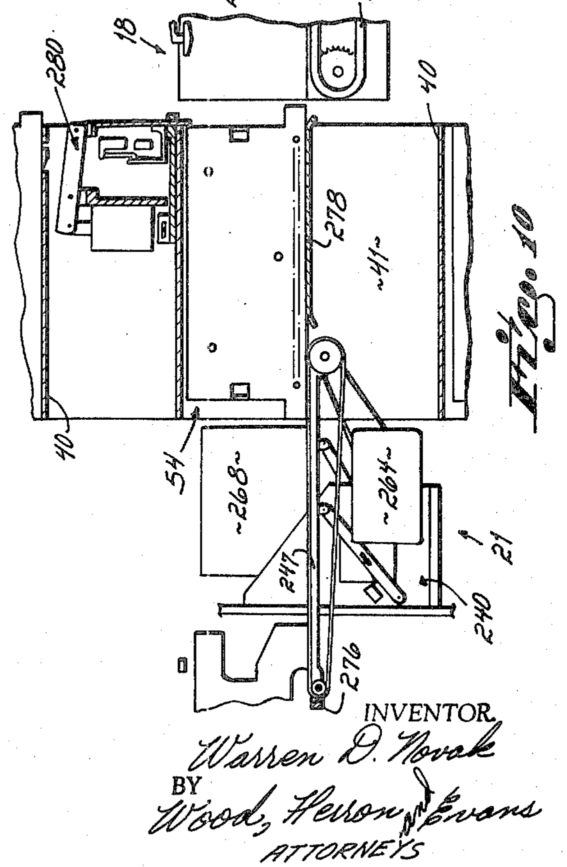

Extraction of the cartridge 225 from the position shown in the access port 54 (FIG. 8) for subsequent transfer to the carriage is effected in the same manner as extraction of the cartridge 225 from the storage compartment 224. That is, the conveyor transport shelf 247 is raised (FIG. 10) and the motor 264 energized to transport the cartridge to the access port 54 (FIG. 10). Additionally, the Z-servo motor 201 is driven in a sense such as to drive the sprocket 181 in a clockwise direction, as viewed in FIG. 8, causing the tang 184 to engage the front wall of the recess 49F of the cartridge to simultaneously raise the cartridge extension 33F upwardly and drive the cartridge 225 onto the carriage. When the tang 184 is driven to the position shown in FIG. 7, the Z-servo motor 201 is disengaged, the brake 209 applied, and the clutch 210 disengaged.

Return of the cartridge 225 to its storage compartment 224 is effected, once the carriage has been properly positioned opposite the compartment 224, by driving the Z-servo motor 201 in a sense such that the sprocket 181 moves in the counterclockwise direction as viewed in FIG. 7. With the sprocket so driven, the tang 184 moves leftwardly from the position shown, sliding the cartridge across the shelf members 145 to thereby transfer it to its storage compartment 224. The continuing movement of the sprocket 181 in the counterclockwise direction eventually causes the tang 184 to become disengaged from the recess 49F as shown in detail in FIG. 23. At this point, the cartridge 225 usually has had sufficient forward motion inertia to insert it sufficiently into its compartment 224 to cause the detent lug 36 to seat in the cartridge locating slot 42.

Figure 11:
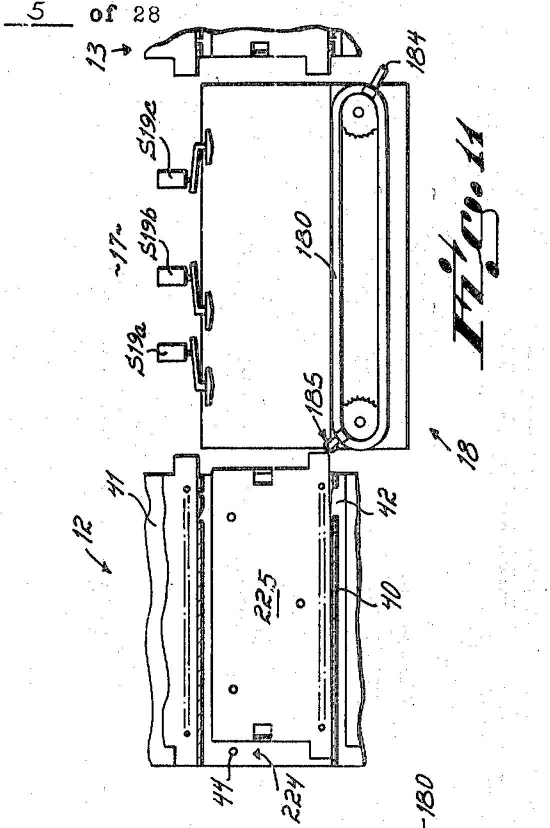

However, should the cartridge detent lug 36 fail to seat under the action of the tang 184, further movement of the cartridge 225 into compartment 224 for ultimately seating the lug 36 in the cartridge locating slot 42 is produced by further rotation of the sprocket 181 in a counterclockwise direction to the position shown in FIGS. 11 and 24. Continued sprocket rotation causes the wheel assembly 185 to move to the position shown in FIG. 11 where it drives the cartridge sufficiently into the compartment 224 to cause the cartridge stop 44 to abut against the rear end of the cartridge 225, causing the detent lug 36 to properly seat in the cartridge locating slot 42. As shown in detail in FIG. 24, the action of the wheel assembly 185 is such as to apply both horizontal and vertical components of force to the cartridge 225, these components of force taken in conjunction with the reaction force provided by the cartridge stop 44 against the upper corner of the rear end of the cartridge is effective to apply a moment M to the cartridge in the clockwise direction as viewed in FIG. 24, seating the lug 36 in the locating slot 42.

The slot 187 in the yoke 186 of the wheel assembly 185 permits the wheel 189 to move radially inwardly toward the axis of the sprocket 181 thereby permitting the wheel 189 to clear the front recessed extension 33F of the cartridge subsequent to the cartridge seating phase of the insertion cycle. As noted previously, it has been found that the combination of the reaction force provided by the cartridge stop 44 against the upper corner of the leading edge of the cartridge 225 in conjunction with the force exerted by the wheel 189 against the recessed extension 33F of the cartridge is effective to prevent the cartridge from bouncing back out of its storage compartment as the wheel assembly 185 passes downwardly from the position shown in FIG. 24 clearing the recessed cartridge extension. This prevention of cartridge "bounce back" eliminates undesirable projections of cartridges into the carriage space 17, thereby preventing subsequent damage to the carriage or cartridge as the carriage moves in the carriage operating space.

Should the cartridge 226 have been located on the carriage, transfer of the cartridge to its storage compartment is effected in much the same manner as transfer of the cartridge 225 to the storage compartment 224. However, the sprocket 181 is rotated in the clockwise direction as viewed in FIG. 7, driving the cartridge into the compartment 230. Continued motion of the sprocket 181 in the clockwise direction completes the reinsertion phase of operation. The combined action of the wheel assembly 185 and the cartridge stop 44 of the storage compartment on the cartridge 226 applies a moment to the cartridge for seating its lug 36 in the slot 42 in the same manner as described previously with respect to the proper positioning of the cartridge 225 in the compartment 224.

Figure 18:
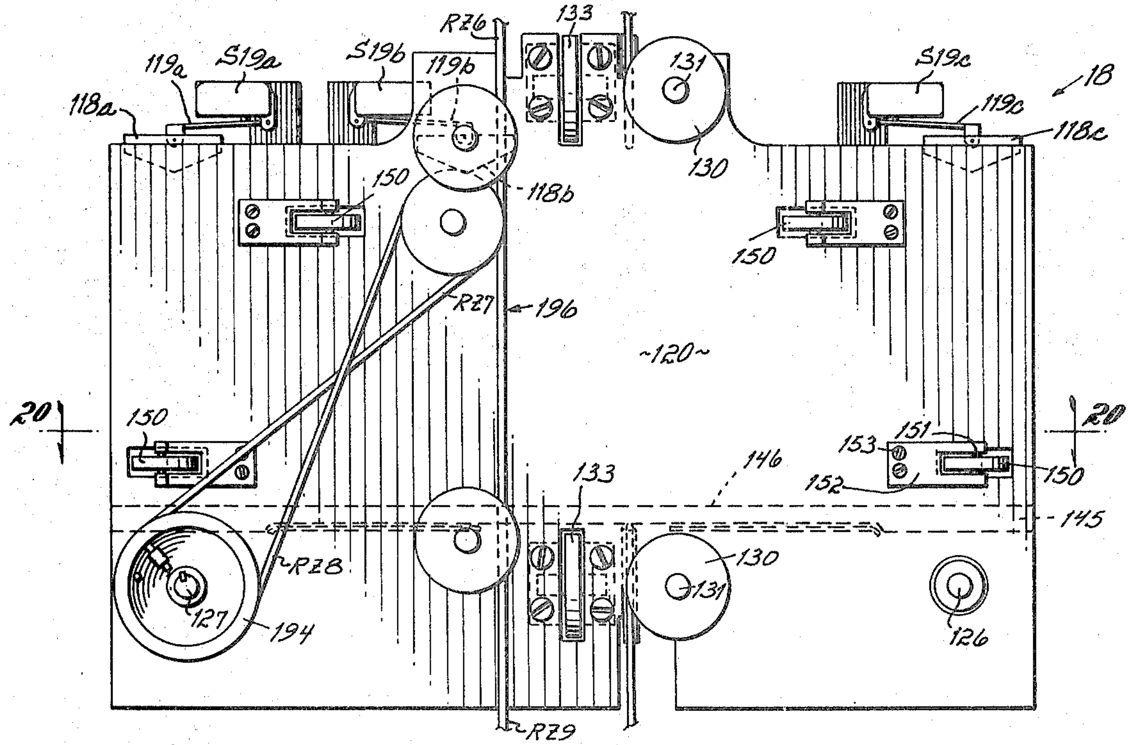
Figure 19:
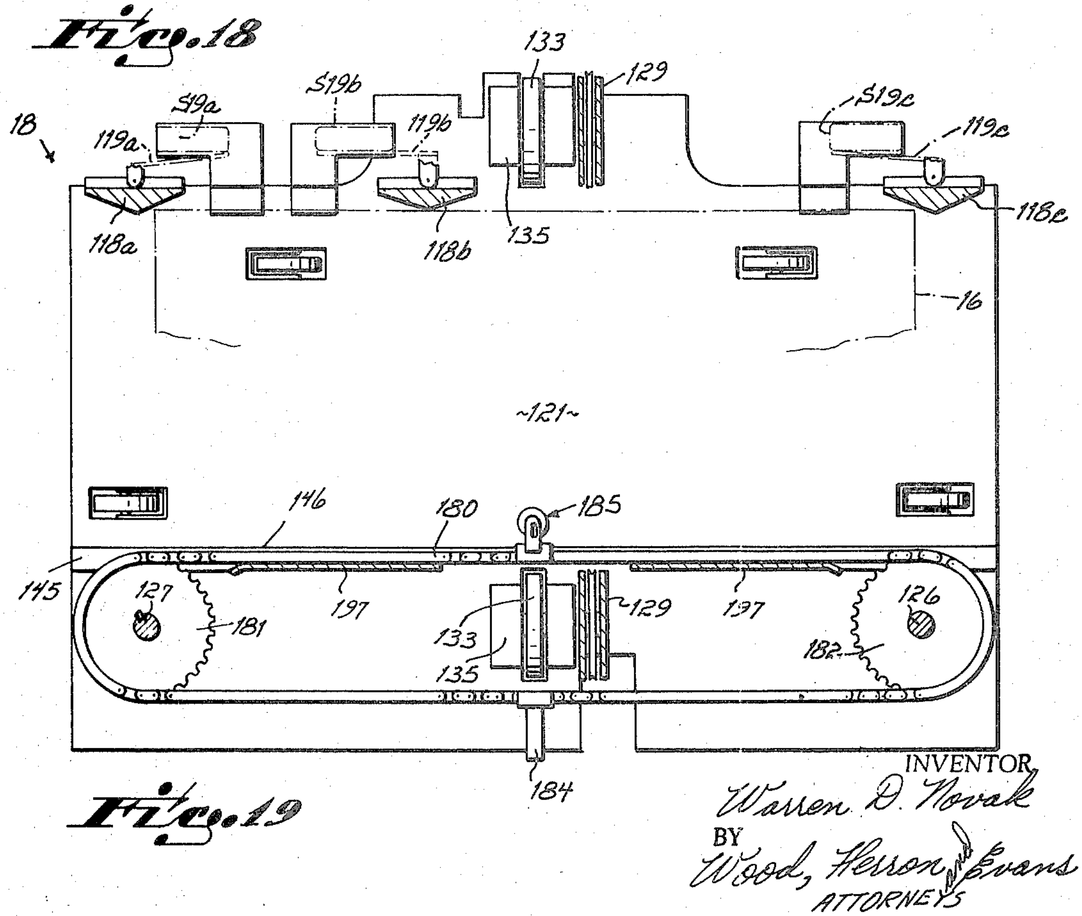
Figure 49:
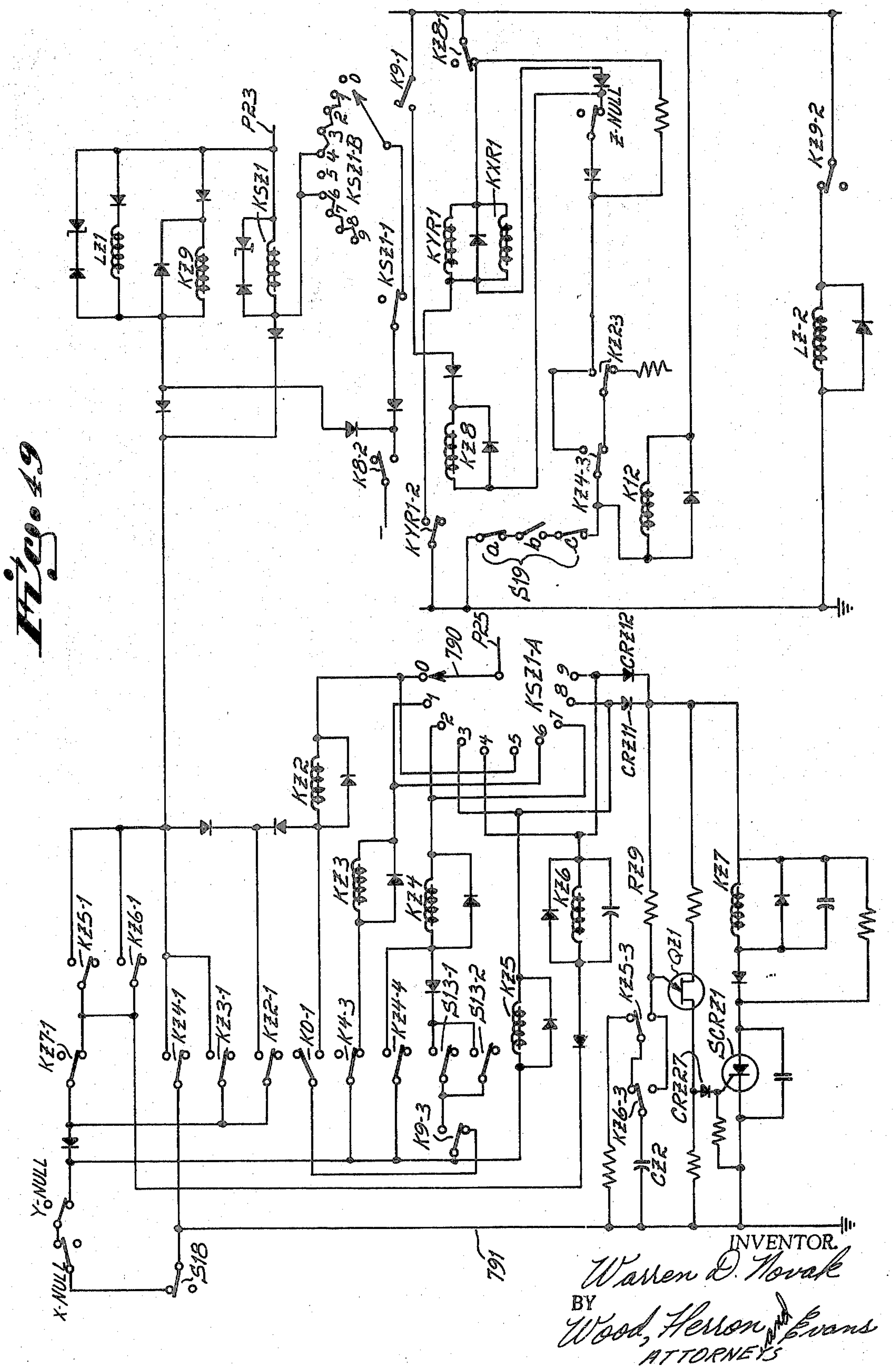

A limit switch arrangement S19, including the series connected combination of a normally closed limit switch **S19*a*, a normally open limit switch S19*b*, and a normally closed limit switch S19*c*, is provided on the Y carriage component, as shown in FIGS. 18, 19, and 49, to sense the presence of a cartridge properly positioned on the platform 145. The switches S19*a*, S19*b* and S19*c* are mounted on suitable supports between the upper edges of the Y carriage component side plates 120 and 121, have cam blocks 118*a*, 118*b* and 118*c*, respectively, pivotally suspended from the free ends of their switch actuating arms 119*a*, 119*b* and 119*c*, respectively. The switches S19*a*, S19*b* and S19*c* and their associated cam blocks 118*a*, 118*b* and 118*c* are positioned relative to the cartridge support shelf 145 of the Y carriage component such that a cartridge properly positioned on the carriage raises only the cam block 119*b*, actuating only the normally open switch S19*b*, while leaving the cam blocks 118*a* and 118*c* in their normal lower positions and the normally closed switches S19*a* and S19*b* unactuated. Consequently, the series connected switch contacts of switches S19*a*, S19*b* and S19*c* are all simultaneously closed, completing a circuit, only when the cartridge is properly positioned on the shelf 145 as shown in FIG. 19**.

In the course of transferring a cartridge to or from the carriage, one of the cam blocks **118*a* or 118*c* is actuated depending upon the wall from which, or to which, the cartridge is being transferred, momentarily opening one or the other of normally closed switches S19*a* and S19*c*. Should a cartridge be mispositioned on the shelf 145, one or the other of the cam blocks 118*a* or 118*c* is raised by the cartridge, opening one or the other of the normally closed switches S19*a* or S19*c*, thereby interrupting the series circuit arrangement including switches S19*a*, S19*b*, and S19*c***.

An important advantage of the carriage 18, pocket 15 and cartridge 16 structure and the manner in which they cooperate with each other is that placement of the carriage opposite a pocket 15 prior to a cartridge transfer operation need not be done with extreme accuracy. In fact, in practice it has been found that satisfactory transfer of a cartridge between the carriage and a pocket occurs even with errors in placement of the carriage relative to the storage compartment as large as plus or minus one-eighth of an inch in the X direction and plus or minus one-sixteenth of an inch in the Y direction. Such relaxed carriage positioning tolerances permit a servo drive system of more economical design to be utilized in the control of the carriage. The specific structural features of the carriage, cartridge and pocket construction which enable the carriage placement operation to tolerate errors include the use of a tang 184 which has a width substantially less than the width of the cartridge recess 49 which it engages during cartridge transfer operations. A further contributing factor is the use of bias rollers 150 for centering a cartridge once transferred to the carriage, thereby enabling a cartridge initially misaligned in the X direction relative to the carriage to become, upon transfer to the carriage, centered between the carriage side plates 120. A still further factor contributing to the relaxation of positioning tolerances is the use of a cartridge which in the X and Y directions is dimensioned less than the width and height of a pocket in which it is normally stored, as well as less than the width and height of the carriage space 149 in which cartridges are placed during transfer between the access ports and the storage compartments.

Access Port Gate Assembly

Figures 29, 30:
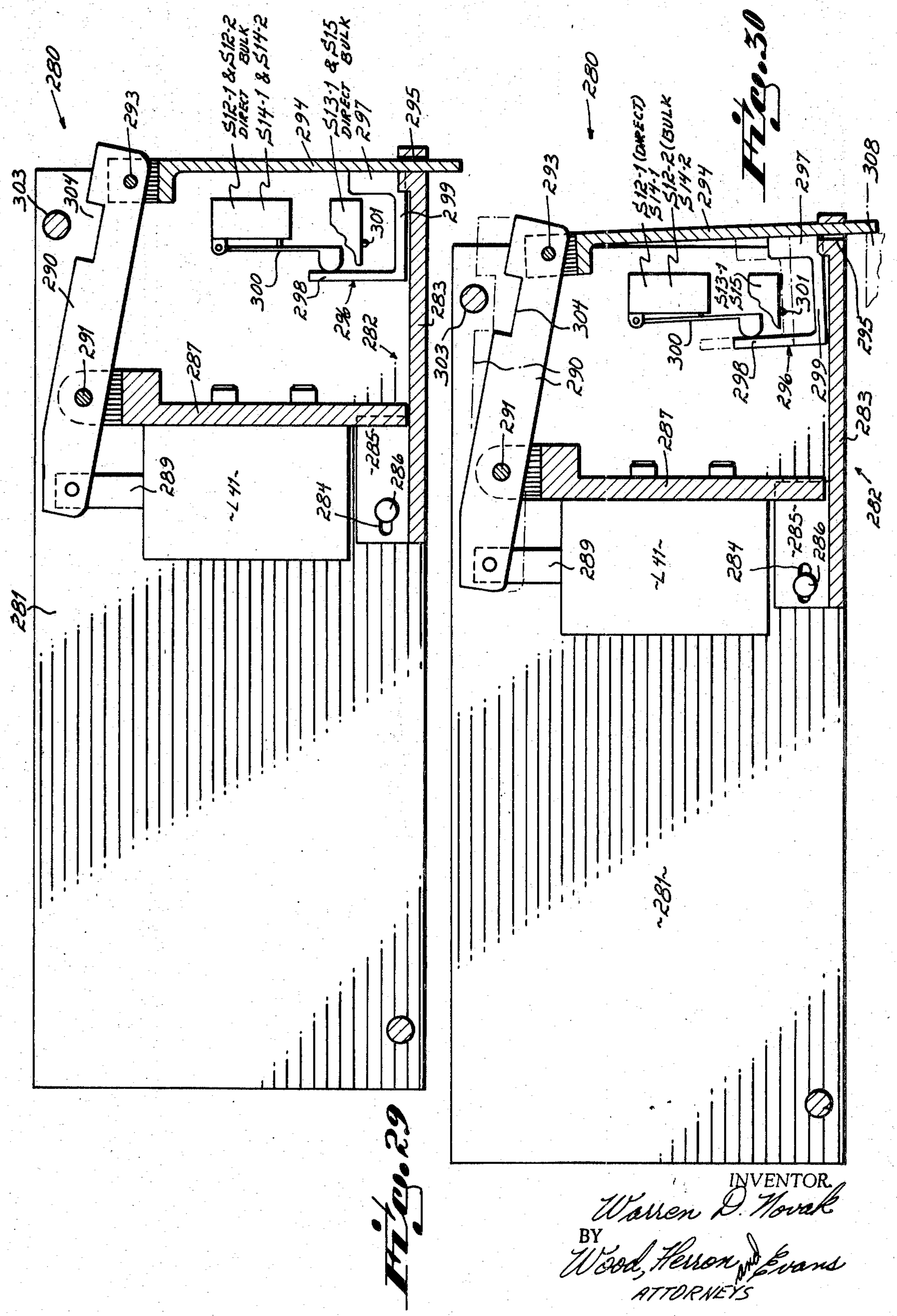

A direct access port gate assembly 280 is shown in FIGS. 29 and 30. This gate is designed to be used in conjunction with the direct access port 54 and, consequently, is positioned in an empty storage compartment located directly above the direct access port. The overall function of the direct access port gate assembly 280 is to properly align and locate in the direct access port a cartridge which has been transferred from the direct access station by the conveyor transport 21, prior to engagement thereof by the tang 184 of the carriage for transfer from the direct access port to the carriage.

Included in the gate assembly 280 is a frame member 281 dimensioned to snugly fit into the empty pocket 15 located above the direct access port 54. Connected to the frame 281 is a slide assembly 282. The slide assembly 282 includes a bottom plate 283 adapted to slide on the bottom of the empty storage compartment in which the gate assembly is located. The extent of the sliding motion of the bottom plate 283 is established by a horizontal slot 284 formed in an upstanding ear 285 fixed to the bottom plate 283. The slot 284 cooperates with a pin 286 secured to the frame 281. The pin 286 limits the extent of travel of the slide assembly 282 relative to the frame 281.

Mounted between the frame members 281 and spaced above the upper surface of the bottom plate 283 is an upstanding solenoid support 287 upon which is mounted a solenoid L41. The solenoid L41 has its armature 289 pinned to a lever 290 which is fulcrumed about a pin 291 extending horizontally from and mounted to the upper end of the solenoid support 287. Extending from the outer end of the lever 290 and mounted about a horizontally extending pin 293 secured to the lever 290 is a vertically reciprocable cartridge gate 294. The gate 294 at its lower end passes through a vertical slot 295 formed in the outer end of the bottom plate 283.

A U-shaped switch tripping member 296 having its one arm 297 secured to the inner surface of the gate 294 is provided to actuate switches S12-1 and S14 when the gate 294 has moved to the position shown in solid lines in FIG. 30, and further to actuate switch S13-1 when the gate 294 has lifted to the position shown in phantom in FIG. 30. Specifically, the switch tripping member 296 is provided with an upstanding arm 298 which, when the gate 294 is moved rightwardly to the maximum extent permitted by the slot 284, as shown in solid lines in FIG. 30, is effective to pivot switch actuating arms 300 of switches S12-1 and S14, thereby actuating these switches. The switch tripping member 296 is provided with a horizontal arm 299 which when the gate 294 is raised to the position shown in phantom in FIG. 30, is effective to depress a button 301, thereby actuating switch S13-1.

The gate assembly 280 is further provided with a horizontally disposed stop pin 303 extending from and mounted to the upper right-hand corner of the gate assembly 280, as viewed in FIGS. 29 and 30. The stop pin 303 in cooperation with a notch 304 limits the counterclockwise pivotal motion of the lever 290 in response to energization of the solenoid L41.

In operation, the solenoid L41 is energized drawing its armature 289 downwardly, in turn, pivoting lever 290 counterclockwise about the pin 291 to thereby raise the gate 294 when it is desired to transfer a cartridge from the carriage to the access port, as shown, for example, in FIG. 8. Referring to FIG. 8, it is seen that the gate 294 is raised clear of the top of the cartridge 225 permitting the cartridge 225 to be transferred from the carriage to the direct access port 54 by the tang 184 without abutting or otherwise mechanically interfering with the lower end of the gate 294 extended below the slot 295.

The solenoid L41 is deenergized permitting the lever 290 to pivot clockwise about the pin 291 lowering the gate 294 to the position shown in FIG. 29, after the cartridge is positioned in the direct access station 22. As shown in FIG. 10, with the gate so positioned, a cartridge being transferred from the direct access station 22 to the access port 54 by the conveyor transport 21 initially is prevented from being conveyed past the point where the corner 308 of the leading end of the cartridge strikes the lower end of the gate 294. This point of maximum transfer, or initial limit of travel, of the cartridge depicted in FIG. 10 is chosen such that the recessed extension 33F of the leading end of the cartridge 225 is oriented to permit proper engagement of the tang 184 with the recess 49F in a manner similar to that shown for the cartridge of FIG. 22, when it is desired to initiate the extraction of a cartridge 225 from the access port 54. Thus, the gate 294 accomplishes the cartridge registering and positioning function relative to a tang for a cartridge located in the direct access port 54, what the detent lug 36 and slot 42 do for a cartridge located in a storage compartment.

Following the transfer of a cartridge from the direct access station to the direct access port and the engagement of the cartridge corner 308 with the gate 294, further translation of the cartridge 225 by the conveyor belts 261 and 262 of the conveyor transport assembly 21 is effective to pivot the gate in a counterclockwise sense about the pin 293 shifting the switch tripping member 296 to the position shown in solid lines in FIG. 30. With the gate 294 so pivoted and the switch tripping member 296 so shifted, the switch actuating arms 300 are pivoted in a counterclockwise sense about their upper ends, actuating the switches S12-1 and S14. The switch S14 stops the motor 264 terminating operation of the conveyor belts 261 and 262. The switch S12-1 starts a timer which, after a suitable delay, causes the solenoid L41 to become energized, lowering the armature 289 to thereby pivot counterclockwise the lever 290 and raise the gate 294 to the position shown in phantom lines in FIG. 30. With the gate 294 raised to the position shown in phantom lines (FIG. 30) the lower extremity of the gate 294 is raised above the upper corner 308 of the cartridge allowing the cartridge to be extracted by the tang 184 of the carriage without abutting or otherwise mechanically interfering with the gate 294.

Lifting of the gate 294 in response to energization of solenoid L41 is also effective to raise the switch tripping member 296 to the position shown in phantom lines in FIG. 30. In this position, the horizontally extending arm 299 depresses the switch button 301 actuating the switch S13-1. The actuation of the switch S13-1 is effective through suitable control circuitry, to energize the Z-servo motor 201 thereby initiating motion of the tang 184 for transferring the cartridge from the direct access port 54 to the carriage.

The gate assembly 280 described above cooperates with the direct access port 54 to properly register cartridges in the direct access port prior to extraction thereof by the tang 184 for transfer to the carriage. A gate assembly (not shown) identical to gate assembly 280 is also provided for cooperating with the bulk access port 53 to register cartridges prior to removal thereof by the tang 184. The bulk access gate assembly includes switches S13-2, S12-2, and S15 having a location and function in the bulk access gate assembly which is identical to that of switches S13-1, S12-1, and S14, respectively, in the direct access gate assembly. That is, switches S12-2 and S15 are actuated in response to abutment of the gate by a cartridge which shifts a switch tripping member and function to start a timer (not shown) which, after a suitable delay, energizes a solenoid (not shown) for raising the bulk access gate, and deenergizes the bulk access conveyor motor 264A to stop the conveyor belts 261A and 262A, respectively. The switch S13-2 is actuated in response to the raising of the bulk access gate and functions to initiate cartridge extraction from the bulk access station by the tang 184.

Direct and Bulk Access Ports

The direct and bulk access ports 54 and 53 are identically constructed and therefore a description of one, namely, the direct access port 54, is sufficient to describe both. Referring to FIGS. 8 and 13, the direct access port 54 is seen to include a pair of parallel side members 41 spaced apart the width of a cartridge, a top member 40 constituting the bottom of the storage pocket immediately above which houses the gate assembly 280, and a bottom or cartridge support shelf 278. The cartridge shelf 278 does not contain a cartridge locating slot 42 such as is formed in the bottoms 40 of the storage compartments in which cartridges are stored. Thus, a cartridge is free to slide on the shelf 278 without the depending cartridge lug 36 engaging the access port bottom 278.

The access port bottom 278 is foreshortened at its left end as viewed in FIG. 8 to permit the right-hand end of the conveyor belts 261 and 262 and the platform 247 to extend into the access port a distance sufficient to insure that a cartridge 225, when inserted into the access port by the tang 184, is picked up by the conveyor belts for transfer to the platform 247 and, thence, onto the shelf 276 of the cartridge holder 350 located at the direct access station. The front and rear ends of the shelf 278 are angled downwardly to permit cartridges to be transferred from the carriage and the conveyor assembly to the shelf 278 without their leading edges abutting the shelf 278. The direct access port 54 does not include a cartridge stop 44. Consequently, a cartridge transferred to the shelf 278 by either the carriage or the conveyor assembly 21 is free to become fully inserted into the access port.

Direct Access Station

The direct access station as shown more particularly in FIGS. 31, 32, 33, 37, 38, and 39 includes a framework 320 having vertical walls 321 and 322 to which are connected horizontal frame members 323 and 324 for supporting and locating the various operating components of the direct access station. The direct access station further includes a stepped diameter drive shaft 325 mounted for rotation about a vertical axis by bearings 326 and 328 secured between horizontal support members 324 and 323, respectively, by bushings 330 and 331. The drive shaft 325 at its lower end has a drive pulley 332 secured thereto for imparting motion to the drive shaft via suitable belt means not shown when a scan motor 333, shown schematically in FIG. 41, is operated.

Figures 40A, 40B, 40C:
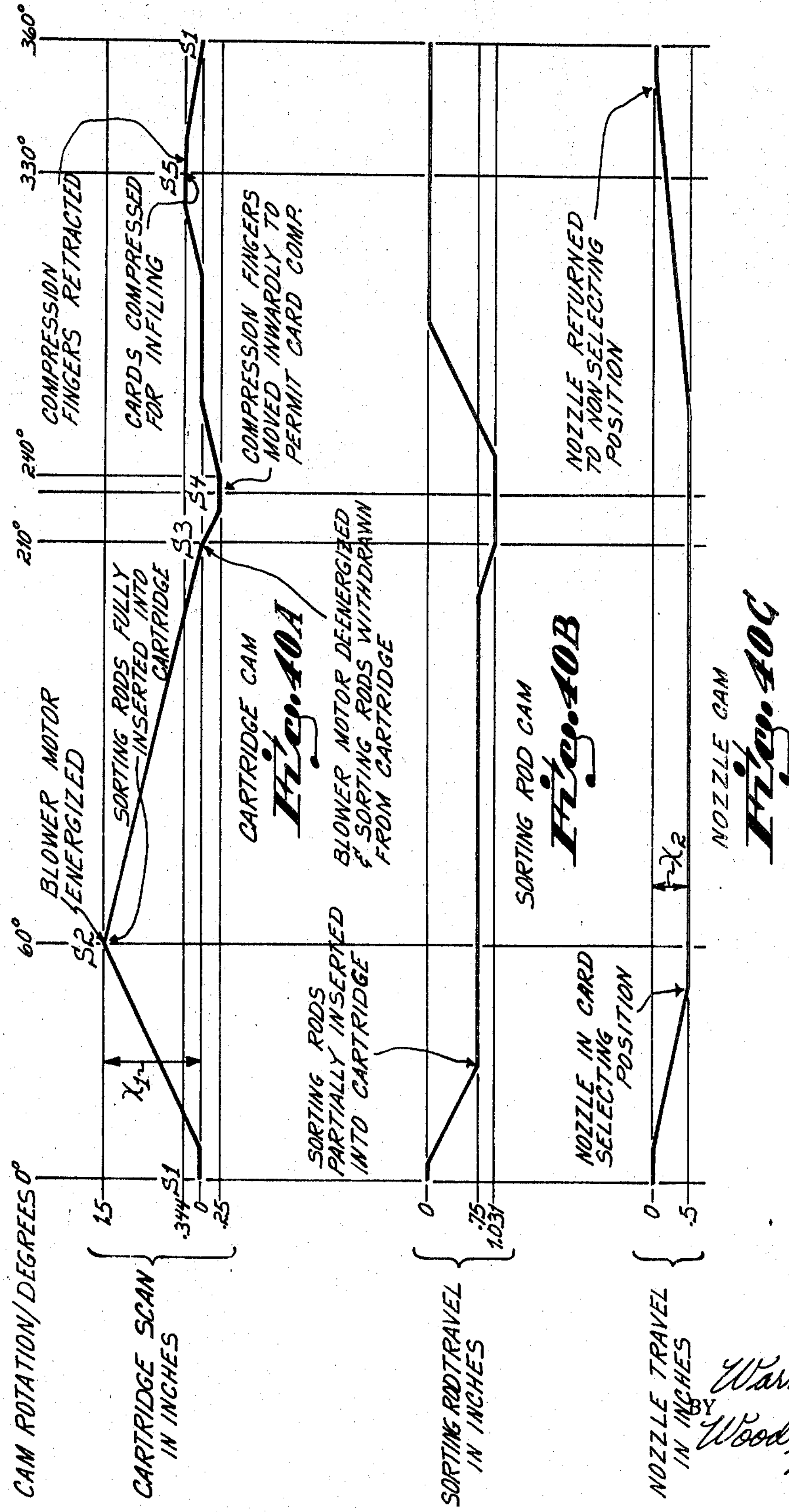

A timing cam 318 is secured to the shaft 325 by suitable means (not shown). The timing cam 318 has a single lobe which cooperates with a series of timing switches S1-S5 mounted on a stationary plate 317 in a circular arrangement. The switches S1-S5 are adapted to be sequentially actuated by the timing cam lobe as the timing cam 318 rotates through a single revolution. Specifically, switches S1-S5 are actuated at the 0°, 60°, 210°, 230°, and 330° points of a single timing cam revolution, as shown in FIG. 40A. These points of timing cam angular rotation are herein termed positions 1, 2, 3, 4, and 5. The functions of the switches S1-S5 are described later in conjunction with the description of the circuits of FIGS. 41—43.

A blower 335 having a nozzle 336 which is mounted on a nozzle plate 337 is provided to selectively direct a jet of gas upwardly against the bottom edges of a deck of cards positioned in the direct access station during the card selection process. The blower 335 is connected via a hose 327 to a suitable source of gas such as a pneumatic pump (not shown) driven by a motor 334 (FIG. 41). Mounted by a suitable fastener 338A to the upper surface of the nozzle plate 337 is a cam follower 338. Cooperating with the cam follower 338 is a blower cam 339 keyed to the shaft 325 by suitable means (not shown). Suitably mounted guide wheels 340 slideably support the nozzle plate 337 for movement in a horizontal plane under the action of the cam 339 coacting with the blower cam follower 338 and a biasing spring 341 connected between the nozzle plate 337 by a post 342 and the framework 320.

In operation, when the driven pulley 332 is operated by energization of the scan motor 333, the blower cam 339 rotates, allowing the nozzle plate 337 to move relative to the drive shaft 325 (see FIG. 40C) a distance X2 under the action of spring 341 to thereby properly orient the nozzle 336 relative to the platen assembly 319 in a manner to be described. A slot 349 formed in the nozzle plate 337 permits the plate to move relative to the shaft 325 without mechanical interference. The nozzle 336 moves into alignment with the platen slot 489 as the timing cam lobe moves from position 1 to position 2, and returns to the position shown in FIG. 32 when the timing cam lobe moves from position 3 to position 5, in accordance with FIG. 40C depicting a plot of blower displacement versus angular blower cam rotation.

A cartridge holder 350 is provided for receiving cartridges transferred by the conveyor transport assembly 21 to the direct access station 22 and moving the cartridges so received to the nozzle 336 and the platen assembly 319 to effect the cartridge scanning and card selection operation. The cartridge holder 350 includes a pair of upstanding side guide walls 350A and 350B for positioning a cartridge located therebetween. The side guide walls 350A and 350B are connected at their bottom edges by the cartridge support shelf 276, the cartridge support shelf having a slot (not shown) formed therein which is coextensive with the opening 32 formed in the bottom 37 of the cartridges 16, thereby permitting the air jet from the nozzle 336 to be directed against the bottom edges of the cards stored in a cartridge positioned in the holder 350. The cartridge holder 350 is secured to a horizontal plate 351 by a fastener 352. A group of guide wheels 353 position and support the horizontal plate 351 for horizontal sliding motion. A cam follower 355 secured to the plate 351 by a fastener 356 cooperates with a cartridge positioning cam 357 keyed to the shaft 325 for horizontally sliding the plate 351 and thereby positioning the cartridge holder 350 relative to the nozzle 336 and the platen 319, in accordance with the plot of cartridge holder displacement versus angular rotation of the cam 357 depicted in FIG. 40A. A spring 360 connected to the plate 351 by a post 362 and to the framework 320 by a connection (not shown) biases the plate 351 leftwardly as viewed in FIG. 32, urging the cam follower 355 against the cam 357. A slot 365 formed in the plate 351 permits the plate to assume the various operating positions necessary for effecting cartridge scanning and card selecting without mechanical interference with the drive shaft 325.

In operation, when the drive shaft 325 is rotated by the drive pulley 332 in response to energization of the scan motor 333, the cam 357 is rotated permitting cam follower 355 and, hence, the plate 351 and the cartridge holder 350 to move relative to the shaft 325. Relative motion of the plate 351 to the left is effected by the spring 360, while motion to the right is effected by the cam 357. The lower corner 358 of the card holder 350 is removed to permit motion of the cartridge holder relative to the blower 335 without mechanical interference.

Figures 31, 32:
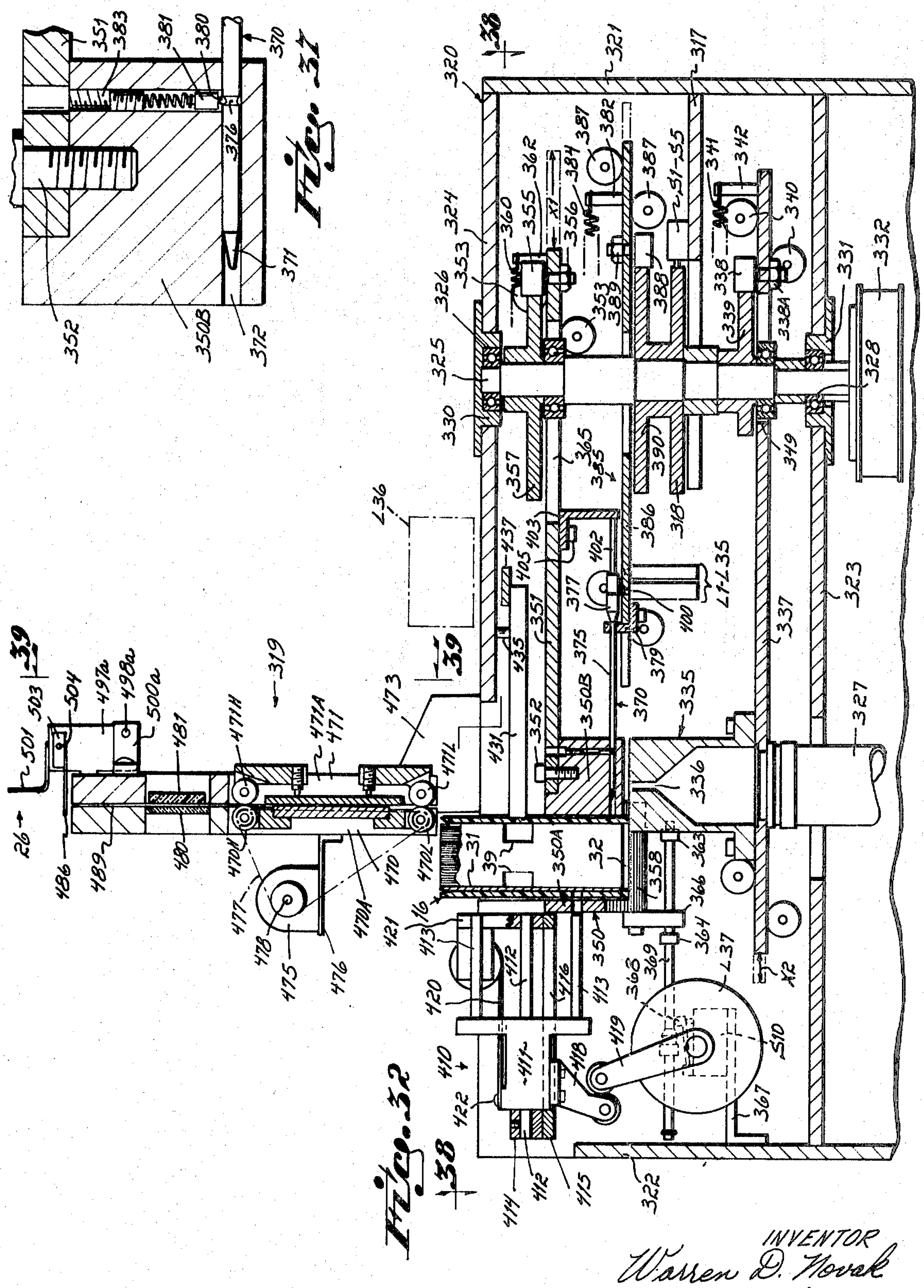

A set of parallel sorting rods or fingers 370 disposed in a horizontal plane and corresponding in number and spacing to the horizontal row of apertures 34 and 51 formed in the lower edge of the cartridge side 35 and card 50, respectively, is included in the direct access station 22 for permitting only the selected card to be moved upwardly during the scanning operation under the action of the air jet from the nozzle 336. The sorting rods 370, only one of which is shown in FIG. 32 for the purpose of convenience and clarity, have pointed end portions 371 as best shown in FIG. 37. The ends 371 are adapted to slide in holes 372 formed in the cartridge holder wall 350B. The holes 372 are parallel to each other and spaced at points corresponding to the spacing of the apertures 34 and 51 formed in the cartridge sides 35 and cards 50, respectively. The sorting rods 370 further include intermediate portions 375 which at one end are connected to the pointed portions 371 by circumferentially grooved portions 376, and at the other end to enlarged heads 377. The sorting rods 370 are normally held in the position shown in FIGS. 32 and 37 by balls 380 biased downwardly by spring driven plungers 381 located in vertical slots 383 formed in the cartridge holder wall 350B.

To position the sorting rods 370 for card selection, that is, to move them leftwardly, as viewed in FIGS. 32 and 37, driving them through their respective support apertures 372 and into their associated cartridge side apertures 34, and to move them rightwardly to accomplish resetting, a rod positioning assembly 385 is provided. The rod positioning assembly 385 includes a horizontal plate 386 mounted for horizontal sliding motion by a plurality of suitably mounted guide wheels 387. The sorting rod positioning assembly 385 further includes a cam follower 388 secured to the bottom surface of the plate 386 by a fastener 389 and a cam 390 keyed to the shaft 325. A spring 384 connected at one end to the plate 386 by a post 382 and at the other end to the frame 320 by a connection (not shown) biases the plate 386 leftwardly. Further included in the rod positioning assembly 335 is a rod support bracket 379 having a plurality of apertures therein corresponding in number and spacing to the number of sorting rods 370 and through which the right-hand ends of the intermediate portions of rods 370 are adapted to slide. Cooperating with the sorting rod heads 377 are a plurality of interposers 400 corresponding in number and spacing to the sorting rods 370. The interposers 400 are selectively actuable by energizing their associated solenoids L1—L35 (FIG. 41). For the purpose of convenience and clarity, only one of these interposers 400 is shown.

In operation, the sorting rods 370 are urged leftwardly, as viewed in FIGS. 32 and 37, inserting the sorting rods through the cartridge wall apertures 34 to facilitate the scanning and selection operation in two somewhat overlapping steps, both steps occurring as the timing cam 318 moves from position 1 to position 2 (FIG. 40B) through the distance X1. Assuming that the interposers 400 associated with the rods to be inserted into a cartridge have been actuated and thereby physically interposed between the enlarged sorting rod heads 377 and their associated rams 402, the first positioning step is culminated when the cam 357 moves the plate 351 and, hence, the cartridge holder 350 to the right as viewed in FIG. 32. When this occurs, the sorting rods 370 whose interposers have not been actuated and thereby physically positioned behind the rod heads 377 are displaced to the right, moving with and being carried by the cartridge holder 350 by reason of the spring loaded balls 380 which engage the grooves 376. Thus, the rods 370 whose interposers have not been actuated, do not move in the holes 372.

While movement of the cartridge holder 350 to the right is effective to carry with it those sorting rods whose interposers 400 have not been actuated, such cartridge holder motion is not effective to similarly carry those sorting rods 370 whose interposers 400 have been actuated by their associated solenoids L1—L35. Specifically, the rightward movement of the cartridge holder 350 is effective to urge the sorting rods 370 whose interposers 400 are actuated into their associated cartridge apertures 34 because, as the cartridge holder 350 moves to the right, the sorting rods 370 whose interposer solenoids have been actuated are maintained stationary by their associated interposers, the interposers having been positioned in abutting relationship with the rod head 377 of the selected rods 370.

The second step involved in inserting the desired sorting rods 370 into the cartridge occurs when the plate 386 moves leftwardly (see FIG. 40B) in response to the combined action of the cam 390 and the spring 384. When this occurs, the interposers 400 which are associated with the sorting rods to be inserted into the cartridge move leftwardly with the plate 386, driving their associated sorting rods further to the left, thereby fully inserting them into the cartridge located in the holder 350.

The sorting rods 370 are reset to their original positions depicted in FIGS. 32 and 37 when the cam 390 moves the plate 386 to the right (FIG. 40B). This moves the reset bar 379 rightwardly, urging the heads 377 of the set sorting rods 370 to the right relative to the cartridge holder 350, thereby returning the set sorting rods 370 to their initial positions, completing the rod resetting operation. This rod resetting operation occurs as the timing cam moves from position 4 to position 5. (FIG. 40B)

A switch S-10, mounted to the frame side wall 322 by a bracket 367 disables and/or deenergizes the interposer solenoids L1—L35 when actuated. The switch S-10 has a movable arm 368 which is depressed, actuating the switch, when the plate 351 moves through a distance $x_1$ as the timing cam 318 moves from position 1 to position 2. To actuate and deactivate the switch S-10, a rod 369 is provided which slides in an aperture formed in a bracket 366 depending from the cartridge holder 350. The rod 369 has a fixed collar 364 which abuts the bracket 366, moving the rod 369 leftwardly to deactivate switch S-10, as the nozzle moves leftwardly during the period that the timing cam moves from position 1 to position 2. The rod 369 has a second fixed collar 363 which also abuts the depending bracket 366, moving the rod 369 to the right to depress the switch arm 368 and thereby actuate the switch and disable and/or deenergize the interposer solenoids L1—L35 when the cartridge holder 350 returns to the position shown in FIG. 32, which occurs as the timing cam moves from position 2 to position 4 (FIG. 40A).

To properly align the cards stored in a cartridge present in the holder 350 prior to the sorting rod insertion operation and thereby insure that upon insertion of the sorting rods 370 into the cartridge the card apertures 51 are aligned with the cartridge apertures 34, a horizontal shiftable three-fingered spider 410 is provided. The spider 410 has a body portion 411 slidably mounted on a stationary horizontal guide rod 412. The rod 412 is secured at its left end, as viewed in FIG. 32, in an apertured block 414 which functions to support the rod 412 as well as provide a limit of travel for the spider 410. The apertured guide rod supporting block 414 is mounted to the upper surface of the horizontally disposed support plate 415 secured to and forming a part of the framework 320. The support plate 415 is provided with an opening 416 to permit the body 411 of the spider 410 to reciprocate laterally between the position shown in FIG. 32 and a position in which the body 411 is displaced to the right and its three fingers 413 inserted through apertures 43 formed in the side 35 of the cartridge positioned in the holder 350. A negator spring 420 having one end secured to the body 411 of the spider by a fastener 422 is mounted in a bracket 421 secured to the plate 415 and substantially uniformly biases the spider 410 rightwardly as viewed in FIG. 32. A rotary solenoid L-37 having a drive arm 419, cooperates with a driven arm 418 formed on the spider body 411 to, when energized, move the spider 410 leftwardly, withdrawing the fingers 413 from the cartridge apertures 43.

The fingers 413 insure that the cards are vertical so that during the selection operation, as each card passes between the nozzle 336 and the lower drive and pressure rolls 470L and 471L, its upper and lower edges 27 and 19, respectively, simultaneously traverse an imaginary plane passing through the nozzle 336 and the nip of the lower drive and pressure rolls 470L and 471L. Thus, at the instant of time when the card to be selected passes over the nozzle 336 exposing its lower edge to the air jet, the upper edge of the card is aligned with the nip of the lower drive and pressure rolls 470L and 471L, enabling upper edge of the selected card to be engaged by the lower drive and pressure rolls 470L and 471L and transported into the platen.

Figure 38:
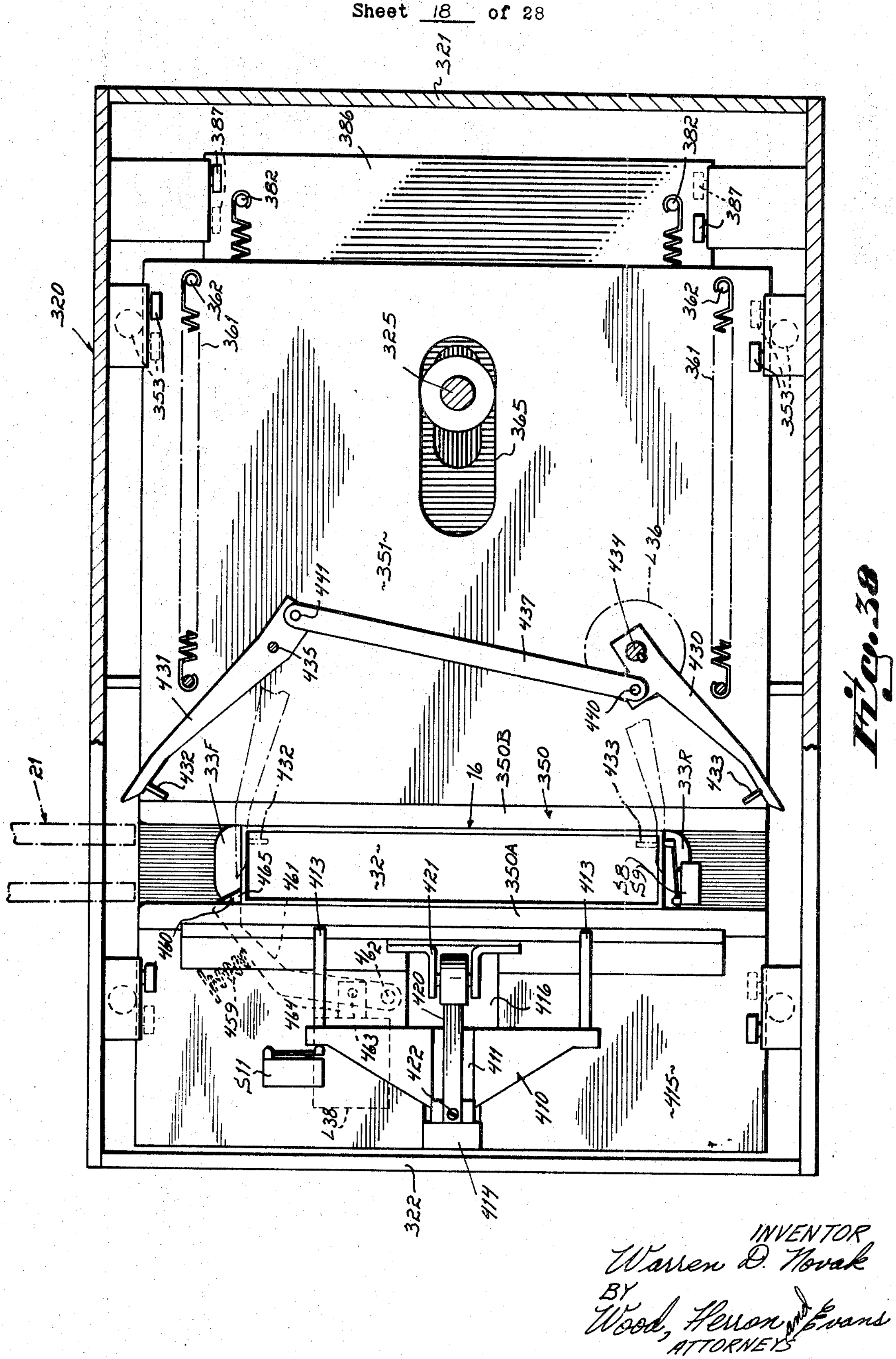

To compress the cards stored in a cartridge positioned in the holder 350 in a lateral direction, that is, against the cartridge side 35 adjacent the holder guide wall 350A, a pair of compression fingers 430 and 431 are provided as best shown in FIG. 38. The finger 431 is mounted for rotation in the horizontal plane about a pin 435 fixed to the support plate 324. The finger 430 is mounted for rotation in a horizontal plane on a drive shaft 434 to which it is keyed. Connecting the fingers 430 and 431 for imparting pivotal motion to the finger 431 is a link 437. The link 437 at its ends is connected to the fingers 430 and 431 by pins 440 and 441. A rotary solenoid L-36 mounted to the upper surface of the support plate 324 is connected to the shaft 434 for selectively positioning the fingers from the open position shown in FIG. 38 in solid lines to the closed position shown in phantom lines. The compression fingers 430 and 431 are provided, respectively, with inwardly extending shoulders 432 and 433 at their free ends which, when the fingers 430 and 431 are in the positions shown in phantom in FIG. 38, are aligned with the oppositely notched corners 39 of the cartridge side 35 adjacent the cartridge guide wall 350B.

In operation, motion of the cartridge holder 350 and, hence, of the cartridge positioned in the holder, in a rightwardly direction, is effective to compress the cards stored in the cartridge against the cartridge wall located adjacent the cartridge guide wall 350A. With the cards so compressed against the cartridge wall adjacent the guide wall 350A a space is formed between the cartridge wall 35 adjacent the cartridge guide wall 350B and the card adjacent the finger shoulders 432 and 433 to permit easy insertion of a card into the cartridge. Card compression occurs as the timing cam moves from position 4 to position 5. (FIG. 40A) At position 5, the sorting rod resetting operation is also completed. Hence, cards having notch patterns not conforming to that of the previously inserted sorting rods 370 may be infiled to the cartridge without mechanically interfering with any of the set sorting rods.

A cartridge clamp 460, shown in FIG. 38, is provided to lock in place a cartridge positioned in the holder 350. The cartridge clamp 460 includes an arm 461 pivotally mounted at one end about a stationary pin 462 secured to the upper surface of the plate 415 and connected at an intermediate portion by a pin 463 to the armature 464 of a solenoid L-38. The arm 461 is biased rightwardly by a spring 459 into a cartridge locking position. When the solenoid L-38 is energized, which occurs when the spider 410 has retracted to the position shown in FIG. 38 and thereby tripped a switch S-11 mounted on the plate 415, the armature 464 retracts pivoting the arm 461 counterclockwise, as viewed in FIG. 38, about the pin 462 moving the free end 465 leftwardly out of the path of travel of the cartridge in the holder 350, thereby permitting cartridges to be freely inserted into and withdrawn from the cartridge holder 350. The free end 465 of the arm 461 is adapted to move into the position shown in FIG. 38 when the solenoid L38 is deenergized, which occurs when the spider fingers 413 have entered the cartridge apertures 43 and the switch S11 tripped in response to rightward movement of spider body 410. Deenergization of the solenoid L38 allows its armature 464 to extend and the spring-biased arm 461 to move rightwardly to thereby lock the cartridge positioned in the holder 350 in the position shown in FIG. 38.

Viewing Device

The viewing device 24 includes a platen assembly 319 shown in FIGS. 32 and 39. The platen assembly includes a pair of upstanding parallel platen plates 470 and 471 spaced apart a distance slightly larger than the thickness of a card 50 to form a slot 489. A pair of brackets 473 secured to the plate 324 support the plates 470 and 471. Two sets of slots 470A and 471A, having four slots each, are formed in the plates 470 and 471, respectively. Into the slots of set 470A are rotatably mounted upper and lower pairs of drive rolls 470H and 470L, respectively. Into the slots of set 471A are rotatably mounted upper and lower sets of pressure rolls 471H and 471L, respectively. The slots of set 470A are opposite the slots of set 471A. Consequently, the upper and lower sets of drive rolls 470H and 470L cooperate with upper and lower sets of pressure rolls 471H and 471L, respectively. A motor 475 mounted on a bracket 476 secured to the outer surface of the plate 470 rotates the drive rolls 470H and 470L through a drive belt 477 which engages the motor shaft 478 and the drive rolls via suitably positioned and connected pulleys. The motor 475 is provided with two windings, namely, an "up" winding for driving the drive rolls 470 in a sense such that a selected card is conveyed upwardly in the platen slot 489, and a "down" winding for driving the drive rolls in a sense to convey a card downwardly into the cartridge.

Formed in the plates 470 and 471 are suitably positioned oppositely disposed slots for receiving transparent inserts 480 and 481. The inserts 480 and 481, which preferably are fabricated of glass, are located relative to the plates 470 and 471 such that a card 50 of the type shown in FIG. 5 having a microfilm insert 20, when properly positioned between the plates 470 and 471 with its upper edge 27 against a card stop member 486 has its microfilm insert positioned between the glass inserts 480 and 481. In this position the microfilm insert is subject to illumination by a lamp 487 to produce an image which is then reproduced on the screen 25 by means of a suitably positioned television camera 488. (see FIG. 31)

To enable the card 50 to be properly clamped in the viewing position with its microfilm insert 20 framed by the glass inserts 480 and 481 for illumination and viewing by the lamp 487 and the camera 488, respectively, the glass insert 481 is mounted for movement in a direction substantially perpendicular to the plane of the glass insert 480. Specifically, the glass insert 481 is mounted in a frame 490 having an arm 491 horizontally extending therefrom. The arm 491 is mounted to the plate 471 for movement about a stationary vertically disposed pin 492. The frame 490 is provided with a second arm 493 substantially colinear with arm 491, but extending in the opposite direction. The arm 493 at its free end is connected to the armature 494 of a solenoid L-45 by a pin 495. Clamping of a card 50 between the glass inserts 480 and 481 is produced by energizing the solenoid L-45. This retracts the armature 494, urging the arm 493 and, hence, the frame 490 and the glass insert 481, toward the glass insert 480, securely clamping the card 50 sandwiched between the glass inserts 480 and 481.

A switch S24, suitably mounted to the platen assembly, is provided to detect the energized condition of the solenoid L45 and, hence, the clamping of a card between the glass inserts 480 and 481. Switch S24, when a card is clamped, disables the drive roll motor 475.

The card stop 486 is provided to properly locate a card relative to the inserts 480 and 481, the lamp 487 and the camera 488. The card stop 486 is in the form of an elongated flat plate which, in its normal position as shown in FIG. 32, substantially overlies the upper edge of the card slot 489 formed by the upper edges of the plates 470 and 471. To permit expulsion of a card from the platen assembly 319, the card stop 486 is mounted for selective movement from its normal position overlying the slot 489 to a laterally displaced position. In this displaced position, the drive wheels 470H and 470L, when driven in the proper direction, drive a card located in the slot 489 vertically upward and out from between the plates 470 and 471.

More specifically, the card stop 486 is mounted between the upper end of a set of support blocks 497A and 497B. The blocks 497A and 497B at their lower end are mounted for pivotal motion about pins 498A and 498B. The pins 498A and 498B, in turn, are secured to brackets 500A and 500B fixed to the outer surface of the plate 471. To facilitate the clockwise pivoting of the blocks 497A and 497B about their associated mounting pins 498A and 498B, a finger tab 501 fixed at its opposite ends to the upper surfaces of the block 497A and 497B is provided.

Lateral shifting of the card stop 486 from the position shown in FIG. 32 to permit a card positioned in the space between the plates 470 and 471 to be expelled from the platen by the drive wheels 470H and 470L is effected by gripping the finger tab 501 and moving it rightwardly, as viewed in FIG. 32. Rightward movement of the finger tab 501 pivots the blocks 487A and 497B about the mounting pins 498A and 498B in a clockwise direction. This, in turn, carries with it, in an arcuate path centered about the pins 498A and 498B, the card stop 486 to a position where it is clear of the path of travel of a card being expelled from the slot 489.

To sense the lateral displacement of the card stop 486 for initiating energization of the motor 475 to expel a card positioned in the platen and for energizing a relay, switches S22 and S23 are provided, respectively. The switches S22 and S23 are suitably mounted to the outer surface of the plate 471 for actuation in response to the pivotal movement of the blocks 497A encountered in laterally displacing the card stop 486. When actuated, switch S22 energizes the up winding of the motor 475 in a sense such that the drive rolls 470H and 470L drive the card upwardly expelling it from the slot 489, and switch S23 energizes a relay K3 for reasons to be described in conjunction with the description of the control circuitry of FIGS. 41—43.

In order to sense the presence of a card properly positioned between the plates 470 and 471, that is, with its upper edge 27 in contact with the card stop 486, the card stop 486 is mounted for limited upward pivotal motion in response to the upward movement of a card being conveyed from the cartridge and positioned in the platen by the drive rolls 470H and 470L. This limited movement is sensed by a switch S20 which, when actuated, energizes the lamp 487 and camera 488, stops the drive roll motor 475, and energizes the platen clamp solenoid L45.

Specifically, the card stop 486 is provided with a set of upstanding ears 503 which are mounted for rotation about a pair of horizontally disposed pins 504 secured to the upper ends of the blocks 497A and 497B. In operation, when a card is driven upwardly between the plates by the drive wheels 470H and 470L and its upper edge 27 abuts the lower surface of the card stop 486, the card stop pivots about its mounting pins 504. This causes the marginal portion 506 of the card stop 486 to be driven downwardly depressing the actuating button 507 of the limit switch S20.

A switch S6 is suitably mounted to the plate 471 between the lower set of pressure rolls 470L for sensing the presence of a card between the lower set of pressure and drive rolls 470L and 471L. A switch S7 is suitably mounted to the plate 471 between the upper set of pressure rolls 471H for sensing the presence of a card between the upper sets of pressure and drive rolls 471H and 470H. The functions of the switches S6 and S7 are described in conjunction with the description of the various control circuits of FIGS. 41—43.

In operation, a cartridge is delivered to the cartridge holder 350 by the cartridge conveyor assembly 21. When the cartridge is properly positioned in the cartridge holder, as shown in FIGS. 32 and 38, the movable arms of switches S8 and S9 are simultaneously pivoted by the cartridge actuating these switches. Actuation of the switches S8 and S9 by a properly positioned cartridge is effective to deenergize the rotary solenoid L37 permitting the spider 410 to move rightwardly under the action of the negator spring 420, inserting the spider fingers 413 into the apertures 43 of the cartridge side wall 35. Movement of the spider 410 trips the switch S11 allowing the cartridge clamp solenoid L38 to become deenergized which, in turn, is effective to position the spring-biased arm 461 of the cartridge clamp 460 in the position shown in FIG. 38, clamping the cartridge in the holder 350. In addition, the conveyor transport motor 264 is deenergized, terminating the motion of the conveyor belts 261 and 262, the rotary solenoid L39 is deenergized lowering the conveyor transport assembly 21 to the position shown in FIG. 28, and the drive roll motor 475 is energized for subsequent transfer of a card upwardly into the platen slot 489 following the selection thereof.

Figures 33, 34, 35, 36:
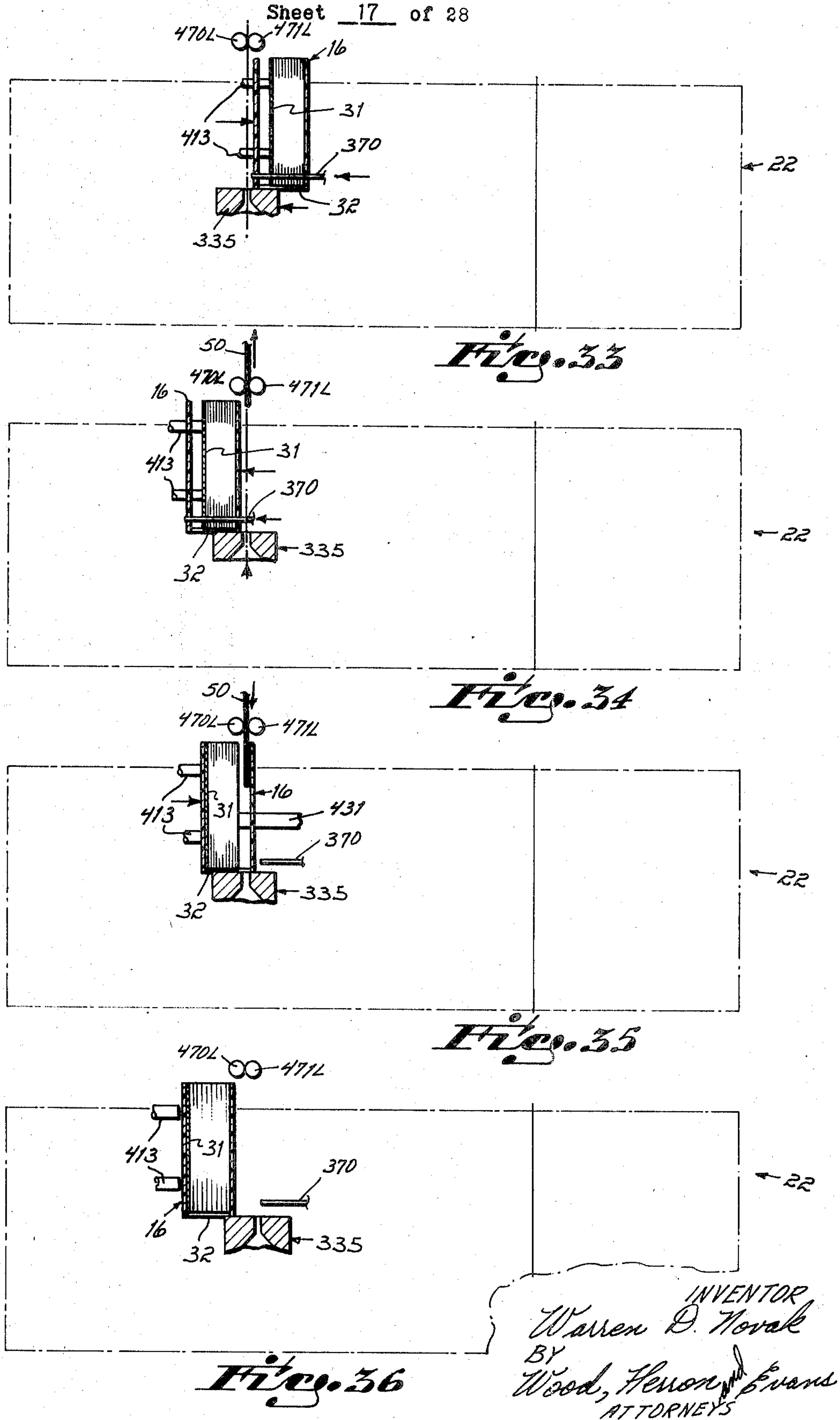

The scan motor 333 now begins operation, moving the timing cam 318 from position 1 toward position 2. During the course of this movement, the cartridge holder 350 shifts rightwardly a distance $X_1$ and the interposer-bearing plate 386 moves leftwardly combining to insert the selected sorting rods 370 into the cartridge. In addition, the nozzle 335 shifts leftwardly a distance $X_2$ aligning the nozzle 336 with the slot 489 formed by the platen plates 470 and 471. At this point, the nozzle 336, the cartridge located in the cartridge holder 350, and the lower pairs of drive and pressure rolls 470L and 471L are oriented relative to each other as shown in FIG. 33. Movement of the cartridge holder 350 to the right as the timing cam 318 moves from position 1 to position 2 is also effective to cause the depending bracket 366 to shift rightwardly the rod 369 causing the switch S10 to be actuated, which in turn disables and/or deenergizes the interposer solenoids L1—L35.

When the timing cam 318 arrives at position number 2, which is approximately coincident with the movement of the cartridge holder 350 to its rightward limit of travel, the switch S2 is actuated, starting the blower 335 which is effective to direct a jet of gas upwardly from the nozzle 336 to aid in selecting the desired card from the deck. Concurrently with the initiation of the blower operation, the scan motor 333 drives the cartridge holder 350 leftwardly from the position shown in FIG. 33 to the position shown in FIG. 34, initiating the scanning operation.

As the carriage holder 350 moves, the bottom edges of the cards successively pass over the nozzle 336. The card whose notch pattern conforms to the sorting rods 370 driven into the cartridge is forced upwardly by the gas jet. The upper edge of the selected card is then gripped between the lower pair of drive and pressure rolls 470L and 471L driving the card upwardly and tripping switch S6, whereupon it is subsequently gripped between the upper pair of drive and pressure rolls 470H and 471H for further movement and tripping switch S7. The card is eventually conveyed to a point where its upper edge 27 abuts the card stop 486, pivoting the card stop. Pivoting of the card stop in turn actuates the switch S20, deenergizing the drive roll motor 475, energizing the lamp 487 and camera 488 for reproducing on the screen 25 an image of the microfilm insert 20, and energizing the platen clamp solenoid L45 to lock the card between the glass inserts 480 and 481. When the card is clamped, the switch S24 is tripped.

At this point, the cartridge is positioned in the cartridge holder 350, the nozzle 36, and the lower drive and pressure rolls 470L and 471L assume the relative positions shown in FIG. 34. The successive tripping of switches S6, S7, S20, and S24 in the course of transporting the card from the cartridge to the viewing position in the platen slot 489 operates to perform various control functions to be described.

The scan motor 333 continues driving the timing cam 318 to the position number 3, actuating switch S3, whereupon the blower 335 is deenergized. Continued rotation of the scan motor 333 drives the timing cam 318 to position number 4, actuating switch S4, energizing the solenoid L36, thereby causing the compression fingers 430 and 431 to move to their inner positions for subsequently compressing the cards. As continued motion of the scan motor 333 drives the timing cam from position 4 toward position 5, the sorting rod plate 386 via the reset bar 379 is effective to reset the sorting rods 370. In addition, the cartridge holder 350 is moved from the position shown in FIG. 34 to the position shown in FIG. 35 causing the shoulders 432 and 433 of the compression fingers 430 and 431 to compress the cards against the cartridge side wall 35, leaving a space in the cartridge which is aligned with the platen slot 489 and into which an infiled card 50 may be positioned.

Further scan motor energization drives the timing cam 318 to position 5, actuating switch S5 whereupon the scan motor 333 becomes deenergized. The cartridge within the cartridge holder 350, the nozzle 336, and the lower drive and pressure rolls 470L and 471L now assume the position shown in FIG. 35.

For removal of the card from the platen slot 489, the finger tab 501 is shifted laterally to displace the card stop 486 from its normal position overlying the platen slot 489, thereby opening the platen gate 26. The pivoting of the finger tag support 501 is also effective to actuate the switch S22, as well as permit the card stop 486 to actuate the switch S20. Actuation of these switches deenergizes the platen clamp solenoid L45 unclamping the card and tripping switch S24 to enable the drive roll motor 475 for expelling the card, and deenergizes the lamp 487 and camera 488.

When the card is returned to the slot 489, assuming the drive roll motor 475 has been energized by depression of the appropriate keyboard key, the card is conveyed downwardly into the space in the cartridge formed by the compression fingers 430 and 431. The platen gate 26 is now closed and the scan motor 333 energized to move the timing cam 318 from position 5 back to position 1 and the cartridge holder from the position shown in FIG. 35 to the position shown in FIG. 36. Upon arrival of the cartridge holder at the position shown in FIG. 36, the spider 410 is retracted, removing the fingers 413 from the cartridge apertures 43 as a consequence of energization of the rotary solenoid L37. When the spider moves rearwardly, the switch S11 is tripped, energizing the cartridge clamping solenoid L38, pivoting leftwardly the arm 461 and unclamping the cartridge. The conveyor assembly 21 now rises as a consequence of actuating the rotary solenoid L39, and the conveyor belts 260 and 261 move as a consequence of energizing the motor 264, thereby transferring the cartridge holder to the direct access port 54.

Keyboard

Figure 1:
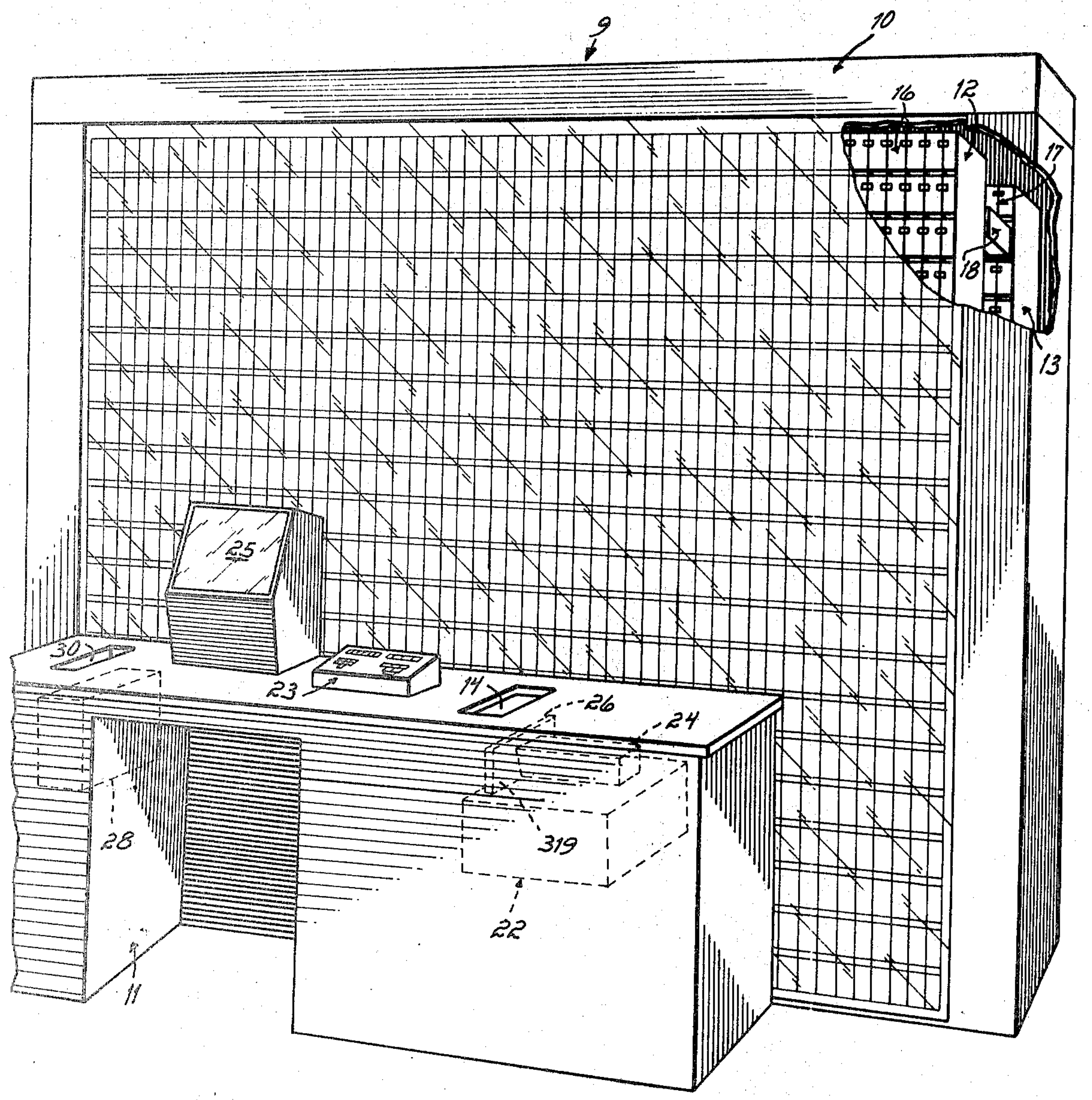
Figure 2:
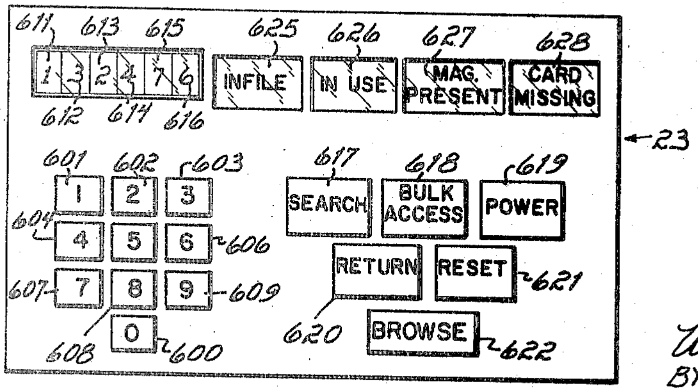
Figure 44:
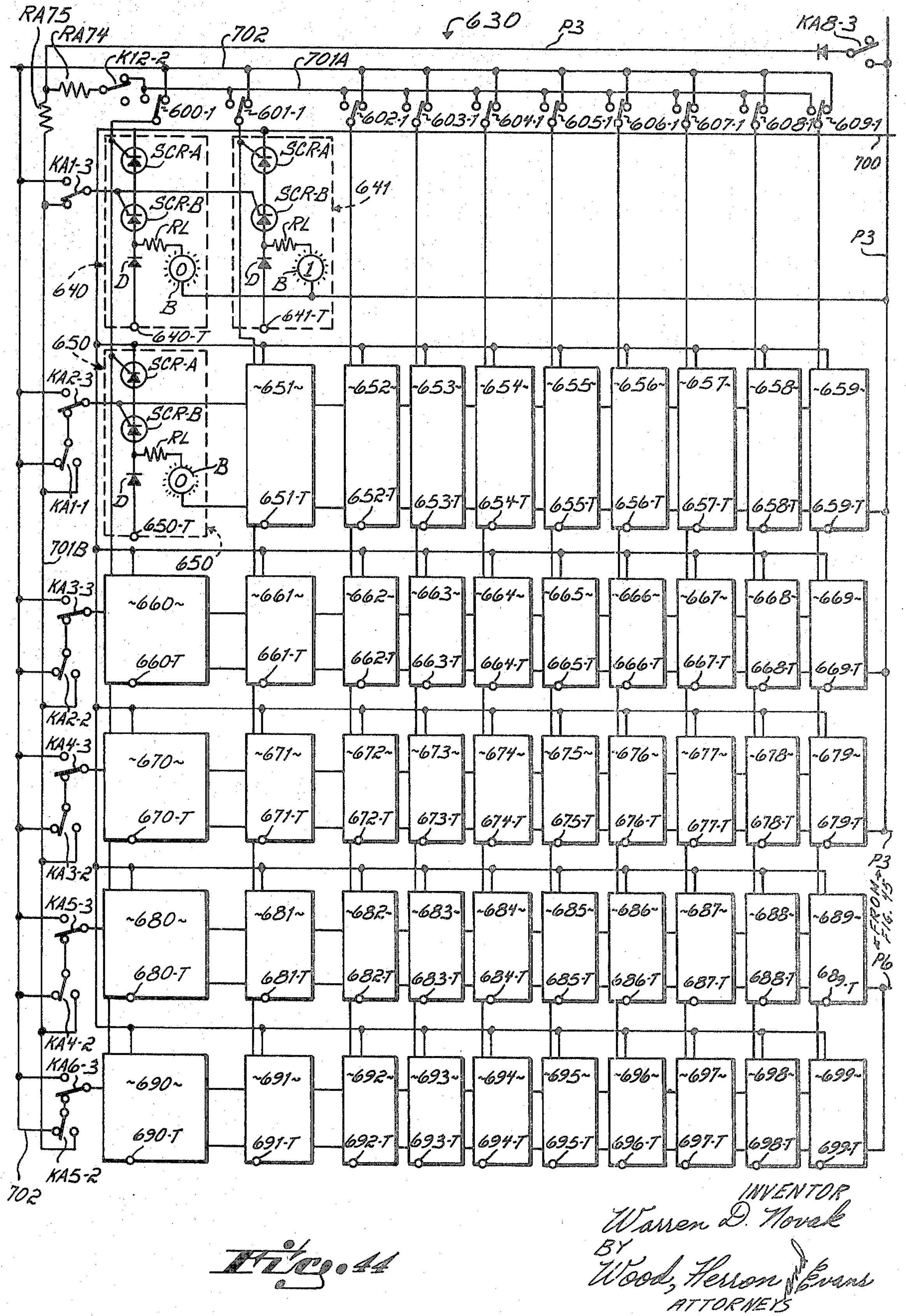
Figure 45:
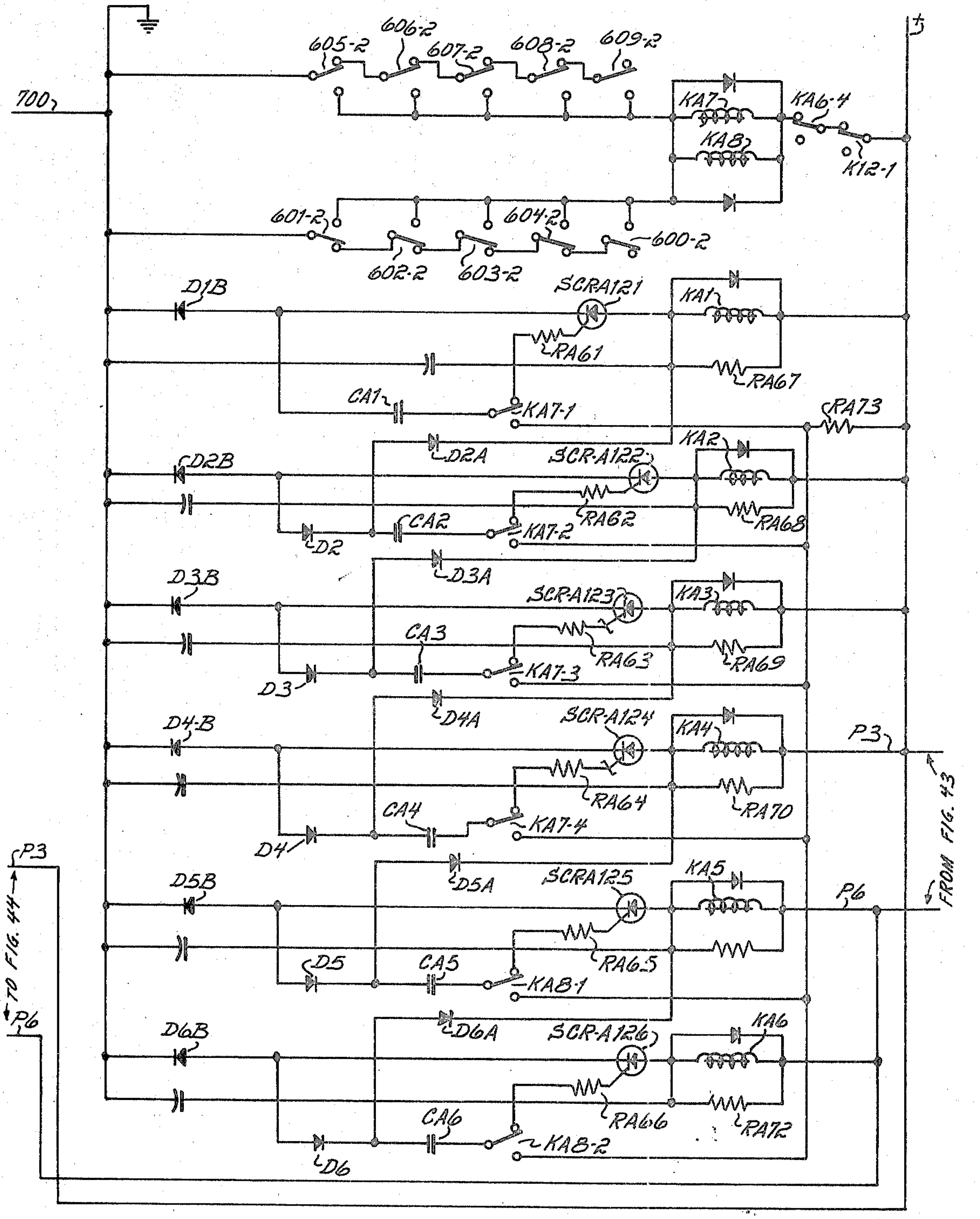

The keyboard 23 as shown more particularly in FIGS. 2, 44, and 45 includes ten digit keys 600—609. These keys facilitate the entry into the system of the address of the cartridge desired to be retrieved and transferred to either the direct access station 22 or the bulk access station 28, as well as the number of the card within a chosen cartridge for selection of that card and subsequent manual removal or viewing in conjunction with the television screen 25. In addition, the keyboard includes six address indicating windows 611—616 at which appears a visual indication of the address presently entered into the keyboard. More specifically, in window 611 appears a visual indication of that portion of an address corresponding to the storage wall containing the desired card and/or cartridge. In window 611 either the digit 0 corresponding to the front storage wall 12, or the digit 1 corresponding to the rear storage wall 13, may appear depending on which of the walls the desired card or cartridge is located. In windows 612, 613 and 614 appears a visual indication of the three digit number representing the particular storage compartment in the selected wall in which the desired card and/or cartridge is located. Finally, in windows 615 and 616 appears a visual indication of the two digit number identifying the address of the particular card located in the selected cartridge which it is desired to retrieve.

The keyboard also contains eight function keys, a "search" key 617, a "bulk access" key 618, a "power" key 619, a "return" key 620, a "reset" key 621, a "browse" key 622, an "infile" key 625 and a "card missing" key 628. The actuation of the power key 619 is effective to apply operating potential to the various portions of the control circuitry to be described. Actuation of the reset key 621 is effective to reset the various portions of the control circuitry, including erasing an address or portion of an address previously entered into and stored in the keyboard 23. The search key 617 initiates extraction of a cartridge from its storage location for delivery to the direct access station and the subsequent selection of a card. The card missing key 628 is actuated when the card selection process fails to select the desired card, an indication of such failure being provided by illumination of a lamp associated with the card missing key. When actuated, the card missing key 628 erases the last two digits stored in the keyboard, permitting them to be reentered and a second selection attempt made. The bulk access key 618 is actuated when delivery of a cartridge to the bulk access station 28 is desired. The infile key 625 is actuated under certain conditions to compress the cards in a cartridge at the direct access station to permit return of a card to the cartridge when a search has not been made and the cards, therefore, not compressed. A lamp associated with the key 625 indicates when a card may be infiled. The return key 620, when actuated, operates to return a card to its cartridge if the system is in the browse mode, or return a card to its cartridge and the cartridge to its storage compartment if the system is in the bulk access mode.

Associated with each of the keys 618 and 622 are lamps which become illuminated when their respective keys are depressed to indicate the mode of operation in which the system is being operated.

Further included in the keyboard 23 are two indicators, namely, an "in use" indicator 626, and a "magazine present" indicator 627. The in use indicator 626 becomes illuminated as soon as the first digit of an address of either a card or cartridge is entered into the keyboard 23. The magazine present indicator 627 becomes illuminated when a cartridge is properly positioned in the cartridge holder 350 of the direct access station 22, or the bulk access station 28.

Cartridge and/or Cartridge Address Storage Circuit

As shown more particularly in FIGS. 44 and 45, the address storage circuit includes a digit memory 630 for storing the various digits of the card and/or cartridge address entered into the keyboard 23 via the digit keys 600—609. Additionally, a sequencer 631 is included for successively enabling, or conditioning, the various digit storage elements of the digit memory 630 as is necessary to orderly enter and store the digits comprising an address in their respective storage elements.

The digit memory 630, more specifically, includes digit storage elements 640—641, 650—659, 660—669, 670—679, 680—689, and 690—699 for storing, respectively, the six digits of a card address identifying the wall, pocket, and card should the system be operated in the direct access mode, and the four digits of a cartridge address identifying the wall and pocket should the system be operated in the bulk access mode.

For example, if the card address 132476 is entered into the keyboard, the digit 1 corresponding to the rear storage wall 13 is stored in the wall storage element 641. The digits 3, 2, and 4 corresponding to the particular pocket of the rear storage wall 13 in which the desired card is located, are stored, respectively, in the pocket storage elements 653, 662, and 674. The last two digits, the digits 7 and 6, identifying the particular card stored in the cartridge located in pocket 324 of the rear wall, are stored in the card storage elements 687 and 696. In like manner, if the card address 048721 is entered into the keyboard, the wall digit 0 is stored in the wall storage element 640, the pocket digits 4, 8, and 7 are stored in the pocket storage elements 654, 668, and 677, and the card digits 2 and 1 are stored in the card storage elements 682 and 691.

Should, for example, the cartridge address number 1892 be entered into the keyboard 23 when the system is operated in the bulk access mode, the digit 1 indicating the rear storage wall 13 is stored in the wall storage element 641, and the digits 8, 9, and 2 indicating the desired cartridge of the rear wall are entered into the cartridge storage elements 658, 669 and 672. In the bulk access mode, no keyboard entries are made corresponding to a particular card within the desired cartridge and, hence, no storage in the card storage elements 680—689 and 690—699 occurs.

The storage elements of the digit memory 630, each of which are identically constructed, include a pair of series connected, silicon controlled rectifiers SCR-A and SCR-B both of which must be simultaneously triggered if both are to conduct, or fire, and thereby effect storage. As used herein, triggering means the application to the control electrode of a silicon controlled rectifier (SCR) of a positive potential such that it fires, or conducts, if the appropriate anode-cathode potential is present. The silicon controlled rectifiers SCR-A and SCR-B of each storage element are connected between a grounded line 700 and a positive line via a series connected resistor RL and a lamp B. The positive line for the SCRs of storage elements 640—641, 650—659, 660—669, and 670—679 is line P3, while the positive line of the SCRs of storage elements 680-—689 and 690—699 is line P6. Lines P3 and P6 are connected to a source of positive potential via suitable control switches to be described.

The indicating lamp B of each storage element, when illuminated, functions to provide in the appropriate window 611-—616 a visual indication of the digit value of that address digit storage element with which the particular lamp B is associated. For example, if the lamp B of the storage element 640 becomes illuminated, a visual indication of the digit 0 is provided in window 611 indicating that the first digit of the address is a zero. Should the first digit entered into the keyboard be a 1, identifying the rear storage wall 13, the bulb B of the storage device 641 becomes illuminated, providing in the window 611 a visual indication of the digit 1.

Each of the storage elements is also provided with an output terminal. The output terminal is connected to the junction of the load resistor RL and the anode of the silicon controlled rectifier SCR-B via a diode D, the output terminals being indicated by an alphanumeric designation which includes the storage element reference numeral and the letter T. Thus, the output terminal 640-T designates the output terminal of the storage element 640, the output terminal 641-T designates the output terminal of the storage element 641, etc.

The silicon controlled rectifiers SCR-A of each of the storage elements 640, 650, 660, 670, 680 and 690 are alternatively connected via a movable contact 600-1 to a negative biasing line 702 and a positive line 701A. The line 701A in turn is connected to the positive line P3 via normally closed relay contact K12-2, resistor RA74 and normally open relay contact KA8-3. The negative bias line 702 is connected to a suitable source of negative potential (not shown). The movable contact 600-1 is a contact associated with the digit key 600 corresponding to the digit o and being normally in the position shown applying negative bias to the control electrodes of SCR-A of each of the storage elements 640, 650, 660, 670, 680 and 690, thereby disabling them and preventing storage in their associated storage elements.

The control electrodes of the silicon controlled rectifier SCR-B of each of the storage elements 641, 651, 661, 671, 681 and 691 are connected alternatively via a movable contact 601-1 between the negative bias line 702 and the positive line 701A. The contact 601-1 is a contact associated with the digit key 601 and is normally in the position shown applying negative bias to the control electrodes of the silicon controlled rectifiers SCR-A of the storage elements 641, 651, 661, 671, 681, and 691 to thereby disable them, preventing digits from being stored in the storage element of which they form a part.

In like manner the silicon controlled rectifiers SCR-A of storage elements 652, 662, 672, 682, and 692 have their control electrodes alternatively connected to the negative bias line 702 and the positive line 701A via the movable contact 602-1 which is associated with the digit key 602 and normally in the position shown for disabling the silicon controlled rectifiers and preventing storage of digits in the storage element of which they form a part. Like the control elements of the silicon controlled rectifiers SCR-A of storage elements 652, 662, 672, 682 and 692, the control electrodes of the silicon controlled rectifiers SCR-A of storage elements 653, 663, 673, 683, and 693; 654, 664, 674, 684 and 694; 655, 665, 675, 685, and 695; 656, 666, 676, 686, and 696; 657, 667, 677, 687, and 697; 658, 668, 678, 688, and 698; and 659, 669, 679, 689, and 699 are alternatively connected to the negative biasing line 702 and the positive line 701A via the movable contacts 603-1, 604-1, 605-1, 606-1, 607-1, 608-1 and 609-1, respectively, which are normally in the position shown for disabling their respective storage elements and associated with the digit keys 603, 604, 605, 606, 607, 608 and 609, respectively.

The control electrodes of the silicon controlled rectifier SCR-B of storage elements 640 and 641 are alternatively connected to the negative bias line 702 and the positive line 701B via relay contact KA1-3 which is normally in the position shown. The control electrodes of silicon controlled rectifiers SCR-B of storage elements 650—659 are connected to movable relay contact KA2-3 which in turn is alternatively connected to the negative bias line 702 and a relay contact KA1-1, the contact KA2-3 and KA1-1 being normally in the position shown. The contact KA1-1 is alternately connected to negative bias line 702 and the positive line 701B. The control electrodes of the silicon controlled rectifiers SCR-B of storage elements 660—669 are alternately connected to the negative bias line 702 and a movable relay contact KA2-2 via a movable relay contact KA3-3 normally in the position shown. The movable contact KA2-2 is alternately connected to the negative bias line 702 and the positive line 701B, the contact KA2-2 normally being in the position shown. The control electrodes of the silicon controlled rectifiers SCR-B of the storage elements 670—679 are alternately connected to the negative bias line 702 and the movable relay contact KA3-2 via a movable relay contact KA4-3, contacts KA3-2 and KA4-3 normally being in the position shown. The movable contact KA3-2 is alternately connected to the negative bias line 702 and the positive line 701B. The control electrodes of the silicon controlled rectifiers SCR-B of the storage elements 680—698 are alternately connected to the negative bias line 702 and a movable contact KA4-2 via a movable contact KA5-3, the contacts KA4-2 and KA5-3 normally being in the position shown. The movable contact KA4-2 is alternately connected to the negative bias line 702 and the positive line 701B. The control electrodes of the silicon controlled rectifiers SCR-B of the storage elements 690—699 are alternatively connected to the negative bias line 702 and a movable contact KA5-2 via a movable contact KA6-3, contacts KA5-2 and KA6-3 being normally in the position shown. The movable contact KA5-2 is alternatively connected to the negative bias line 702 and the positive line 701B.

The sequencer 631 includes a pair of parallel connected relays KA7 and KA8. The relays KA7 and KA8 are connected at one end to the positive line P3 via the series connected contacts KA6-4 and K12-1 and at their other end to the negative line 700 via two parallel paths of series connected contacts. One of the paths includes series connected contacts 605-2, 606-2, 607-2, 608-2, and 609-2 which are associated with the digit keys 605, 606, 607, 608 and 609, respectively. The second path of series connected contacts includes contacts 601-2, 602-2, 603-2, 604-2, and 600-2 associated with digit keys 601, 602, 603, 604, and 600, respectively.

The contacts 600-2 to 609-2, like the contacts 600-1 to 609-1 are momentarily transferred when their associated digit keys 600—609, respectively, are actuated. The relays KA7 and KA8 become actuated each time one of the contacts 600-2 to 609-2 transfers, which occurs each time one of the digit keys 600—609 is momentarily depressed to enter a digit into the keyboard. The energization of the relays KA7 and KA8 completes a positive circuit from line P3 through resistor RA75 to positive line 701B and through resistor RA74 and normally closed contact K12-2 to positive 701A. In addition, the energization of the relays KA7 and KA8 each time one of the digit keys 600—609 is depressed is effective to momentarily transfer contacts KA7-1, KA7-2, KA7-3, KA7-4, KA8-1 and KA8-2, for a reason to become evident hereafter.

The sequencer 631 further includes a plurality of parallel circuit paths connected between the positive line P3 and the grounded line 700, the parallel paths including respectively, series connected diode, relay and silicon controlled rectifier combinations D1B, KA1 and SCR-A121, D2B, KA2 and SCR-A122, D3B, KA3 and SCR-A123, D4B, KA4 and SCR-A124, D5B, KA5 and SCR-A125, and D6B, KA6 and SCR-A126. The control electrodes of the silicon controlled rectifiers SCR-A121 to SCR-A126 are resistively coupled to normally closed movable relay contacts KA7-1, KA7-2, KA7-3, KA7-4, KA8-1, and KA8-2, respectively. The movable contacts KA7-1 to KA7-4 and KA8-1 and KA8-2, in turn, are permanently connected to one side of capacitors CA1 to CA6, respectively, and selectively connected between the positive line P3 via a resistor RA73 and the control electrodes of SCR-A121—SCR-A126, respectively. The capacitors CA2—CA6 at their other terminal are connected to the cathodes and anodes of silicon controlled rectifiers SCR-A122 to SCR-A126, respectively, via diodes D2—D6, respectively, and via diodes D2A—D6A, respectively. Diodes D2—D6 prevent the capacitors CA2—CA6 from charging through diodes D2B—D6B, respectively. Diodes D2A—D6A prevent the capacitors CA2—CA6, respectively, from charging prior to the firing of SCR-A121 to SCR-A125, respectively.

The operation of the digit memory 630 and the sequencer 631 is described in detail hereafter in conjunction with the description of the operation of the entire system. It is sufficient to note at this point that sequencer 631, in response to the successive transfer of different ones of the contacts 600-2 to 609-2 by depression of the digit keys 600—609 is effective to successively enable the storage elements 640—641, 650—659, 660—669, 670—679, 680—689, and 690—699 on a group-by-group basis. With these groups of storage elements successively enabled, the sequential entry of the address digits into the keyboard 23 by successive actuation of keys 600—609 successively fires pairs of SCRs, storing the digits in the above noted groups as different ones of the contacts 600-1 to 609-1 transfer due to actuation of different ones of the keys 600—609.

X, Y and Z Servo Control Circuits

The servo control circuit which controls the operation of the X, Y and Z servo motors 102, 162 and 201, respectively, for positioning the X, Y and Z carriage components at the appropriate locations in response to the entry of a cartridge and/or card address into the keyboard 23. This circuit includes, as shown more particularly in FIG. 48, four sets of digit relays 750, 751, 752 and 753. The digit relay sets 750—753 correspond, respectively, to the first four digits of an address entered into the keyboard and designate the particular storage wall and the pocket in that wall in which the desired card and/or cartridge is stored.

Figure 46:
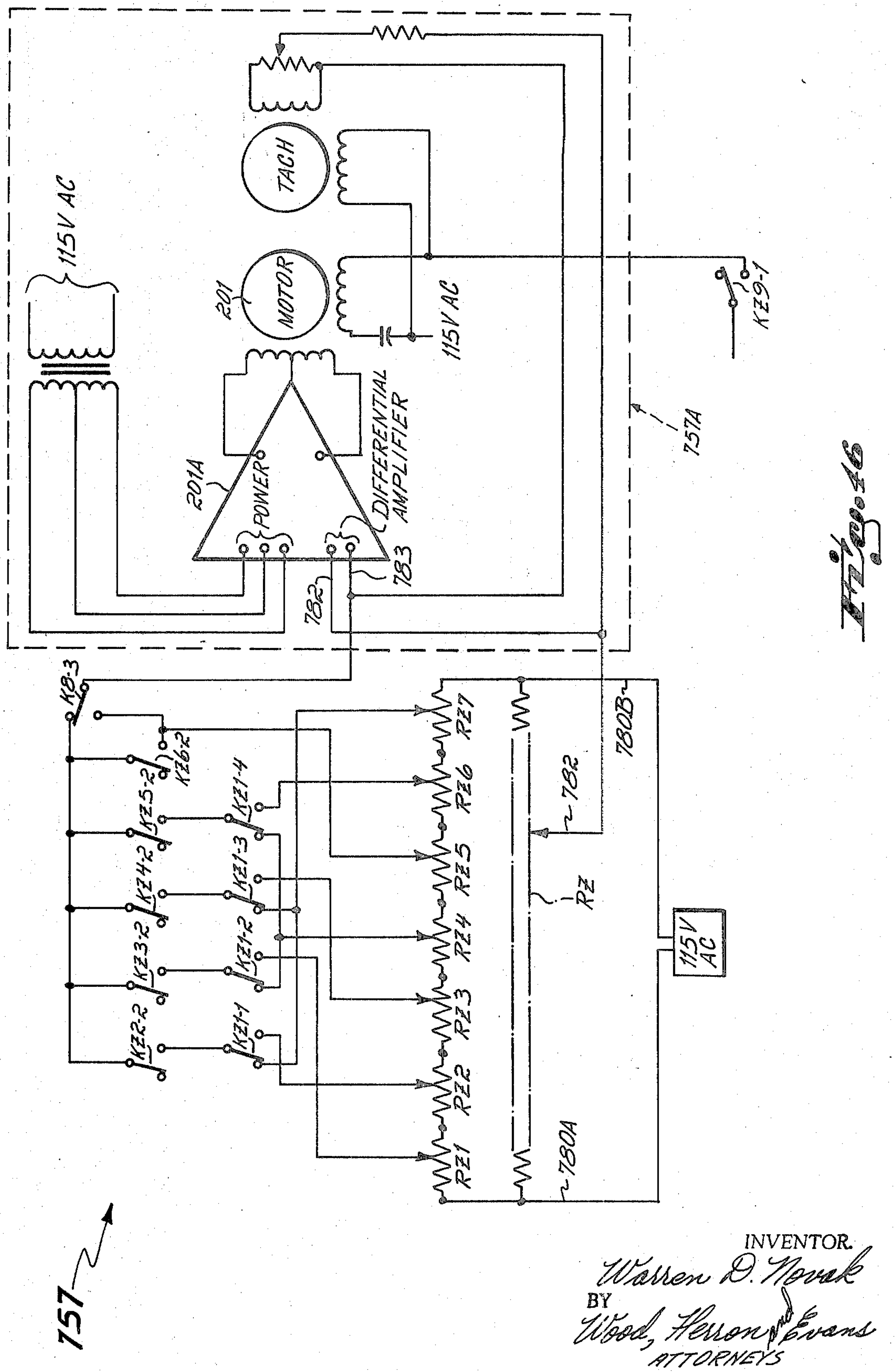

Also included in the control circuit and cooperating with the digit relays 750—753 and the X, Y and Z servo motors 102, 162, and 201 are three self-balancing potentiometer bridge networks, namely, an X potentiometer 755 (FIG. 47), a Y potentiometer 756 (FIG. 48), and a Z potentiometer 757 (FIG. 46). Associated with the potentiometer bridge networks 755—757 are three servo drives and associated controls 755A—757A. The potentiometers 755—757 and servo controls and associated circuits 755A—757A function to transform the three digits designating the storage compartment or pocket 15 into appropriate X, Y and Z command or error signals for the X, Y and Z servo motors 102, 162 and 201, respectively. The servo drives and associated controls 755A—757A for effecting balance of potentiometer bridges 755—757, respectively, may be of any conventional design. For example, they may be of the type manufactured by the Diehl Division of Singer Manufacturing Company under the designation Model P840-58-MI.

Further included in the X, Y and Z servo control circuit is a Z programmer 760 (FIG. 49). The Z programmer 760, in conjunction with the direct and bulk access station control circuit of FIGS. 41—43 to be described, programs, or sequences, the various Z command signals generated by the Z potentiometer 757, thereby insuring that the various cartridge extraction and insertion operations of a retrieval cycle are performed in the proper order relative to the various other operations comprising the entire card and/or cartridge retrieval cycle.

Digit Relays

The digit relay set 750 functions with respect to the first digit entered into the keyboard identifying the wall in which the desired card or cartridge is stored, and includes a front storage wall relay KZ0 and a rear storage wall relay KZ1. The relays KZ0 and KZ1 at one end are connected in common to a line 761 which, in turn, is connected to a suitable source of positive potential 762, and at their other end are connected to the output terminals 640-T and 641-T of the digit storage element 640 and 641, respectively. When the desired card or cartridge is stored in the front storage wall 12 and the digit 0 therefore entered into the keyboard as the first address digit, firing the SCRs of storage element 640 and producing a low voltage output at terminal 640-T, the relay KZ0 is energized. Alternatively, should the first address digit entered into the keyboard 23 be the digit 1 corresponding to the rear storage wall 13, the SCRs of storage elements 641 fire, lowering the potential at output terminal 641-T, and thereby energizing the relay KZ1. Thus, for each card and/or cartridge address entered into the keyboard, one of the relays KZ0 or KZ1 is energized. The particular relay KZ0 or KZ1 energized in turn depends on the storage wall in which the desired card and/or cartridge is stored and, hence, upon the digit key 600 or 601 which is first depressed. For example, if the card address 132476 is entered into the keyboard 23, the relay KZ1 is energized in response to the firing of the SCRs of storage element 641 as the digit key 601 is actuated.

The digit relay set 751 corresponds to the first digit of the pocket address, which actually is the second digit entered into the keyboard 23, and includes 10 relays KYO—KY9 corresponding to the 10 possible values which the first digit of the pocket address may assume. The relays KYO—KY9 are connected at one end in common to the positive line 761 and at their other end, respectively, to the output terminals 650-T to 659-T of the storage elements 650—659 in which the first digit of the pocket address is stored.

Each time a cartridge and/or pocket address is entered into the keyboard 23 and one of the storage elements 650—659 has its SCRs fired in response to actuation of one of the digit keys 600—609, one of the relays KYO—KY9 becomes energized. For example, in the illustration of the keyboard operation provided earlier wherein the address 132476 is entered, entry of the digit 3 into the keyboard as the second digit of the address is effective to energize relay KY3 which, once energized, remains energized as long as the storage element 641 is not reset.

The set of digit relays 752 correspond to the second digit of the pocket address, which is actually the third digit entered into the keyboard, and includes five relays KXX0—KXX4. The relays KXX0—KXX4 are connected at one end in common to the positive line 761 and at their other end to the output terminals 660-T and 665-t, 661-T and 666-T, 662-T and 667-T, 663-T and 668-T and 664-T and 669-T, respectively, of storage elements 660 and 665, 661 and 666, 662 and 667, 663 and 668, and 664 and 669, respectively. Each time the second digit of a pocket address is entered into the keyboard 23, one of the relays KXX0—KXX4 is energized. Specifically, if the second digit of the pocket address is 0 or 5, 1 or 6, 2 or 7, 3 or 8, or 4 or 9, relay KXX0, KXX1, KXX2, KXX3 or KXX4, respectively, become energized. In the example given of the keyboard operation in which the card address 132476 is entered, depression of the digit key 602 to enter the second digit 2 of the pocket address is effective energize relay KXX2.

The relay set 752 further includes relays KYY0 and KYY1. The relays KYY0 and KYY1 are connected in common at their one end to the positive line 761 and at their other end to the outputs 660-T to 664-T and 665-T to 669-T, respectively. In addition to one of the relays KXX0—KXX4 becoming energized when the digit corresponding to the second digit of the pocket address is entered into the keyboard, one of the relays KYY0 or KYY1 also becomes energized. Specifically, relay KYY0 becomes energized if the second digit of a pocket address is 0—4, while relay KYY1 becomes energized if the second digit of a pocket address is 5—9. In the illustrative example given earlier wherein the card address 132476 is entered, the relay KYY0 is energized since the second digit of the pocket address is the digit 2.

The set of digit relays 753 correspond to the third digit of the pocket address, which is actually the fourth digit entered into the keyboard, and includes 10 relays KX0—KX9. The relays KX0—KX9 are connected at one end in common to the positive line 761 and at their other end to the outputs 670-T to 679-T, respectively, of the digit storage elements 670—679. One of the relays KX0—KX9 becomes energized each time the address of a card and/or cartridge is entered into the keyboard 23. For example, in the illustration noted earlier wherein the card address 132476 is entered, the relay KX4 is energized in response to the entry of the digit 4 into the keyboard as the third digit of the pocket address.

Y Self-Balancing Potentiometer

The Y potentiometer 756 includes a first resistor RY associated with a movable potentiometer contact 763 and a set of series connected resistors RY0—RY19 associated, respectively, with relay contacts KY0-0 to KY0-9 and KY0-2 to KY9-2. The resistor RY and the series connected resistors RY0—RY19 are connected in parallel across lines 764A and 764B which, in turn, are connected across a suitable source of potential (not shown). The relay contacts KY0-1 to KY9-1 and KY0-2 to KY9-2 are connected via normally open relay contacts KYY0-1 and KYY1-1, respectively, to a line 759. Line 759 in turn is connected via relay contact KYR1-1 and a line 765 to one input of a differential amplifier 162A, the other input of which is connected to the movable potentiometer contact 763. The line 765 constituting one input of the differential amplifier 162A is alternatively connectable via transferred contact KYR1-1 to movable bulk access relay contact K11-3, contact K11-3 in turn being alternatively connectable between resistor RY5 and resistor RY8.

The resistors RY0—RY19 correspond to different ones of the twenty horizontal rows of storage compartments in the front and rear storage walls 12 and 13 and when connected to the differential amplifier input line 765 via different ones of the contacts KY0-1 to KY9-1, KY0-2 to KY9-2, KYY0-1, KYY1-1, KYR1-1 and K11-3 provide voltage inputs to the differential amplifier which are linearly related to the vertical position of the different horizontal rows of storage compartments, that is, to the Y coordinate of the various horizontal rows of pockets. The movable potentiometer contact 763 which constitutes the other input of the differential amplifier 162A provides a voltage input to the differential amplifier which is linearly related to the present vertical position of the Y carriage component, that is, which is linearly related to the present Y coordinate of the Y carriage component location.

In practice, the movable contact 763 is mechanically coupled to the shaft 163 of the Y servo motor 162 by any suitable means (not shown). Since the Y servo motor shaft 163 drives the Y carriage component, the angular position of the Y servo motor shaft reflects the position of the Y carriage component. Consequently, by mechanically coupling the Y servo motor shaft 163 to the movable potentiometer contact 763, the position of the movable contact, and hence the voltage input to the Y differential amplifier 162A on line 763, is representative of and reflects the present position of the Y carriage component.

The difference in the voltages present on lines 763 and 765 is representative of the vertical distance separating the present location of the Y carriage component and the location to which it is desired to position the Y carriage component. This difference in voltage is input to the differential amplifier 162A and causes a Y servo error signal to be generated which is then utilized to energize the Y servo motor 162 for driving the Y carriage component in the direction and for the distance necessary to position the Y carriage component at the desired horizontal row of pockets, that is, at the desired Y coordinate location.

As those skilled in the art of servo control appreciate, the voltage differential between amplifier input lines 763 and 765, as well as the error signal output from the differential amplifier 162A, has both magnitude and polarity. The magnitude determines the absolute distance through which the Y carriage component is driven to position it at the desired Y coordinate location, while the polarity indicates the direction it is driven to position it at the desired Y coordinate location.

For example, if, as in the illustration given previously with respect to the operation of the keyboard 23, it is desired to position the carriage for retrieval of the card having the address 132476, the digit keys 603 and 602 are depressed for entering the first and second digits of the pocket address. The energization of relay KY3 transfers the contact KY3-1. The energization of relay KYY0 transfers the contact KYY0-1. The energization of relay KY3 is effective to transfer the contacts KY3-1 and KY3-2. The transfer of contact KY3-2 is ineffective to couple one of the resistors RY0—RY19 to the differential amplifier 162 inasmuch as the relay KYY1 is not energized and the contact KYY1-1 remains open. However, the transfer of relay contact KYY0-1 is effective to complete a circuit from the resistor RY6 to the differential amplifier input 765 via transferred contact KY3-1 and KYY0-1.

The completion of a circuit from resistor RY6 to the differential amplifier 162A as a consequence of the entry into the keyboard of the first two digits of the pocket address, the digits 3 and 2, causes a voltage to be input to the differential amplifier which is linearly related to the Y coordinate location of the seventh horizontal row of storage compartments, that is, to the horizontal row of storage compartments containing the pocket 324. The voltage input to the differential amplifier on line 765 corresponding to the horizontal row of storage compartments to which the carriage is desired to be positioned, when compared with the voltage input to the differential amplifier on line 763 corresponding to the Y coordinate of the present location of the Y carriage component, produces an error signal which is input to the Y servo motor 162 for driving the Y carriage component to a position opposite the seventh horizontal row of storage compartments.

Specifically, the voltage differential input to the Y servo amplifier 162A on lines 765 and 763 produces an error signal having a magnitude proportional to the vertical distance between the present location of the Y carriage component and the location to which the Y carriage component is to be driven, and having a polarity corresponding to the direction in which the Y carriage component is to be moved, which is either vertically upward or downward depending on whether the Y carriage component is presently located above or below the seventh horizontal row of storage compartments. Of course, should the Y carriage component already be aligned with the horizontal row of storage compartments containing pocket 324, the voltage input on amplifier line 763 is equal to the input on line 765, producing no error signal and no energization of the Y servo motor 162. Consequently, the Y carriage component is not shifted vertically.

Should it be desired to position the Y carriage component opposite the horizontal row of storage compartments containing the bulk access station 54, the resistor RY8 is connected to the differential amplifier input line 765 via the transferred contact K11-3 associated with the reset relay K11 of the direct and bulk access station control circuit, to be described, and contact KRY1-1. It is sufficient to note at this juncture that the relay K11 becomes energized when the bulk access switch 618 is depressed and effectively transfers contact K11-3 to couple resistor RY8 to the Y differential amplifier 162A. When the resistor RY8 is so coupled, a voltage is applied on amplifier line 765 corresponding to the ninth horizontal row which contains the bulk access port. This voltage from the resistor RY8 is effective to drive the Y carriage component to a position opposite the ninth horizontal row of storage compartments in the same manner that the resistor RY6 is effective to drive the Y carriage component to a position opposite the seventh horizontal row of storage compartments.

Should it be desired to position the Y carriage component opposite the horizontal row of storage compartments containing the direct access port 53, the resistor RY5 is coupled to the differential amplifier via nontransferred contact K11-3 and transferred contact KYR1-1, the contact KYR1-1 transferring when the relay KYR1 of the Z programmer circuit, to be described, becomes energized. The coupling of resistor RY5 to the differential amplifier 162A provides an input voltage on line 765 which is effective, when compared with the voltage input on line 763 corresponding to the present position of the Y carriage component, to produce an error signal which is input to the Y servo motor 162 for driving the Y carriage component to a position opposite the sixth horizontal row of storage compartments containing the direct access port 53.

The Y servo motor circuit includes the parallel connected relay contacts KYY1-2 and KYY0-2 which are normally open to prevent the energization of the Y servo motor 162, but which close when either of the relays KYY0 or KYY1 becomes energized in response to the entry into the keyboard 23 of the second digit of the entry into the keyboard 23 of the second digit of the pocket address. Thus, the Y servo motor is disabled until both the first and second digits of the pocket address are entered, and the precise location of the horizontal row of storage elements to which the Y carriage component is to be positioned has been fully determined.

X Self-Balancing Potentiometer

The X potentiometer 755 includes a first resistor RX associated with a movable potentiometer contact 774 and a set of series connected resistors RX0—RX49, RXR1 and RXR2. The resistors RX and RX0—RX49, RXR1 and RXR2 are connected in parallel across a pair of lines 765A and 765B which in turn are connected across a suitable source of potential (not shown). The resistors RX0—RX9, RX10—RX19, RX20—RX29, RX30—RX39, and RX40—RX49 are associated, respectively, with relay contacts KX0-1 to KX9-1, KX0-2 to KX9-2, KX0-3 to KX9-3, KX0-4 to KX9-4, and KX0-5 to KX9-5, which in turn are associated with normally open contacts KXX0-1 to KXX4-1, respectively. The relay contacts KXX0-1 to KXX4-1 are connected in common to one input 775 of an X differential amplifier 102A via the normally closed contact KXR1-1. The relay RXR2 is connected to the differential amplifier input line 775 via normally open contacts K11-4 and KXR1-1. The resistor RXR1 is connected to the differential amplifier input line 775 via normally closed contact K11-4 and normally open contact KXR1-1.

The resistors RX0—RX49 correspond to different ones of the 50 vertical columns of storage compartments in the front and rear storage walls 12 and 13 in which are normally stored cardcontaining pockets. The resistors RX0—RX49 when connected to the differential amplifier input line 775 by different ones of the contacts KX0-1 to KX9-1, KX0-2 to KX9-2, KX0-3 to KX9-3, KX0-4 to KX9-4, KX0-5 to KX9-5, KXX0-1 to KXX4-1 and KXR1-1 provide voltage inputs on the X differential amplifier input line 775 which are linearly related to the horizontal position of the different vertical columns of storage compartments, that is, to the X coordinate of the various vertical columns of pockets.

The resistors RXR1 and RXR2 when connected to the differential amplifier input line 775 via nontransferred contact K11-4 and transferred contact KXR1-1, and transferred contacts K11-4 and KXR1-1, respectively, provide voltages on Y differential amplifier input line 775 which are related to the vertical columns containing the direct access port 54 and the bulk access port 53, respectively, that is, to the Y coordinate of the various vertical columns of pockets containing the direct and bulk access ports, respectively.

The movable potentiometer arm 774 constitutes the other input to the differential amplifier 102A and provides a voltage input to the differential amplifier which is linearly related to the present horizontal position of the X carriage component, that is, which is linearly related to the present X coordinate of the X carriage component location.

In practice, the movable contact 774 is mechanically coupled to the shaft 103 of the X servo motor 102 by any suitable means (not shown). Since the X servo motor shaft 103 drives the X carriage component, the angular position of the X servo motor shaft reflects the position of the X carriage component. Consequently, by mechanically coupling the X servo motor shaft 103 to the movable potentiometer contact 774, the position of the movable contact, and hence the voltage input to the X differential amplifier 102A on line 774 is representative of and reflects the present position of the X carriage component.

The difference in the voltages present on lines 774 and 775 is representative of the horizontal distance separating the present location of the X carriage component and the location to which it is desired to position the X carriage component. This difference in voltage input to the X differential amplifier 102A generates the X servo error signal which in turn is utilized to energize the X servo motor 102 for driving the X carriage component in the direction and for the distance necessary to position the X carriage component at the desired vertical column of pockets, that is, at the desired X coordinate location.

In operation, the particular one of the resistors RX0—RX49, RXR1, and RXR2 which is connected to the X differential amplifier input line 775 depends upon the particular column to which it is desired to align the X carriage component. That is, it depends upon whether it is desired to align the X carriage component opposite one of the 50 vertical columns in which cartridges are stored, the column in which the direct access port 54 is located, or the column in which the bulk access port 53 is located. If it is desired to locate the X carriage component opposite the column containing the bulk access port 53, the contact K11-4 and KXR1-1 transfer. If location of the X carriage component opposite the column containing the direct access station 54 is desired, the contact KXR1-1 is transferred.

If it is desired to position the X carriage component opposite one of the vertical columns in which cartridges are stored, the particular column to which the carriage is driven depends upon which of the relays associated therewith transfer, which in turn depends upon the second and third digits of the pocket address. For example, if, as in the illustration given previously with respect to the operation of the keyboard 23, it is desired to position the carriage for retrieval of the pocket containing the card 132476, the digit keys 602 and 604 are depressed for entering the second and third digits of the pocket address. This is effective to fire the SCRs of storage elements 662 and 674 which in turn energize relays KXX2 and KX4. The energization of relay KXX2 transfers contact KXX2-1. The energization of relay KX4 is effective to transfer contacts KX4-1 to KX4-5. The transfer of contacts KX4-1, KX4-3, KX4-4, and KX4-5 are ineffective to complete any circuits between the resistors KX4, KX14, KX34, and KX44, since contacts KXX0-1, KXX1-1, KXX3-1, and KXX4-1 are not transferred. However, the transfer of contact KX4-3 is effective to couple resistor RX24 to the differential amplifier input line 775 via transfer contact KXX2-1.

The completion of a circuit from RX24 to the differential amplifier input line 775, as a consequence of entering into the keyboard the last two digits, the digits 24, of the pocket address 324, causes a voltage to be input to the differential amplifier which is linearly related to the X coordinate of the vertical column numbered 24. In practice, the physical location of vertical column numbered 24 is actually coincident with the twenty-sixth vertical column since the first vertical column is numbered 0 and since between the columns numbered 0 and numbered 24 is positioned the empty column 57 in which is located the bulk access station 53. The voltage input to the differential amplifier on line 775 corresponding to the position to which the X carriage component is to be driven, when compared with the voltage input on line 774 corresponding to the present location of the X carriage component, produces an error signal output from differential amplifier 102A. This error signal drives the X servo motor 102 in a direction and for the distance necessary to position the X carriage component opposite the vertical column numbered 24. Of course, if the X carriage component is already aligned with vertical column numbered 24, the voltages input on lines 774 and 775 are equal, producing no error signal, and consequently, no motion of the carriage in the X direction is produced.

A lock out relay KA4-4 in circuit with the X servo motor 102 is provided to prevent operation of the X servo motor 102 until after the fourth digit of a card and/or cartridge address is entered into the keyboard, that is, until after the last two digits of the pocket address are entered. The contact KA4-4 transfers from the position shown upon energization of relay KA4-4 of the keyboard when the fourth digit of the address is entered. This then enables or conditions the X servo motor 102 for imparting positioning motion to the X carriage component.

Z Self-Balancing Potentiometer

The Z potentiometer 757 includes a resistor RZ connected in parallel with a series of resistors RZ1—RZ7. The parallel combination of resistors RZ and RZ1—RZ7 are connected across lines 780A and 780B which, in turn, are connected across a suitable source of potential (not shown). Associated with the resistor RZ is a movable contact 782 which constitutes one input to a Z differential amplifier 201A. Contact 782 provides a voltage input to the differential amplifier 201A which is related to the distance the tang 184 and wheel 189 traveled from the predetermined home position depicted in FIG. 19, that is, which is related to the present position of the tang and wheel.

In practice the movable contact 782 is mechanically coupled to the Z chain sprocket drive shaft 127 via any suitable means (not shown). Since the shaft 127 drives the tang 184 and wheel assembly 185 the angular position of the shaft 127 reflects the position of the tang and wheel assembly. Consequently, by mechanically coupling the shaft 127 to the movable potentiometer contact 782, the position of the movable contact, and hence, the voltage input to the Z differential amplifier 201A on line 782 is representative of and reflects the present position of the tang 184 and wheel assembly 185.

The resistors RZ1—RZ7 correspond to the different locations to which it is desired to position the tang 184 and wheel 189 in the course of transferring cartridges between the carriage and the various storage compartments 15 and access ports 53 and 54. The resistors RZ1—RZ7 are connected to the second input 783 of the differential amplifier 201A via pairs of contacts KZ1-1 to KZ1-4 and KZ2-2 to KZ6-2 and K8-3.

In use, the connection of resistor RZ5 to the differential amplifier input line 783 operates to reset the Z carriage component, that is, to return the tang 184 and wheel 189 to the position shown in FIG. 19. Thus, when resistor RZ5 is connected to the Z differential amplifier 201A via either transferred contact K8-3 or transferred contact KZ6-2 and untransferred contact K8-3, a voltage comparison occurs between the voltage from resistor RZ-5 on line 783 and that from the movable contact 782, producing a differential voltage input to the amplifier 201A having a magnitude and polarity such that the Z servo motor 201 is driven in the direction and for the number of revolutions necessary to restore the tang 184 and wheel 189 to the home position of FIG. 19. Of course, if the tang 184 and wheel 189 are already in the home position as depicted in FIG. 19, the voltages input to the differential amplifier 201A on lines 783 and 782 are equal and the Z servo motor is not energized.

In like manner, connection of resistors RZ1, RZ2, RZ3, RZ4, RZ6 and RZ7 produces voltages input to the differential amplifier 201A on line 783 such that the tang 184 and wheel 189 are driven by the Z servo motor 201 and associated Z drive cable to the positions necessary for transferring a cartridge retrieved from the rear storage wall 13 from the carriage to the access ports 53 and 54, transferring a cartridge from the rear storage wall 13 to the carriage, transferring a cartridge from the access ports 53 and 54 to the carriage, returning the tang 184 and wheel 189 to the home position after having transferred a cartridge from the carriage to the rear storage wall 13, and transferring a cartridge normally stored in the front storage wall 12 from the carriage to the access ports, respectively.

In operation, assuming the card having the address 132476 is to be selected, and the address is entered into the keyboard 23, the resistors RZ2, RZ1, RZ3, RZ6 and RZ5 are successively connected to the differential amplifier input line 783 to extract the desired cartridge from the rear storage wall 13 and transfer it to the carriage for subsequent transfer to the direct access port, transfer the cartridge from the carriage to the direct access port, retransfer the cartridge from the direct access port to the carriage following the selection operation, transfer the cartridge from the carriage to its storage compartment in the rear wall, and reset the tang 184 and wheel 189 to the home position. Specifically, resistor RZ-2 is connected to the differential amplifier input 783 via transferred contact KZ1-1 and KZ2-2 and untransferred contact K8-3 to cause the Z carriage component to transfer the cartridge having pocket address 324 from the rear wall to the carriage. Resistor RZ1 is connected to the differential amplifier input line 783 via transferred contacts KZ1-2 and KZ3-2 and untransferred contact K8-3 to cause the Z carriage component to transfer the cartridge from the carriage to the direct access port 54. Resistor RZ3 is connected to the differential amplifier input line 783 via transferred contacts KZ1-3 and KZ4-2 and untransferred contact K8-3 to cause the Z carriage component to transfer the cartridge from the direct access port 54 to the carriage following the card selection operation.

Resistor RZ6 is connected to the differential amplifier input line 783 via transferred contacts KZ1-4 and KZ5-2 and untransferred contact K8-3 to cause Z carriage component operation to transfer the cartridge from the carriage to its storage pocket 324 in the rear wall 13. Resistor RZ5 is connected to the differential amplifier input line 783 via transferred contact KZ6-2 and transferred contact K8-3 to cause the Z carriage component to be reset to the home position of FIG. 19.

The contacts KZ1-1 to KZ1-4 are normally in the position shown in FIG. 46. In this position, they condition the resistors RZ1—RZ7 for connection to the amplifier 201A in response to the transfer of different ones of the contacts KZ2-2 to KZ6-2 for a retrieval cycle in which the cartridge to be retrieved is stored in the front storage wall 12. When the contacts KZ1-1 to KZ1-4 transfer in response to the energization of the relay KZ1, which occurs when the first digit of the address is the digit 1 corresponding to the rear storage wall 13, the resistors RZ1-7 are conditioned for connection to the amplifier 201A via transferred contacts KZ2-2 to KZ6-2 for a retrieval operation in which the cartridge is normally stored in the rear storage wall 13. The contacts KZ2-2 to KZ6-2 transfer in a manner controlled by the operation of the Z programmer to be described in conjunction with FIG. 49.

A lock out contact KZ9-1 connected in the Z servo motor circuit is provided to disable the Z servo motor 201 each time carriage motion in either the X or Y direction is initiated by energization of either the X or Y servo motors 102 and 162, respectively.

Z Programmer

The Z programmer circuit depicted in FIG. 49 functions to correlate the operation of the Z servo motor 201 and, hence, the operation of the tang 184 and the wheel 189 with the operation of the X and Y servo motors 102 and 162, the access port gates 280 and the direct and bulk access stations 22 and 28. Such correlation is necessary, for example, to prevent energization of the Z servo motor 201 and movement of the tang 184 simultaneously with the energization of the X and Y servo motors 102 and 162, thereby avoiding the ejection of a cartridge from the carriage in the course of moving to or from an access port which could result in damage to the cartridge being ejected.

To accomplish the Z programming function, relays KZ2—KZ9, KSZ1, KYR1 and KXR1, and K12 are provided. In addition, the Z programmer includes solenoids LZ1 and LZ2.

The relay KZ2 has as its principal function the transfer of contact KZ2-2 of the Z potentiometer circuit to effect the transfer of a cartridge from the storage wall 12 or 13 to the carriage. It has the subsidiary function, when energized, of enabling the relays KYR1 and KXR1 via the contact KZ2-3, energizing the stepping relays KSZ1 thereby cocking the stepper, energizing solenoid LZ1 to thereby engage the Z servo clutch 210, and energizing relay KZ9. Relay KZ9 in turn deenergizes the Z servo brake solenoid LZ2 via transferred contact KZ9-2 to disengage the Z servo brake 209 and enable the Z servo motor 201 via transferred contact KZ9-1. The energization of stepper relay KSZ1, clutch solenoid LZ1, and the relay KZ9 which in turn enables the Z servo motor 201 and deenergizes the Z servo brake solenoid LZ2 is herein termed the initiation of the X–Y null present sequence. Likewise, the deenergization of the relay KSZ1, clutch solenoid LZ1, and relay KZ9 which in turn disables the Z servo motor 201 and engages the Z servo brake 209 is herein termed the termination of the X–Y null present sequence.

The relay KZ2 in order to become energized requires that the movable contact of the stepper deck KSZ1-A be in the home or 0 position, the search key 617 be momentarily depressed to effect the transfer of relay contact K0-1, the return key 620 not have been depressed transferring the relay contact K9-3, the X and Y carriage components be at rest, and no cartridge be present in the bulk access station 53 leaving the switch S18 in the position shown. The relay KZ2 becomes deenergized when either of the X or Y carriage components begins moving, transferring either of the X or Y null contacts from the position shown.

The relay KZ3 has as its principal function the transfer of the contact KZ3-2 on the Z potentiometer circuit to effect the transfer of the cartridge from the carriage to the access port. In addition, the relay KZ3 has as a subsidiary function the initiation of the X–Y null present sequence described above.

For relay KZ3 to become energized, it is necessary that the movable contact of the stepper deck KSZ1-A be in position number 1, switch S-9 not be tripped by the presence of a cartridge in the direct access station leaving relay contact K4-3 in the position shown, the X and Y carriage components be at rest causing the X and Y null contacts to be closed, and switch S18 be closed by the absence of a cartridge in the bulk access station 28. Relay KZ3 becomes deenergized when the cartridge arrives in the direct access station and switch S9 trips energizing relay K4 and transferring relay contact K4-3.

The relay KZ4 has as its primary function the transfer of contact KZ4-2 of the Z potentiometer circuit to thereby transfer a cartridge from an access port to the carriage. As secondary functions, the relay KZ4 initiates the X–Y null present sequence via the transfer of contact KZ4-1 and enables relays KZR1 and KXR1 via transferred contact KZ4-3. Relay KZ4 which latches through transferred contact KZ4-4, the X and Y null contacts, and switch S18, becomes deenergized upon the initiation of X or Y carriage component motion as an incident to leaving the access station when the X or Y null contacts transfer from the position shown.

The relay KZ5 has for its primary purpose the transfer of contact KZ5-2 of the Z potentiometer circuit to effect the transfer of a cartridge from the carriage to its storage compartment in either the front or rear storage wall 12 or 13. In addition, the relay KZ5 is effective to initiate the X–Y null present sequence by the transfer of its contact KZ5-1. Relay KZ5 also transfers its contact KZ5-3 to start a timing circuit comprising capacitor CZ2 which fires unijunction transistor QZ1 in turn firing silicon controlled rectifier SCRZ-1. This energizes relay KZ7 which effectively deenergizes, via contact KZ7-1, the relays KSZ1 and KZ9, and solenoid LZ1 to terminate the X–Y null present sequence which, among other things, advances the stepper from the position 3 to 4.

The relay KZ5 as a requisite for energization, requires that the movable contact of the stepper deck KSZ1-A be at position number 3, no X and Y carriage component motion exists leaving the X and Y null contacts closed, and switch S18 be closed. The relay KZ5 becomes deenergized when the movable contact of the stepper deck KSZ1-A advances to position number 4.

The relay KZ6 functions to return the tang 184 and the wheel 189 to the home position depicted in FIG. 19 via the transfer of contact KZ6-2 of the Z potentiometer circuit. In addition, the relay KZ6 initiates the X–Y null present sequence via transferred contact KZ6-1, starts the timer which includes capacitor CZ2 via transferred contact KZ6-3 to fire the unijunction transistor QZ2 which, in turn, fires the silicon controlled rectifier SCRZ-1 energizing relay KZ7 and thereby terminating the X–Y null present sequence which, among other things, advances the stepper KSZ1-A from position 4 to position 5. Relay KZ6 via its contact KZ6-4 operating in conjunction with relay contact KZ7-2 is also effective to interrupt the supply of power to the various control circuits of the retrieval system, thereby resetting the entire system control circuit.

The relay KZ6 becomes energized when the movable contact of the stepper deck KSZ1-A is at position number 4, the contact KZ7-1 is not transferred, switch S18 is closed, and there is no X or Y carriage component motion leaving the X or Y null contacts closed. Relay KZ6 becomes deenergized when the movable contact of stepper deck KSZ1-A moves from position 4 to position 5.

The relay KZ7 becomes successively energized when the movable contact of the stepper deck KSZ1-A is at positions 3 and 4 and when the silicon controlled rectifier SCR-Z1 has been fired by the combination of timer capacitor CZ2 and unijunction transistor QZ1. Relay KZ7 is utilized to deenergize the stepper relay KSZ1 via the transfer of contact KZ7-1 in turn advancing the stepper to positions 4 and 5 for deenergizing relays KZ5 and KZ6, respectively. In addition, relay KZ7 via its contact KZ7-2 is effective, in conjunction with contact KZ6-4, to interrupt the power to various portions of the control circuit of the retrieval system, and thereby resetting the system.

The relay KZ7 becomes successively deenergized when the movable contact of the stepper deck KSZ1-A moves from position 3 to position 4 and from position 4 to position 5.

Figure 47:
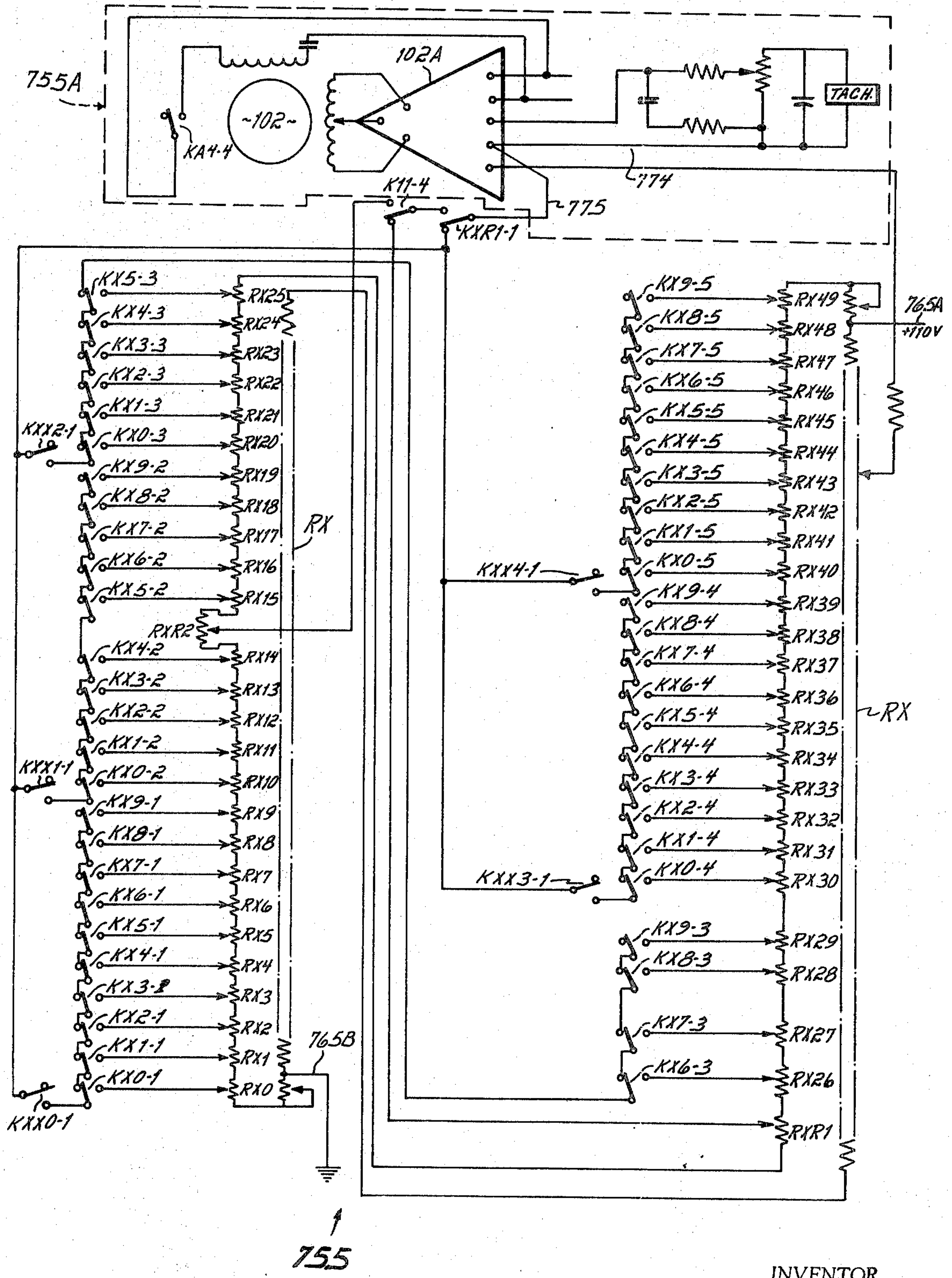
Figure 48:
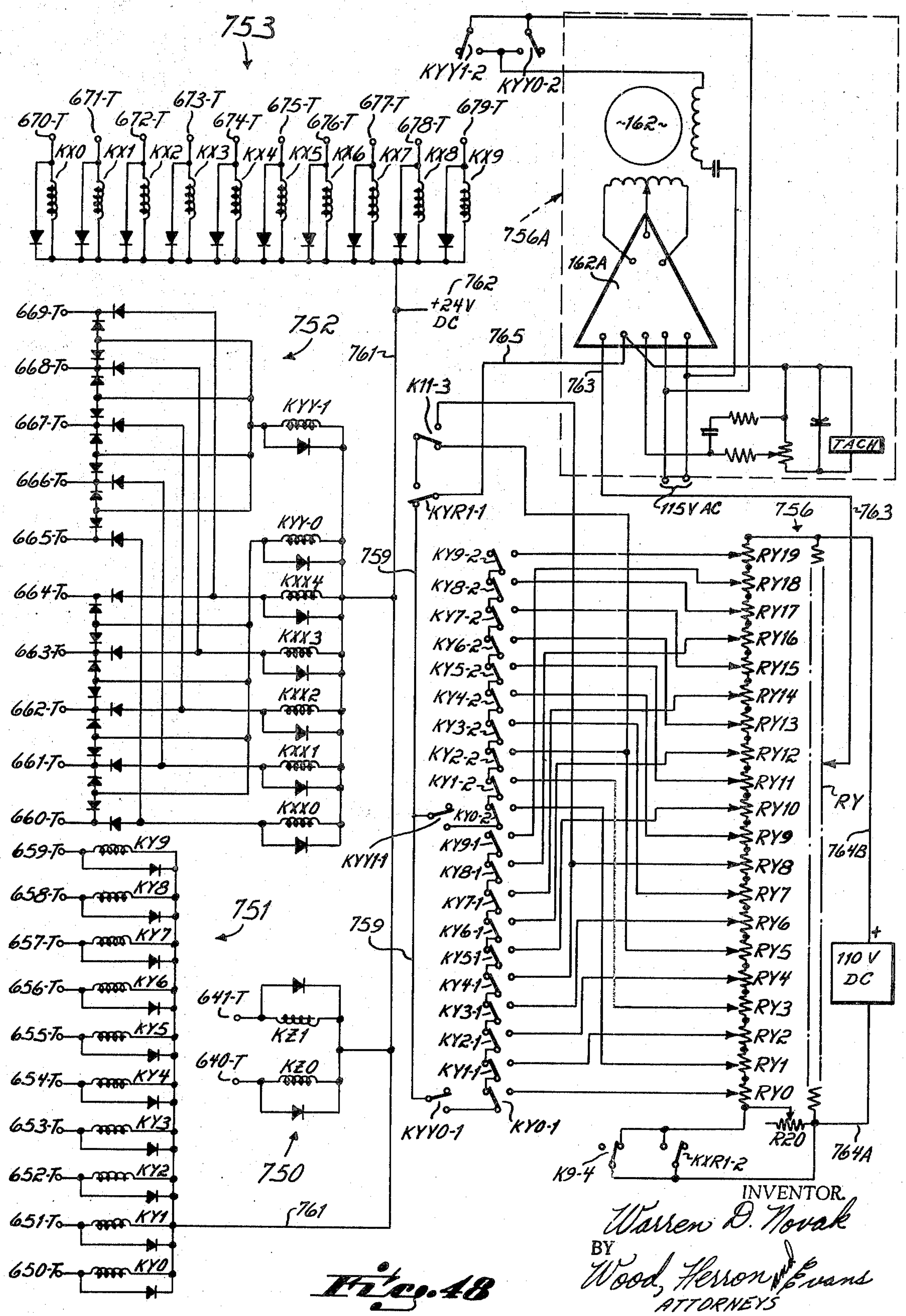

The relay KZ8 has as its principal function the deenergization of relays KXR1 and KYR1 which, in turn transfer their respective contacts KXR1-1 and KYR1-1 to the position shown in FIGS. 47 and 48, thereby conditioning the X and Y carriage components for movement to the storage compartment of the cartridge then positioned on the carriage. Prior to the transfer of relay contacts KYR1-1 and KXR1-1, the X and Y potentiometers are conditioned for maintaining the X and Y carriage components opposite the direct access port or the bulk access port, as the case may be. In essence, the relay KZ8, by effecting deenergization of relays KXR1 and KYR1, is effective to apply to the X and Y potentiometers the address of the cartridge which is stored in the keyboard 23 for driving the X and Y carriage components from the direct access port 54 to the storage location, while simultaneously removing from application to the X and Y potentiometers the address of the direct access port which functions to maintain the carriage opposite the access port while the cartridge is in the direct access station.

Relay KZ8 becomes energized when the Z servo motor 201 is deenergized, K9-1 is transferred, and the tang 184 and wheel 189 at rest leaving the Z null contact in the position shown, the relay contact KZ4-3 transferred, the switch S19 transferred by the presence of a cartridge in the carriage. The relay KZ8 becomes deenergized via the transfer of contact KZ4-3 when relay KZ4 becomes deenergized by the opening of the X–Y null contacts as the carriage leaves the access station to return to the storage wall.

The relay K12 becomes energized upon the transfer of switch S19 indicating that a cartridge is properly positioned on the carriage. Energization of relay K12 transfers contact K12-4 for disabling the keyboard relays KA7 and KA8. In addition, the contact K12-2 transfers interrupting the circuit from the positive line P3 of the keyboard to the line 701A.

The disablement of keyboard relays KA7 and KA8 coupled with the interruption of lines $P_3$ and 701A prevent the SCR's of the storage elements of the digit memory 630 from being triggered in response to actuation of digit keys 600—609. Hence, storage is prevented.

Z Programmer Operation

In operation, the Z programmer controls the energization of the Z servo motor as is necessary to transfer cartridges between the carriage and the storage walls and access ports. For example, assuming retrieval of a card having the address 132476 is desired and that such address has been entered into the keyboard 23, the carriage comes to rest in a position opposite the pocket 324 of the rear storage wall 13, producing an X and Y null. Further assume the search key 617 has been depressed. This energizes the relay K0 of the direct and bulk access station control circuit, to be described, completing an energization circuit to relay KZ2. The energization circuit to relay KZ2 includes the nontransferred switch contact S18 which reflects the absence of a cartridge at the bulk access station, the closed X and Y null contacts which reflect the rest condition of X and Y carriage components, the nontransferred contact K9-3 which reflects the previous non-actuation of the return key 620, the transferred contact K0-1 which reflects the energization of relay K0 by depression of the search button 617, and the presence of the movable contact of the stepper KSZ1-A at the home or 0 position.

The relay KZ2 upon energization transfers its contact KZ2-1. The transfer of contact KZ2-1 is effective to provide a latching circuit for the relay KZ2, as well as to complete an energization circuit to the Z servo clutch solenoid LZ1, the stepper relay KSZ1 and the relay KZ9. The energization of the solenoid LZ1 engages the Z servo clutch 210. The energization of the relay KSZ1 cocks the stepper for transfer to the position 1 upon deenergization. The energization of the relay KZ9 transfers the contact KZ9-2, deenergizing the Z brake solenoid LZ2 to thereby disengage the servo brake 209, and transfers the contact KZ9-1 enabling or conditioning the Z servo motor 201. The energization of the solenoid LZ1 and the relays KZ9 and KSZ1 to actuate the Z clutch and brake, cock the stepper and enable the Z servo motor constitutes the initiation of the X–Y null present sequence.

The relay KZ2 also transfers contact KZ2-3, enabling the relays KYR1 and KXR1.

In addition, the energization of the relay KZ2 transfers the contact KZ2-2 associated with the Z servo potentiometer 757. This completes a circuit from the resistors Rz2 to the differential amplifier 201A via nontransferred contact K8-3 and previously transferred contact KZ1-1. With the circuit complete from resistor RZ2 to the differential amplifier 201A, a voltage is input to the differential amplifier which, when compared to the voltage input on movable contact line 782 corresponding to the present tang 184 location, is effective to produce an error signal. This error signal is input to the Z servo motor 201 to thereby energize it and drive the tang 184 of the Z carriage component in a direction and in an amount sufficient to transfer a cartridge from the rear storage wall 13 to the carriage.

When the cartridge is properly positioned on the carriage, the carriage switch S19 transfers, further conditioning the relays KYR1 and KXR1. Relays KYR1 and KXR1 becomes energized when the Z null contact transfers to the position shown, which occurs when the tang 184 comes to rest. The energization of the relay KYR1 transfers contact KYR1-2 providing a latching circuit for the relays KYR1 and KXR1 via nontransferred contact KZ8-1. In addition, the energization of the relays KYR1 and KXR1 transfers their contacts KYR1-1 and KXR1-1 associated, respectively, with the Y potentiometer 756 of FIG. 48 and the X potentiometer 755 of FIG. 47. The transfer of contact KYR1-1 completes a circuit from the resistor RY5 to the differential amplifier via nontransferred contact K11-3 providing a voltage on amplifier input line 765 which, when compared with the voltage on line 763 corresponding to the present location of the Y carriage component, is effective to produce an error signal. This error signal energizes Y servo motor 162 for positioning the Y carriage component to a position opposite the sixth horizontal row of storage compartments containing the direct access port 54.

The transfer of contact KXR1-1 associated with the X potentiometer 755 of FIG. 47 completes a circuit from resistor RXR1 to the differential amplifier input line 775 via nontransferred contact K11-4 and transferred contact KXR1-1. The coupling of resistor RXR1 to the differential amplifier 102A is effective to provide on the input line 775 a voltage which, when compared to the voltage input on line 774 corresponding to the present location of the X carriage component, produces an error signal. This error signal is input to the X servo motor 102 for driving the X carriage component to a position opposite the vertical column of storage compartments in which the direct access port 54 is located, which in practice is the twenty-eighth column.

The X and Y carriage components begin moving toward the direct access port 54. As the carriage starts moving from a position opposite the storage compartment numbered 324, the X and Y nulls are lost and the X and Y null contacts open, causing the energization circuit for the relay KZ2 to be interrupted, deenergizing the relay KZ2. The deenergization of the relay KZ2 transfers the contact KZ2-1, interrupting the circuit to the Z servo clutch solenoid LZ1, the stepping relay KSZ1 and the relay KZ9. Deenergization of the solenoid LZ1 deenergizes the Z servo clutch 210, deenergization of the stepper relay KSZ1 advances the cocked stepper KSZ1-A from the home or 0 position to the position number 1. The deenergization of relay KZ9 transfers contact KZ9-2 to the position shown, energizing the Z servo brake solenoid LZ2, thereby applying the Z servo brake 209, and transfers the contact KZ9-1 of FIG. 46, disabling the Z servo motor. The deenergization of the solenoid LZ1 and the relays KZ9 and KSZ1 is herein termed the termination of the X–Y null present sequence. The transfer of the movable contact of the stepper deck KSZ1-A from the home position to the number 1 position applied positive potential from the line 790 to relay KZ3, conditioning this relay.

Upon arrival at the direct access port 54, the carriage comes to rest and X and Y nulls are produced, closing the X and Y null contacts, thereby completing an energization circuit to the relay KZ3 via nontransferred contact K4-3. The contact K4-3 is associated with the relay K4 of the direct and bulk access station control circuit, to be described. At this point, it is only necessary to understand that the relay K4 remains deenergized and the contact K4-3 in the position shown so long as the cartridge has not been transferred to the direct access station 22.

The energization of relay KZ3 transfers contact KZ3-1 to initiate the X–Y null present sequence. In addition, the contact KZ3-2 associated with the Z potentiometer 757 of FIG. 46 transfers and completes, in conjunction with the contact KZ1-2 which transfers upon the energization of the relay KZ1 in response to the entry into the keyboard of the first digit of the address, a circuit between the resistor RZ1 and the differential amplifier 201A. The coupling of the resistor RZ1 to the differential amplifier 201A is effective to provide a voltage on line 783 which, when compared with that present on line 782 corresponding to the present location of the tang 184, is effective to generate an error signal. This error signal drives the Z servo motor 201 in a direction and for a period sufficient to transfer the cartridge from the carriage to the direct access port 54.

When the cartridge has been inserted into the direct access port 54 and transferred to the direct access station 22 via the conveyor transport assembly 21, a switch S9 transfers momentarily, energizing the relay K4 of the direct and bulk access station control circuit. This transfers contact K4-3, which interrupts the energization circuit to the relay KZ3. Upon the deenergization of the relay KZ3, the contact KZ3-1 transfers to the position shown, terminating the X–Y null present sequence which, among other things, advances the movable contact of the stepper deck KSZ1-A to the number 2 position, disabling the relay KZ3 and conditioning the relay KZ4.

After the card selection phase of the retrieval cycle has been completed and it is desired to return the cartridge to its storage compartment, pocket number 324 in the rear storage wall 13, the return key 620 is depressed. This is effective, in a manner to be described, to cause the cartridge to be transferred by the conveyor transport assembly 21 from the direct access station 22 to the direct access port 54. Upon arrival of the cartridge in the direct access port 54, the direct access port gate is actuated as the cartridge strikes the gate and the gate lifted by its associated solenoid L41, tripping the switch S13-1 which causes its switch contacts to close. The closing of the switch S13-1 completes an energization circuit to the relay KZ4 via the contact K9-3 which transfers from the position shown when the return key 620 is depressed and the X and Y null contacts close.

The energization of the relay KZ4 transfers its contact KZ4-1, initiating the X–Y null present sequence. In addition, the relay KZ4-2 associated with the X potentiometer 757 of FIG. 46 transfers and, in combination with the transferred contact KZ1-3, completes a circuit from the resistor RZ3 to the differential amplifier input line 783 of the differential amplifier 201A. The completion of this circuit coupling the resistor RZ3 provides a voltage input to the differential amplifier on line 783 which, when compared to the voltage input on line 782 corresponding to the present position of the tang 184, is effective to generate an error signal. This error signal energizes the Z servo motor 201 to move the tang in a direction and for a distance sufficient to transfer the cartridge from the direct access port 54 to the carriage.

When the cartridge is properly positioned on the carriage and a Z null is achieved, the switch S19 and Z null contact close, completing an energization circuit to the relay KZ8 via closed contact K9-1. The energization of the relay KZ8 transfers its contact KZ8-1 from the position shown interrupting the energization path to the relays KYR1 and KXR1, transferring to the position shown the contacts KYR1-1 and KXR1-1. The transfer of these latter two contact decouples resistors RY5 and RXR1 from the Y and X servo differential amplifiers 162A and 102A, respectively, and instead couples the resistors RY6 and RX24 to the Y and X differential amplifiers, respectively. With resistors RX24 and RY6 coupled to the differential amplifiers 102A and 162A, error signals are input to the X servo motor 102 and the Y servo motor 162 which initiate X and Y carriage component motion for positioning the X and Y carriage components opposite the storage compartment 324 of the rear storage wall 13.

As the carriage begins moving toward the storage compartment 324, the X and Y nulls are lost, opening the X and Y null contacts. This is effective to deenergize the relay KZ4, transferring contact KZ4-1 which terminates the X–Y null present sequence which, among other things, steps the movable contact of the deck KSZ1-A to position 3.

When the carriage arrives at a position opposite the storage location 324 of the rear storage wall 13, and X and Y null is produced, closing the X and Y null contacts and thereby completing an energization circuit to the relay KZ5. KZ5-1 transfers initiating the X–Y null present sequence which among other things cocks the stepper for movement to position number 4 upon deenergization of relay KSZ1. The energization of relay KZ5 also transfers contact KZ5-2 of the Z potentiometer 757 depicted in FIG. 46 which, in conjunction with the relay contact KZ1-4, couples the resistor RZ6 to the Z servo amplifier 201A. With resistor RZ6 so coupled a voltage is input to the differential amplifier 201A on line 783 which, in combination with this voltage input on line 782, is effective to produce an error signal which is input to the Z servo motor 201A for driving the tang 184 in a direction and for a period sufficient to transfer the cartridge from the carriage to the storage compartment 324 in the rear storage wall 13.

The energization of the relay KZ5 also transfers the contact KZ5-3 causing the capacitor CZ2 to charge through the resistor RZ9, diode CRZ11 and stepper position number 3. When the capacitor CZ2 charges to a predetermined level, the unijunction transistor QZ1 fires, in turn, triggering the silicon controlled rectifier SCR-Z1 via diode CRZ27. The silicon controlled rectifier SCR-Z1 fires, in turn, energizing the relay KZ7. The energization of relay KZ7 in turn transfers contact KZ7-1 from the position shown terminating the X–Y null present sequence which, among other things, interrupts the circuit to the stepper relay KSZ1 thereby deenergizing this relay and advancing the movable contact of the stepper deck KSZ1-A to position 4.

The transfer of the movable contact of the stepper from position 3 to position 4 deenergizes the relay KZ5 and energizes the relay KZ6. The energization of relay KZ6 transfers contact KZ6-2 associated with the Z potentiometer 757 depicted in FIG. 46, coupling the resistor RZ5 to the differential amplifier input line 783 via contact K8-3. This coupling of resistor RZ6 applies a voltage to the differential amplifier 201A which, when compared to the voltage input on line 782 corresponding to the present position of the tang 184 is effective to drive the tang in a direction and for a period sufficient to reset the tang 184 to the home position shown in FIG. 19. The energization of relay KZ6 also transfers contact KZ6-1 to initiate the X–Y null present sequence, which among other things, energizes the relay KSZ1 cocking the stepper. In addition, the energization of relay KZ6 causes the contact KZ6-3 to transfer from the position shown allowing the capacitor CZ2 to charge through resistor RZ9, stepper position number 4, and diode CRZ12. When the capacitor CZ2 charges to a predetermined level, the unijunction transistor again fires, in turn, triggering SCR-Z1 which fires, energizing the relay KZ7.

The energization of relay KZ7 transfers contact to KZ7-1, deenergizing the stepper relay KSZ1 and advancing the stepper to position number 5. In addition, the transfer of contact KZ7-1 deenergizes the Z servo clutch solenoid LZ1, and the relay KZ9 which in turn energizes the Z servo brake solenoid LZ2 via contact KZ9-2 and disables the Z servo motor via contact KZ9-1.

Figure 43:
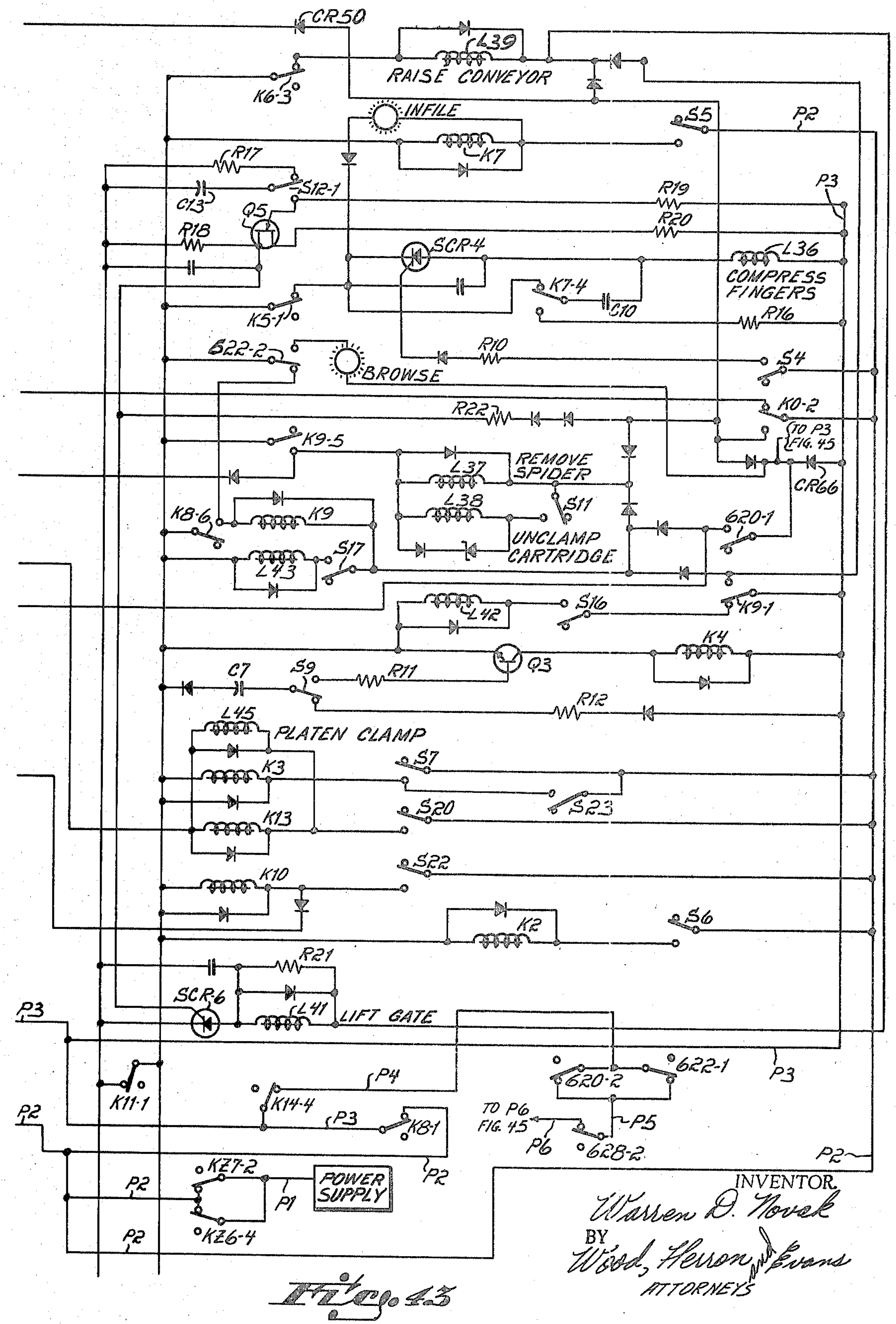

While the relays KZ6 and KZ7 are simultaneously energized, which occurs when the stepping switch has left position 4, but the relays KZ6 and KZ7 have not yet become deenergized due to the finite amount of time required for deenergization following the interruption of the energization circuit therefor, the contacts KZ7-2 and KZ6-4 are both transferred from the position shown in FIG. 43. This interrupts lines P1 and P2 removing power from the various operating circuits of the system, thereby resetting the entire system. Following the resetting of the entire system, the relays KZ6 and KZ7 become deenergized completing the retrieval operation.

Direct and Bulk Access Station Control Circuit

Figure 42:
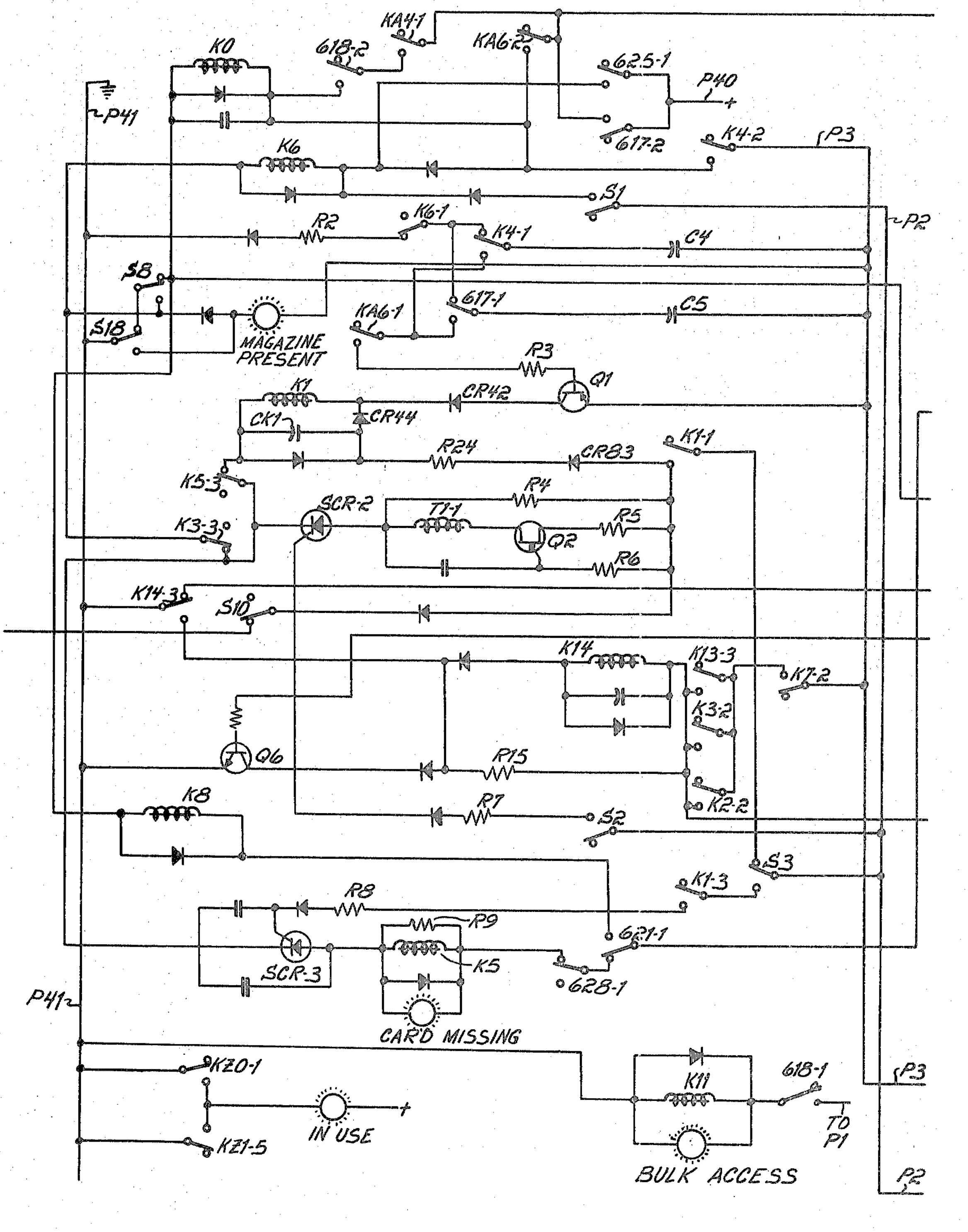

The direct and bulk access station control circuit depicted in FIGS. 41—43 has as one of its principal functions the control of the various operating components of the direct and bulk access stations 22 and 28. The circuit includes relays K0—K11 and K13—K14, a plurality of interposer solenoids L1—L35, a compression finger solenoid L36, a direct access station cartridge clamp solenoid L38, a direct access station spider solenoid L37, a conveyor assembly elevating solenoid L39, a direct access port gate lift solenoid L41, a bulk access card lift solenoid L42, a bulk access station cartridge clamp solenoid L43, a direct access station drive roll brake solenoid L44, and a platen clamp solenoid L45. In addition, the control circuit includes a plurality of limit switches S1, S2, S3, S4, S5, S6, S7, S8, S9, S10, S11, S12-1, S14, S15, S16, S17, S18, S20, S22, and S24. The control circuit further includes a plurality of keyboard switch contacts, namely, reset contacts 621-1 and 621-2, search contacts 617-1 and 617-2, infile contact 625-1, card missing contacts 628-1 and 628-2, return contacts 620-1 and 620-2, browse contacts 622-1 and 622-2, and bulk access contact 618-2, which are associated, respectively, with the reset, search infile, card missing, return, browse, and bulk access keys 621, 617, 625, 628, 620, 622, and 618.

The relay K0 functions to trigger the relay KZ2 of the Z programmer circuit via its contact K0-1 to effect the transfer of a cartridge from the wall to the carriage. In addition, the energization of relay K0 transfers contact K0-3 to start the cartridge transport motor 264, transfers contact K0-2 providing a holder circuit for the relay K0 via diode CR50, contacts KZ6-4 and KZ7-2, and the positive line P1. Transferred contact K0-2 also energizes the spider solenoid L37 to retract the fingers 413 which in turn trips switch S11 to energize the cartridge clamp solenoid L38 to move the clamp arm 461 to the unclamped position. The relay K0 becomes energized when the search key contact 617-2 is closed, the contact KA6-2 is closed indicating that six digits have been entered into the keyboard 23, and switches S8 and S18 are closed indicating that no cartridges are present at the direct and bulk access stations. The relay K0 becomes deenergized when either of the switches S8 or S18 transfers from the position shown upon the arrival of a cartridge at the direct or bulk access stations.

The relay K4 is momentarily energized upon the actuation of switch S9 by a cartridge arriving in the cartridge holder 350 of the direct access station 22. Specifically, upon the arrival of a cartridge into the cartridge holder 350, switch S9 transfers allowing capacitor C7 to discharge into the base of transistor Q3, driving transistor Q3 into the conductive state and energizing the relay K4 which is in the emitter-collector path of the transistor Q3. Upon energization of the relay K4, contact K4-1 momentarily transfers permitting capacitor C4 to discharge into the base of transistor Q1 through closed contact KA6-1 and resistor R3, driving resistor Q1 into a conductive state. The conduction of transistor Q1 momentarily energizes the relay K1 via diode CR42, nontransferred contacts K5-3 and K3-3, transferred switch contact S8, and nontransferred switch contact S18. Relay K1 then latches through contact K1-1. In addition, contact K4-3 momentarily transfers dropping out relay KZ3 of the Z programmer circuit. Contact K4-2 momentarily transfers triggering the relay K6 which then causes the scan motor 333 to become energized via contact K6-2 and the conveyor transport assembly 21 to drop. Relay K6 then latches through cam switch S1.

The relay K1 has as its principal function the energization of the drive roll motor 475 via transferred contact K1-2, for rotating the drive wheels 470H and 470L in a sense such that a selected card is transported upwardly into the platen slot 489. In addition, the energization of relay K1 transfers contact K1-1 to latch the relay through a path including nontransferred switch contact S3, diode CR83, resistor R24, and a diode CR44. The relay K1 becomes deenergized when the switch S3 transfers interrupting the latching circuit and when deenergized stops the drive roll motor 475 via contact K1-2.

The relay K6 has as its principal function the energization of the scan motor 333 via transferred contact K6-2. Contact K6-3, upon transfer, deenergizes the transport elevating solenoid L39, and thereby returns the conveyor platform 247 to its lower position beneath the cartridge shelf 276. Contact K6-1 transfers preventing the capacitor C4 from charging and thereafter pulsing the transistor Q1 and thereby momentarily impulsing the relay K1.

The relay K6 becomes deenergized when the cam plate 325 returns to its home position following card selection, the withdrawal of the sorting rods 370, and the compression of the cards by the fingers 430 and 431. The deenergization of the relay K6 via contact K6-2 stops the scan motor 333 and via contact K6-3 energizes the conveyor transport solenoid L39 to raise the transport conveyor 21 and transfer the cartridge from the cartridge holder 350 to the direct access port 54.

The relay K2 becomes energized during the card selecting phase of the retrieval cycle when the card enters the lower drive and pressure rolls 470L and 471L closing the switch S6. The relay K2 remains energized only so long as the card remains between the lower drive and pressure rolls 470L and 471L and the switch S6 is closed. The relay K2 upon the transfer of its contact K2-1 stops the scan motor 333.

The relay K7 is energized only during the time the switch S5 is transferred by the presence of the timing cam 325 at position 5. The relay K7 via contact K7-1 turns off the scan motor 333, via contact K7-2 conditions the relay K14 for energization upon closing of the return key contact 620-1, via contact K7-3 conditions the drive roll motor 475, and via contact K7-4 allows the capacitor C10 to charge so that subsequently it can discharge to turn off silicon controlled rectifier SCR-4 in turn allowing the compression finger solenoid L36 to become deenergized and the compression fingers 430 and 431 to move to their outer position.

The relay K3 becomes energized when the switch S7 trips upon the arrival of a card between the upper drive and pressure rolls 470H and 471H. The relay K3 remains energized so long as a card remains between the upper drive and pressure rolls 470H and 471H which, in turn, is during the period the card is in the platen slot 489. The contact K3-2 conditions, upon transfer, the positive side of the relay K14. Contact K3-1 disables one energization path for the scan motor 333.

The relay K13 becomes energized when the platen limit switch S20 is tripped upon the arrival of a card in the viewing position in the platen with its upper edge against the card stop 486 remains energized as long as the switch S20 is tripped, that is, as long as the card is in the platen slot 489 and the platen gate 26 is closed. When energized, the relay K13 transfers contact K13-1 disabling a portion of the circuit for operating the drive roll motor 475 in a direction such as to move the card upwardly. In addition, contact K13-2 transfers interrupting one of the energization paths for the scan motor 333, contact K13-3 transfers conditioning relay K14 for energization when the return key 620 is depressed, and contact K13-4 transfers firing the silicon controlled rectifier SCR-7 and thereby illuminating the card viewing lamp 487.

The relay K14 becomes energized when the return key contact 620-1 transfers firing the transistor Q6, assuming one or more of the required enabling or conditioning contacts in its energization path are transferred. Upon energization, the relay contact K14-2 completes an energization circuit to the drive roll motor 475 via transferred contact K7-3 for operating the motor such that a card is driven downwardly. In addition, the contact K14-3 transfers, latching the relay K14, and contact K14-1 transfers disabling one of the energization paths for the scan motor 333. Relay K14 becomes deenergized when all of the enabling contacts K13-3, K3-2 and K2-2 have opened. Once deenergized contact K14-2 transfers to the position shown, deenergizing the drive roll motor 475.

The relay K10 becomes energized when the platen gate 26 is opened and the card stop 486 laterally shifted under the action of the finger tab 501, thereby tripping the switch S22. The relay K10 upon energization transfers contact K10-1 to energize the drive roll motor 475 via nontransferred contact K14-2 for expelling the card from the platen. Contact K10-2 transfers to energize the drive roll motor brake solenoid L44. The solenoid L44 is associated with the drive roll motor 475 and when energized and deenergized functions to lock and unlock, respectively, the drive roll motor shaft against rotation. Relay K10 is deenergized when the switch S22 opens upon the closing of the platen gate 26. Contacts K10-1 and K10-2, in turn, deenergize the drive roll motor 475, and the brake solenoid L44 locking the motor shaft against rotation.

The relay K9 becomes energized when the return key contact 620-1 transfers. Upon energization, the relay contact K9-3 conditions the relay KZ-4 while disabling the relay KZ2. The relay contact K9-5 transfers energizing the spider solenoid L37 for removing the spider fingers 413 from the cartridge apertures 43, in turn, actuating switch S11 which energizes the cartridge clamp solenoid L38 for pivoting the arm 460 and thereby unclamping the cartridge. Contact K9-2 starts the transport motor 264. Relay K9 latches through contact K9-1. Relay K9 is deenergized at the end of the retrieval operation when the entire circuit is reset.

The relay K5 becomes energized upon the failure of the selected card to be blown upwardly by the jet of air from the nozzle 336. Specifically, if the contact K3-3 has not transferred when the cam switch S3 is transferred from the position shown, a circuit path is completed from the positive line $P_2$ through transferred switch S3 and transferred conditioning contact K1-3 to the silicon controlled rectifier SCR-3, firing the SCR. The fired SCR in turn completes an energization circuit to the relay K5 via the card missing key contact 628-1, the reset key contact 621-1, the latching relay K0-2, and the nontransferred conditioning contact K3-3. Of course, if a card is selected and the switch S7 tripped, the relay K3 is energized, transferring contact K3-3 to thereby disable relay K-5.

The relay K5, upon energization in response to a missing card, illuminates the card missing lamp which is connected in parallel with the relay K5 and associated with the key 628. In addition, the contact K5-1 transfers deenergizing the compression finger solenoid L36 allowing the compression fingers 430 and 431 to move to the open position. The contact K5-2 transfers overriding the contact K7-1, thereby energizing the scan motor 333, driving the timing cam to position number 1.

With the timing cam so positioned, it is possible to reenter into the keyboard 23 the last two digits of the card address for the purpose of producing a second scan.

The relay K5 is deenergized by depressing either the card missing key 628 or the reset key 621 transferring momentarily either the contact 628-1 or the contact 621-1.

The relay K8 becomes momentarily energized upon the transfer of the reset contact 621-1 which occurs when the reset key 621 is depressed. Upon energization, the relay K8 via transferred contact K8-1 interrupts the direct current supply line $P_2$ to the various portions of the circuit of FIGS. 41, 42 and 43 and in turn the keyboard circuit of FIGS. 44 and 45. The contact K8-2 is effective to complete a circuit to the movable contact of the stepper deck KSZ1-B for the purpose of resetting the stepper to the home position. Finally, the contact K8-3 is effective upon transfer to connect resistor RZ5 of the Z servo circuit of FIG. 46 to the differential amplifier 201A, thereby causing the Z servo motor 201 to become energized and return the tang 184 and the wheel 189 to the home position depicted in FIG. 19.

The relay K11, when energized in response to the depression of the bulk access key 618, and the transfer of contact 618-1, is effective to transfer contacts K11-4 and K11-3 for completing circuits from the resistor RXR2 to the differential amplifier 102A and from the resistor RY8 to the differential amplifier 162A, thereby energizing the X and Y servo motors 102 and 162 to position the carriage opposite the bulk access port 53. The relay contact K11-2 when transferred conditions the bulk access conveyor transport motor 264A.

Operation of System in Card Selection Mode

To ready the system for the selection of a desired card any one of the 2,000 storage compartments located in the front and rear storage walls, it is necessary to first depress the power switch 619. This is effective to connect a suitable source of direct current (not shown) to the line P1 of the direct and bulk access station circuit of FIG. 43, to line 761 of the circuit of FIG. 48, and to lines P23, P24 and P25 of the Z programmer depicted in FIG. 49. Depression of key 619 also connects a suitable source of alternating current (not shown) across lines 780A and 780B of the Z servo circuit of FIG. 46, lines 781A and 781B of the direct and bulk access station circuit of FIG. 41, lines 765A and 765B of the X servo circuit of FIG. 47, and lines 764A and 764B of the Y servo circuit of FIG. 48. The connection of a direct current source to the line P1 of FIG. 43 operates to apply direct current to the line P6 of the keyboard circuits of FIGS. 44 and 45 via nontransferred contacts KZ7-2, KZ6-4, line P2, nontransferred contact K8-1, line P3, nontransferred contact K14-4, line P4, nontransferred contacts 620-2 and 622-1, line P5, and nontransferred contact 628-2. The connection of a source of direct current to the line P1 is effective via contacts KZ7-2 and KZ6-4, line P2, contact K8-1, line P3, and diode CR66 to apply direct current to line P3 of the keyboard circuit of FIGS. 44 and 45.

Having actuated the power key 619 and thereby applied both AC and DC power to the various operating components of the control circuits of FIGS. 41, 42, 43, 44, 45, 46, 47, 48, and 49, the next step in a card retrieval cycle is depression of the reset key 621 shown in FIG. 2 which functions to reset the various operating components of the control circuits in the event that they are initially not in the reset or home position. Specifically, the actuation of the reset key 621 transfers the contact 621-1 of FIG. 42 energizing the relay K8 through nontransferred relay contacts K0-2, KZ7-2, KZ6-4 and switch contacts S8 and S18. The energization of relay K8 transfers contact K8-3 in FIG. 46 connecting the resistor RZ5 to the differential amplifier input line 783, thereby applying to the differential amplifier 201A a voltage which, when compared with the voltage input on line 782 corresponding to the position of the tang 184, is effective to provide an error signal to the Z servo motor 201 for driving the tang 184 to the home position depicted in FIG. 19. Thus, the Z carriage component is reset. The energization of relay K8 is also effective to transfer contact K8-2 associated with the Z programmer of FIG. 49, to thereby reset the movable contact of stepper decks KSZ1-A and KSZ1-B to the home position. Finally, the energization of relay K8 transfers contact K8-1 momentarily terminating the application of direct current to the line P3 which in turn interrupts the application of power to the various operating components connected thereto such as the relays of the keyboard circuit of FIGS. 44 and 45 and certain of the relays of the direct and bulk access station circuit of FIGS. 42 and 43.

With power applied to the control circuits and the various components of the control circuits reset, the address of the desired card may be entered into the keyboard 23. For the purpose of this illustration, it is assumed that the address of the card to be selected is 132476 which identifies a card randomly stored in a cartridge located in the storage compartment numbered 324 of the rear storage wall 13. The card has its bottom edge 19 code notched with the number 76 in accordance with any desired coding scheme. The pocket 324 is at the intersection of the seventh horizontal row and the twenty-fourth numbered vertical column (actually the twenty-sixth physical column).

The first digit, the digit 1, corresponding to the rear storage wall, is entered into the keyboard 23 by momentarily depressing the digit key 601 thereby momentarily transferring contacts 601-1 and 601-2 associated with the digit key 601. The transfer of contact 601-2 completes an energization circuit to the relays KA7, and KA8 via normally closed relay contacts K6-4 and K12-1. The energization of relay KA8 transfers its contact KA8-3 completing a circuit from the positive line P3 to the control electrodes of the SCR-B of storage elements 640 and 641 via resistor RA75 and normally closed relay contact KA1-3, thereby applying a positive bias or triggering signal to one of the SCR-Bs of each storage element 640 and 641. Concurrently with the triggering of the SCR-B of storage elements 640 and 641 the digit contact 601-1 is transferred from the position shown in FIG. 44 applying a positive bias or triggering signal to the control electrodes of the SCR-A of each of the storage elements 641, 651, 661, 671, 681, 691 via normally closed relay contact K12-2, resistor RA74, presently closed contact KA8-3 and line P3. The application of the triggering signal to the SCR-As of storage elements 651, 661, 671, 681, and 691 is ineffective to fire those SCR's because of the absence of a similar triggering signal applied to their associated SCR-B. However, the simultaneous triggering of the SCR-A and SCR-B of the storage element 641 permits current to flow from line P3 through the lamp B and resistor R1 of storage element 641 illuminating the lamp B which provides an indication in the window 611 of the keyboard 23 that the digit 1 is stored in the keyboard memory 630 as the first address digit.

In addition, the current through the lamp B and the resistor RL of storage element 641 lowers the potential at the output terminal 641-T which is connected to the relay KZ1 of FIG. 48, in turn, energizing the relay KZ1. KZ1-5 of the direct and bulk access station circuit depicted in FIG. 42 completes an energization circuit to the "in use" lamp, illuminating the indicator 626 of the keyboard 23 and thereby providing a visual indication that the retrieval system is in use.

The energization of relay KZ1 transfers its contacts KZ1-1 thru KZ1-4 of the Z servo circuit of FIG. 46 setting up this circuit for effecting the cartridge transfers between the carriage and the rear storage wall 13 as are necessary during the retrieval cycle when the cartridge in pocket 324 of the rear storage wall is extracted and transferred to the carriage prior to being delivered to the direct access port and thereafter reinserted into the storage compartment 324 upon the completion of the retrieval cycle.

The momentary energization of relays KA7 and KA8 in response to the momentary depression of digit key 601 is also effective to transfer contacts KA7-1 to KA7-4, KA8-1 and KA8-2. At this point, the transfer of all but contact KA7-1 is ineffective to accomplish any necessary function. The contact KA7-1, however, transfers from the position shown in FIG. 45 when the digit key 601 is depressed allowing the capacitor CA1 to charge through the path including resistor RA73 and the diode D1B. The retransfer of contact KA7-1 to the position shown, when the digit key 601 is released and the relay KA7 deenergized, is effective to allow the now charged capacitor CA1 to discharge through resistor RA61 into the control element of SCR-A121 firing this SCR. The fired SCR-A121 now energizes relay KA1. The energization of relay KA1 transfers contact KA1-3 applying a negative bias to the control electrode of SCR-B of the storage elements 640 and 641 disabling the storage element 640 and thereby preventing its SCR's from subsequently being fired should the digit key 600 be subsequently energized via contact 600-1. In addition, contact KA1-1 transfers from the position shown removing the negative bias of line 702 from the control electrodes of SCR-B of the storage elements 650-659 and instead coupling the control electrodes through contact KA2-3 and transferred contact KA1-1 to the positive line 701B.

The second digit of the card address, the digit 3, corresponding to the first pocket address digit, is entered into the keyboard 23 by momentarily depressing the digit key 603 which transfers the key contacts 603-1 and 603-2. The transfer of key contact 603-2 momentarily energizes relays KA7 and KA8 transferring relay contact KA8-3 and thereby completing a circuit from the positive line P3 to the control electrode of the SCR-B of each of the storage elements 650—659 via transferred relay contacts KA8-3 and KA1-1 and nontransferred relay contact KA2-3, applying a triggering signal to these SCR's. Concurrently, the transfer of contacts 603-1 couples the positive line P3 to the control electrode SCR-A of storage elements 653, 663, 673, 683, 693 via the transferred relay contact KA8-3, resistor RA74, nontransferred relay contact K12-2 and transferred key contact 603-1. The simultaneous triggering of SCR-A and SCR-B of storage element 653 fires these two SCR's storing the second digit of the card address.

Energization of relay KA7 transfers contact KA7-2 allowing capacitor CA2 to charge through to diode D2A. When the relay KA7 becomes deenergized, upon the release of the digit key 603, contact KA7-2 transfers to the position shown in FIG. 45 allowing the capacitor CA2 to discharge through resistor RA62 into the control electrode of SCR-A122 firing this SCR and energizing relay KA2. Contact KA2-3 transfers applying negative bias to the control electrode of SCR-B of storage elements 650—659 disabling these storage elements in the same manner as the storage element 640 is disabled upon the transfer of contact KA1-3. In addition, contact KA2-2 transfers from the position shown in FIG. 44 removing the negative bias from the control electrode of SCR-B of storage elements 660—669 and connects them to line 701B for the subsequent application thereto of triggering signals.

The firing of the SCR's of the storage element 653 illuminates the bulb B associated therewith providing an indication in storage window 612 in keyboard 23 that the digit 3 has been stored as the second digit of the card address. In addition, the firing of the SCR's of the storage element 653 drives the potential of output line 653-T toward ground completing an energization circuit to the relay KY3 to which it is connected. The energization of relay KY3 transfers contacts KY3-1 and KY3-2 (FIG. 48), partially completing circuits from resistors RY6 and RY7 to the differential amplifier input line 765 of the Y servo differential amplifier 162A.

The third digit of the card address is entered into the keyboard 23 by depressing the digit key 602, momentarily transferring contacts 602-1 and 602-2. Transferred contact 602-2 energizes relays KA7 and KA8. Contact KA8-3 transfers, coupling the positive line P3 to the SCR-B of each of storage elements 660—669 via transferred contact KA2-2 and resistor RA75, applying triggering potentials to these SCR's. Simultaneously, the transfer of contact 602-1 from the position shown couples the positive line P3 to the SCR-A of each of the storage elements 652, 662, 672, 682, and 692 applying triggering signals to these SCR's via transferred contact KA8-3, resistor RA74, nontransferred contact K12-2. With triggering signals simultaneously applied to both SCR's of the storage element 662, these SCR's fire, producing an output at terminal 662-T, and illuminating the bulb B associated therewith, thereby providing an indication in the window 613 of the keyboard 23 that the digit 2 has been stored as the third card address digit.

Energization of relay KA7 transfers contact KA7-3 from the position shown permitting capacitor CA3 to charge through diode D3A. When relay KA7 deenergizes upon release of digit key 602 and the transfer of contact 602-2, capacitor CA3 discharges into the control electrode of SCR-A123 firing SCR-A123 and in turn energizing relay KA3. Contact KA3-2 transfers conditioning storage elements 670—679 and contact KA3-3 transfers disabling storage elements 660—669.

The output terminal at 662-T is coupled to the relays KXX2 and KYY0 of FIG. 48 energizing these relays. The energization of relay KXX2 transfers contact KXX2-1 associated with the X potentiometer 755 of FIG. 47, partially completing a circuit between the resistors RX20—RX29 and the differential amplifier input line 775 of the differential amplifier 102A. The energization of relay KYY0 transfers its contact KYY0-2 from the position shown in FIG. 48 enabling the Y servo motor 162.

The energization of relay KYY0 also transfers its contact KYY0-1 completing a circuit from the resistor RY6 to the differential amplifier input line 765 of the differential amplifier 162A depicted in FIG. 48 via transferred contact KYR1-1. The coupling of resistor RY6 to the Y differential amplifier 162A provides on line 765 a voltage which, when compared with the voltage on the differential amplifier input line 763, produces an error signal input to the Y servo motor 162 of a magnitude and direction such as to drive the Y carriage component to a position opposite the seventh horizontal row of storage elements, the seventh row containing the storage compartment number 324.

At this point, the first three digits of the card address, the digits 132, have been entered into the keyboard 23 and stored in the keyboard digit memory 630 and the Y carriage component driven from its former position to a position opposite the seventh horizontal row of storage elements. In addition, the windows 611, 612 and 613 of the keyboard 27 of FIG. 22 are provided with an indication that the digits 132 have been stored as the first three digits of the card address. Also, the storage in digit memory 630 of the first digit of the address has energized the "in use" lamp associated with the key 626 providing a visual indication that the system is in use.

The fourth digit of the address, the digit 4, is entered into the keyboard 23 by momentarily depressing the key 604 which transfers the contacts 604-1 and 604-2. The transfer of contact 604-2 momentarily energizes relays KA7 and KA8. The energization of relay KA8 transfers contact KA8-3 coupling the positive line P3 via resistor RA75 and transferred contact KA3-2 and nontransferred contact KA4-3 to the gate electrodes of SCR-B of each of the storage elements 670—679 applying triggering signals to these SCR's. The transfer of contact 604-1 removes negative bias from, and instead applies positive bias via nontransferred contact K12-2, resistor RA74 and transferred contact KA8-3, to the control electrodes of silicon controlled rectifier SCR-A of each of the storage elements 654, 664, 674, 684 and 694. The simultaneous application of triggering potentials to both of the SCR's of the storage elements 674 fires these SCR's illuminating the lamp B of the storage element 674 and thereby providing a visual indication in window 614 that the digit 4 has been entered and stored in the keyboard as the fourth card address digit.

The firing of the SCR's of storage elements 674 in turn produce an output at terminal 674-T which is coupled to the relay KX4 of FIG. 48 energizing this relay. The energization of relay KX4 transfers contacts KX4-1 to KX4-5. The transfer of contacts KX4-1, KX4-2, KX4-3, KX4-4 and KX4-5 is ineffective to couple resistors RX4, RX14, RX34, and RX44, respectively, to the differential amplifier line 775 inasmuch as contacts KXX0-1, KXX1-1, KXX1-3, and KXX4-1 have not previously transferred. However, the transfer of contact KX4-3 is effective to couple the resistor RX24 to the differential amplifier input line 775 via previously transferred contact KXX2-1.

The coupling of resistor RX24 to the X differential amplifier 102 produces a voltage on line 775 which, when compared with the voltage on line 773 corresponding to the position of the X carriage component, is effective to produce an error signal. This error signal is input to the X servo motor 102 and has a magnitude and polarity such that the X carriage component, when the X servo motor enabling contact KA4-4 transfers from the position shown, is driven from its present position to a position opposite the vertical column of storage compartments numbered 24 (actually the twenty-sixth storage column).

The servo motor enabling contact KA4-4 transfers to permit the X servo motor 102 to position the X carriage component opposite the column numbered 24 when the relay KA4 becomes energized. The relay KA4 becomes energized upon the release of the digit key 604. Specifically, when the digit key 604 is released the contact 604-2 transfers to the position shown in FIG. 45 deenergizing the relays KA7 and KA8. The contact KA7-4 is transferred from the position shown during the time the digit key 604 is depressed, allowing the capacitor CA4 to charge through diode D4A. When the contact KA7-4 transfers to the position shown, the capacitor CA4 discharges through resistor RA64 into the control electrode of SCR-A124 firing this SCR and in turn energizing relay KA4. The energization of relay KA4 transfers contact KA4-4 enabling the X servo motor 102 which then functions to drive the X carriage component to a position opposite the twenty-fourth numbered column of storage compartments.

The energization of relay KA4 also functions to transfer contact KA4-3 applying negative bias to SCR-B of storage elements 670—679 disabling these storage elements. In addition, contact KA4-2 transfers from the position shown in FIG. 44 removing the negative bias from the control electrodes of the SCR-B of the storage elements 680—689 and instead connecting the control electrodes to line 701B for the subsequent application of triggering signals.

At this point, the X and Y carriage components are positioned opposite the storage compartment 324 of the rear storage wall 13 and an X–Y null is produced transferring the X and Y null contact of FIG. 49 to the position shown conditioning the relay KZ2 for subsequent energization when the contact K0-1 transfers in response to depression of the search key 617.

The fifth digit of the card address, namely the digit 7, is entered into the keyboard by depressing the digit key 607 momentarily transferring contacts 607-1 and 607-2. The transfer of contact 607-2 energizes relays KA7 and KA8. Contact KA8-3 transfers coupling the positive line P3 to the gate electrodes of the SCR-B of storage elements 680—689 via resistor RA75, transferred contact KA4-2 and nontransferred contact KA5-3, applying triggering potentials to these SCR's. Simultaneously, contact 607-1 transfers removing negative bias and applying positive bias to the control electrodes of SCR-A of the storage element 657, 667, 687, and 697 via line 701A, nontransferred contact K12-2, resistor RA-74 and transferred contact KA8-3 applying triggering potentials to these SCR's. The simultaneous application of triggering signals to both SCR's of the storage element 687 fires these SCR's. This in turn illuminates the lamp B associated with storage element 687 providing in window 615 an indication that the digit 7 has been stored. In addition, an output is produced at terminal 687-T which is coupled to a suitable interposer solenoid logic circuit (not shown).

The energization of relay KA8 transfers contact KA8-1 from the position in FIG. 45 allowing capacitor CA5 to charge through diode D5A. Upon the release of the digit key 607 the contact 607-2 transfers deenergizing the relays KA7 and KA8. Contact KA8-1 transfers to the position shown in FIG. 45 allowing the capacitor CA5 to discharge through resistor RA65 to the control electrode SCR-A125 firing this SCR and energizing relay KA5. Contact KA5-3 transfers from the position shown applying negative bias to the SCR-B of storage elements 680—689 to disable the storage elements. Contact KA5-2 transfers from the position shown in FIG. 44 removing the negative bias and instead coupling the line 701-B to the control electrodes SCR-B of storage elements 690—699 for the subsequent application of triggering signals thereto.

The sixth digit of the card address, the digit 6, is entered into the keyboard by depressing the digit key 606 which transfers the contacts 606-1 and 606-2. The transfer of contact 606-2 energizes relays KA7 and KA8. Contact KA8-3 transfers from the position shown in FIG. 44 applying a triggering signal to the gate electrode of SCR-B of the storage elements 690—699 via transferred contact KA5-2, resistor RA75, and transferred contact KA8-3. Concurrently, the digit key contact 606-1 transfers from the position shown in FIG. 44 removing negative bias from, and applying a triggering signal to, the control electrodes of SCR-A of the storage elements 656—96 via closed contacts KA8-3, resistor RA74, contact K12-2, and contact 606-1. The simultaneous application of the triggering signals to both SCR's of the storage element 696 fires these SCR's. This, in turn, illuminates the bulb B associated with storage element 696 providing in keyboard window 616 an indication that the sixth digit has been stored. In addition, an output is produced at terminal 696-T which is coupled to the interposer solenoid logic circuit (not shown).

The coupling to the interposer solenoid logic circuit (not shown) of the outputs 687-T and 696-T of the storage elements 687 and 696 is effective to energize a pair of the interposer solenoids L1—L35 for advancing a pair of interposers 400 into operative relationship to the enlarged heads 377 of the selected sorting rods 370. The energization of different pairs of interposer solenoids L1—L35 in response to the entry of different digits into storage elements 680—689 and 690—699 may be accomplished in any well known manner. For example, combinatorial logic techniques may be used wherein the outputs of storage elements 680—689 and 690—699 are combined in different combinations and the combinations input to different AND gates. Each of the AND gates, in turn, has its output associated with different pairs of solenoids L1—L35 for energizing the respective solenoids when both inputs to their associated AND gate are present.

The momentary energization of the relay KA8 transfers contact KA8-2 from the position shown in FIG. 45 allowing the capacitor CA6 to charge through diode D6A. When the relay KA8 becomes deenergized upon the release of the digit key 606 and the transfer to the position shown of the digit key contact 606-2 the contact KA8-2 transfers to the position shown in FIG. 45 allowing the capacitor CA6 to discharge through the resistor RA66 into the control electrode of the SCR-A126 firing this SCR and in turn energizing relay KA6.

The energization of relay KA6 transfers contact KA6-4 from the position shown in FIG. 45 disabling the relays KA7 and KA8 and thereby preventing the subsequent storage of digits in the digit memory 630 in response to the subsequent depression of one or more digit keys 600—609. In addition, the energization of relay KA6 transfers contact KA6-3 applying negative bias to the storage element 690—699 for disabling these storage elements. The energization of relay KA6 further transfers contact KA6-2 of FIG. 42 enabling the relay K0 for energization in response to depression of the search key 617. Finally, energization of the relay KA6 transfers contact KA6-1 also in FIG. 42 from the position shown enabling the transistor Q1 for pulsing the relay K1 when the contact K4-1 transfers from the position shown in response to energization of the relay K4 upon the arrival of a cartridge in the cartridge holder 350 of the direct access station which in effective to transfer switch S9.

At this point, the SCR's of the storage elements 641, 653, 662, 674, 687, and 696 are fired, the X and Y carriage components are located opposite the storage compartment 324, the "in use" key 626 is illuminated indicating the system status, and the windows 611 to 616 combine to provide a visual indication of the storage of the card address 132476. The relay K0 is enabled as well as the relay K1. Resistors RZ1-RZ7 of the Z potentiometer 757 are partially coupled via transferred contacts KZ1-1 to KZ1-4 to the Z servo amplifier 201A for operating the Z servo motor 201 as required to transfer the cartridge between the rear storage wall 13 and the carriage in response to the subsequent depression of the search key and return keys 617 and 620.

To initiate the next portion of the retrieval cycle in which the cartridge is extracted from the storage compartment number 324 of the rear storage wall 13 and transferred to the carriage for subsequent transfer to the direct access station 54, the search key 617 of the keyboard 23 of FIG. 2 is momentarily depressed. With the search key 617 depressed, the contact 617-2 momentarily closes, completing an energization circuit to the relay K0. This energization circuit includes the positive line P40 which is connected to a suitable source of positive potential, transferred contact 617-2, transferred contact KA6-2 which closes when the last digit of the card address is entered, the nontransferred switch contact S8 which remains transferred until the cartridge is positioned in the cartridge holder 350, the nontransferred contact S18 which remains transferred as long as no cartridge is positioned in the bulk access station, and the grounded line P41. Should a cartridge be located in the direct access station 22 or the bulk access station 28 the contact S8 or the contact S18, respectively, is transferred, disabling the relay K0. Consequently, transfer of contact 617-2 in response to actuation of the search key 617 is ineffective to energize the relay K0.

Energization of the relay K0 transfers contact K0-3, completing an energization circuit to the bulk access and direct access transport motors 264 and 264A, respectively, via nontransferred contact K11-2, driving the conveyor belts 261-262 and 261A-262A, respectively. In addition, contact K0-2 transfers coupling the positive line P2 to the positive side of relay K0 latching this relay via transferred contact KA6-2 and latching contact K0-2. The contact K0-2 upon transfer from the position shown is also effective to couple the positive line P2 to the spider solenoid L37 and the movable switch contact of switch S11. Solenoid L37 upon energization moves the spider fingers 413 leftwardly. This in turn trips switch S11, energizing the solenoid L38 which moves clamp arm 461 to the cartridge nonclamping position.

Contact K0-1 also transfers completing an energization circuit to the relay KZ2 which includes grounded line 791, the nontransferred switch S18 (no cartridge in bulk access station), the closed X and Y null contacts (X and Y carriage components at rest), nontransferred contacts K9-3, transferred contact K0-1, the movable contact 790 of stepper deck KSZ1-A positioned at the home position, and the positive line P25. The energization of relay KZ2 transfers contact KZ2-1 providing a latching circuit as well as completing an energization circuit through nontransferred contact S18 and nontransferred X and Y null contacts to the relays KZ9, KSZ1, and solenoid LZ1 thereby initiating the X–Y null present sequence. The energization of the solenoid LZ1 engages the Z servo motor clutch 210. The energization of relay KSZ1 cocks the stepper KSZ1-A for advancement to position 1 upon the deenergization of relay KSZ1. The energization of relay KZ9 transfers contact KZ9-2, deenergizing the solenoid LZ-2 which is effective to disengage the Z servo brake 209, and transfers contact KZ9-1 of FIG. 46 enabling the Z servo motor 201. The energization of relay KZ2 transfers contact KZ2-3 of FIG. 49 enabling the relays KYR1 and KXR1.

Relay KZ2, when energized, also transfers contact KZ2-2 associated with the Z potentiometer 757 of FIG. 46 coupling the resistor RZ2 to the differential amplifier input line 783 via previously transferred contact KZ1-1. With resistor RZ2 coupled to differential amplifier 201A, a voltage is input on line 783 which, when compared with the voltage input on line 782 corresponding to the present location of the tang 184, is effective to generate an error signal which is input to the Z servo motor in a direction and for a period sufficient to move the tang 184 from the position shown in FIG. 19 to a point where it engages the recess 49F of the cartridge extension 33F, extracts the cartridge from the storage compartment 324, and transfers the cartridge to the carriage.

When the cartridge is properly positioned on the carriage and the tang 184 comes to rest, the switch S19 and the Z null contact transfer from the positions shown in FIG. 49, completing an energization circuit to the relays KYR1 and KXR1, which includes positive line P24, nontransferred contact KZ8-1, the Z null contact, transferred contact KZ2-3, nontransferred contact KZ4-3, transferred switch contact S19, and the grounded line 791. Energization of relay KYR1 transfers contact KYR1-2 latching the relays KYR1 and KXR 1. In addition, contacts KXR1-1 and KYR1-1 associated with the X and Y potentiometers 735 and 756 transfer, coupling resistor RXR1 to the differential amplifier 102A via nontransferred contact K11-4 and transferred contact KXR1-1 and resistor RY5 to the differential amplifier 162A via nontransferred contact K11-3 and transferred contact KYR1-1, respectively. The coupling of resistors RXR1 and RY5 applies voltages to the differential amplifiers 102A and 162A which, when compared with the voltages input thereto on lines 774 and 763, produce error signals which are input to the X servo motor 102 and the Y servo motor 162. These error signals have a magnitude and polarity such that the X and Y carriage components are driven to a point opposite the direct access station 54.

As the carriage starts moving from a position opposite the storage compartment 324 of the rear storage wall 13, the X–Y null is lost opening the X and Y null contacts of the Z programmer circuit of FIG. 49. This interrupts the latching circuit to the relay KZ2 disengaging this relay and in turn transferring contact KZ2-1 to the position shown in FIG. 49. The transfer of KZ2-1 interrupts the energization circuit to solenoid LZ1 and relays KZ9 and KSZ1 terminating the X–Y null present sequence. The deenergization of solenoid LZ1 disengages the Z servo clutch 210. The deenergization of the relay KZ9 transfers contact KZ9-2 to the position shown in FIG. 49 energizing the solenoid LZ2 and thereby applying the Z servo brake 209. The deenergization of relay KZ9 also transfers contact KZ9-1 disabling the Z servo motor 201. The deenergization of stepper relay KSZ1 causes the cocked stepper KSZ1-A to move contact 790 from the home position to position number 1. The deenergization of relay KZ2 also transfers contact KZ2-2 and KZ2-3 to the positions shown in FIGS. 46 and 49, decoupling resistor RX2 from the differential amplifier 201A and interrupting one energization path for the relays KYR1 and KXR1, respectively. The relays KYR1 and KXR1 remain energized via latching contact KYR1-2.

Upon arrival of the carriage at a position opposite the direct access port 54 an X–Y null is produced closing the X and Y null contacts of the Z programmer depicted in FIG. 49. This completes a circuit through normally closed contact K4-3 energizing the relay KZ3, the relay KZ3 being coupled to the positive line P25 via stepper position number 1. The energization of relay KZ3 transfers contact KZ3-1 completing an energization circuit to the solenoid LZ1 and the relays KZ9 and KSZ1 initiating the X–Y null present sequence which includes cocking the stepper, engaging the Z servo clutch 210 and disengaging the Z servo brake 209, as well as enabling the Z servo motor 201.

In addition, the energization of relay KZ3 transfers contact KZ3-2 associated with the Z servo circuit of FIG. 46. Transferred contact KZ3-2 in combination with previously transferred contact KZ1-2 couples the transistor RZ1 to the differential amplifier input line 783 via the nontransferred reset contact K8-3. This coupling of resistor RZ1 provides, on input differential amplifier line 783, a voltage which, when compared with the voltage input on line 782, produces an error signal input to the Z servo motor 201 having a magnitude and polarity such as to drive the Z servo motor in a direction and for a period sufficient to move the tang 184 for transferring the cartridge from the carriage to the direct access port 54.

At this point, the gate 294 is in the raised position due to the energization of solenoid L41 permitting the cartridge to be transferred from the carriage to the direct access port 54. Furthermore, conveyor platform 247 is in the raised position such that it is substantially level with the bottom 278 of the direct access port and slightly above the shelf 276 of the direct access station. In addition, the transport motor 264 of the direct access station is energized, driving the conveyor belts 261 and 262 in a direction such as to convey the cartridge from the direct access port 54 onto the shelf 276 of the cartridge holder 350. Consequently, when the Z servo motor 201 is driven to move the tang 184 for transferring the cartridge from the carriage to the direct access port 54 the leading end of the cartridge is initially engaged by the upper runs of the conveyor belts 261 and 262 whereupon the cartridge is transferred through the cartridge guide 268, 269 of the conveyor transport to a position where the leading end of the cartridge is positioned on the shelf 276 of the cartridge holder 350. Continued motion of the conveyor belts 261 and 262 drives the cartridge into the cartridge holder 350 to the position shown in FIG. 39. Upon arrival of the cartridge in the position shown in FIG. 39, the switches S8 and S9 are tripped indicating that the cartridge is properly positioned in the cartridge holder 350.

The tripping of switch S8, transferring its contact from the position shown in FIG. 42, completes an energization circuit to the cartridge present lamp through the nontransferred contact S18. This provides a visual indication on the keyboard 23, in the form of an illuminated cartridge present indicator 627, that the cartridge is in the holder 350. In addition, the transfer of the switch contact S8 from the position shown interrupts the energization circuit for the relay K0 deenergizing this relay. K0-3 transfers to the position shown in FIG. 41 deenergizing the direct access transport motor 264 as well as the bulk access motor 264A. The contact K0-1 transfers interrupting one of the energization circuits for the relay KZ2. The contact K0-2 transfers to the position shown in FIG. 43 completing a circuit from the positive line P2 to the movable reset contact 621-1.

The transfer of switch contact S8 further is effective to interrupt the energization circuit to the cartridge clamp solenoid L38. The solenoid L38 upon deenergization, allows the spring-biased arm 461 to pivot to the position shown in FIG. 38 in which arm end 465 is clamped against the cartridge preventing movement of the cartridge in the holder 350. The switch S8 when it transfers from the position shown in FIG. 42 also interrupts the energization circuit path to the spider solenoid L37 permitting the spider 410 to advance rightwardly, as viewed in FIG. 33, under the action of the negator spring 420. The rightward advancement of the spider 410 on the guide rod 412 positions the spider fingers 413 in the apertures 43 of the cartridge wall 35. This aligns the cards stored in the cartridge such that the card apertures 51 are aligned with the apertures 34 in the cartridge side 35, thereby permitting the desired pair of sorting rods 370 to subsequently enter the card apertures 51 prior to the card selection operation.

The transfer of switch S9 when the cartridge is in the position shown in FIG. 39 energizes the relay K4. Specifically, the transfer of switch contact S9 of FIG. 43 allows the capacitor C7, which has been charging through resistor R12, to discharge through resistor R11 into the base of transistor Q3. Transistor Q3 momentarily conducts, energizing relay K4 which is in series with the emitter-collector path of the transistor. The momentary energization of relay K4 in response to the pulse produced by the transistor Q3 transfers contact K4-3 of the Z programmer depicted in FIG. 49 interrupting the energization path to the relay KZ3. The relay KZ3 upon deenergization transfers contact KZ3-1 to the position shown in FIG. 49, interrupting the circuit to the solenoid LZ1, and the relays KZ9 and KSZ1 disengaging the Z servo clutch 210, engaging the Z servo brake 209, disabling the Z servo motor 201, and advancing the stepper to position 2. Thus, the X–Y null present sequence is terminated.

The momentary energization of relay K4 transfers contact K4-1 from the position shown in FIG. 42. The transfer of contact K4-1 allows the capacitor C4 which has been charging through nontransferred contact K6-1 and resistor R2, to discharge through transferred contact KA6-1 (which transferred from the position shown upon the entry and storage of the sixth digit of the card address) and through resistor R3 into the base of transistor Q1. This discharging causes transistor Q1 to momentarily conduct causing a pulse of current to pass through relay K1 which is in series with the emitter-collector path of transistor Q1. The relay K1 becomes energized through a path which includes line P3, emitter-collector path of transistor Q1, nontransferred contact K5-3, nontransferred contact K3-3, transferred contact S8 and nontransferred contact S18, and the grounded line P41. It is noted that the relay K1 cannot be energized when the search key 617 is momentarily depressed transferring a contact 617-1 since the cartridge is not yet in the position shown in FIG. 38 and the switch S8 has not transferred from the position shown in FIG. 42 completing a circuit from the grounded line P41 to the negative side of the relay K1 and thereby enabling the capacitor C4 to discharge through transferred contact KA6-1 and resistor R3 into the base of transistor Q1.

When the relay K1 becomes energized contact K1-1 transfers latching the relay K1 via a circuit including a nontransferred contact S3. The energization of relay K1 transfers contact K1-2 which completes a circuit to the up drive roll motor 275 via nontransferred contacts K14-2, K13-1, K10-1 and S24 which remains in the position shown in FIG. 41 until the card is clamped in the platen by the solenoid L45. Contact K1-3 transfers, enabling the card missing circuit which includes relay K5 and the card missing lamp. Contact K1-4 transfers completing an energization circuit to the drive roll brake solenoid L44 via nontransferred platen clamp switch S24 allowing the drive roll motor 475 to drive the drive rolls 470H and 470L in a direction such that a card located in the platen slot is transferred upwardly.

The energization of the relay K4 also causes contact K4-2 to transfer completing an energization circuit to the relay K6 from the positive line P3. The energization circuit for the relay K6 also includes transferred switch contact S8 and nontransferred switch contact S18 which connect the negative side of relay K6 to the grounded line P41.

Energization of relay K6 transfers contact K6-2 of FIG. 41 from the position shown completing an energization circuit to the scan motor 333 causing the drive pulley 332 to rotate the stepped shaft 325. Rotation of the stepped shaft 325 causes the timing cam 318 to move sufficiently to transfer cam switch contact S1 from the position shown in FIG. 42 to thereby provide a latching circuit for the relay K6 which includes transferred switch contact S8 and nontransferred switch contact S18. The continued energization of the relay K6 maintains contact K6-2 transferred from the position shown in FIG. 41, continuously driving the scan motor 333. When the drive shaft 325 rotates approximately 30°, the sorting rod cam 390 rotates to a position such that the cam follower 388 is moved leftwardly as viewed in FIG. 33 under spring action carrying with it the plate 386 (see FIGS. 40A and 40B). The movement of the plate 386 to the left moves leftwardly the two sorting rods 370 whose interposers 400 have been moved into position behind their associated enlarged heads 377 by the energization of their associated solenoids L1-L35. This movement of a pair of sorting rods 370 to the left moves their pointed portions 371 (see FIG. 37) into the apertures 34 of the cartridge side 35 overcoming the clamping action of the spring biased detent balls 380 which cooperates with the circumferential grooves 376 on the rods 370.

The leftward movement of plate 386 is not effective to advance the sorting rods 370 associated with those interposers 400 which have not been advanced by the energization of their associated solenoids L1-L35. As for the nonselected rods 370, the clamping action of the spring biased detent balls 390 cooperating with the circumferential grooves 376 is sufficient to prevent relative movement between the sorting rods 370 and the side member 350B of the cartridge holder 350.

By the time the shaft 325 is driven by the scan motor 333 through an angle of approximately 60° the cam follower 335 associated with the cam 357 is driven rightwardly through a distance $s_1$ as shown in FIGS. 32 and 40A. The rightward movement of the cam follower 355 drives the plate 351 to the right through a distance equal to $x_1$. This rightward movement of the plate 351 moves the cartridge holder 350 to the right relative to the two sorting rods 370 whose interposers have been positioned behind the enlarged heads 377 by the energization of their associated solenoids L1-L35. This relative movement of the cartridge holder 350 advances the pointed ends 371 of the two sorting rods 370 completely through the corresponding apertures 51 of the cards stored in the cartridge located in the holder 350, as well as through the apertures 34 located on the sides 35 of the cartridge. The sorting rods 370 are now fully set for the card selection phase of the retrieval cycle.

When the plate 351 has moved to its rightmost limit, the bracket 366 strikes the abutment 363 on rod 369. This shifts the rod rightwardly to move switch arm 368, tripping switch S10. Switch S10 opens, deenergizing and/or disabling the interposer solenoids L1-L35.

While the plate 351 is moving through the distance $x_1$ the nozzle cam 339 is also moving (see FIG. 40*c*). However, the contour of the nozzle cam 339 is such that the follower 338, under the action of spring 340, moves leftwardly as viewed in FIG. 32, driving the plate 337 to the left. The leftward movement of the plate 337 positions the nozzle 336 directly under the slot 489 between the platen plates 470 and 471.

Further rotation of the shaft 325 of FIG. 32 by the scan motor 333 causes the timing cam 318 to trip the cam switch S2, transferring this switch from the position shown in FIG. 42. The transfer of switch S2 applies a triggering signal to rectifier SCR2 firing this SCR through a path including nontransferred contact K3-3, transferred contact S8, and nontransferred contact S18, the grounded line P41, and transferred contact K1-1 which is the latching contact for relay K1. The firing of SCR2 initiates operation of an oscillator comprising transformer primary winding T1-1, unijunction transistor Q2, resistor R5 and resistor R6. The oscillator once initiated starts oscillating at a frequency of about 2 kilocycles causing pulses to pass through transformer primary winding T1-1. These pulses are inductively transferred to the transformer secondary winding T1-2 of FIG. 41 firing rectifier SCR1. The SCR1 once fired effectively remains on, energizing the blower motor 334. In practice, SCR1 does actually turn off for a fraction of a second each time the full wave rectified voltage thereacross drops to a value below the sustaining voltage for the SCR1. However, the frequency of the SCR triggering pulses provided by transformer secondary winding T1-2 relative to the pulsations of the full wave rectified voltage across rectifier SCR1 is so high that each time the SCR is driven into nonconduction as the rectified voltage approaches zero, a pulse from the transformer secondary winding T1-2 immediately retriggers the rectifier SCR1.

Further operation of the scanning motor 333, which drives the shaft 325, is effective to move the cam 357 in a manner such that the plate 351 and cartridge holder 350 are driven leftwardly as viewed in FIG. 32 (see also FIG. 40A), moving the cartridge from the position shown in FIG. 33 to the position shown in FIG. 34. While the plate 351 and cartridge holder 350 are being leftwardly positioned, the cartridge located in the cartridge holder 350 passes above the nozzle 336. The movement of the cartridge transversely of the nozzle from the position shown in FIG. 33 to the position shown in FIG. 34 causes the jet of air emitted by the nozzle 336 to successively impinge against the bottom edges of adjacent cards located in the cartridge. The jet of air is ineffective to effect a selection of those cards not notched at points corresponding to the location of the two sort rods 370 inserted into the deck of cards stored in the cartridge. As to these cards, the inserted sorting rods 370 restrain them from vertical movement in response to the upwardly directed jet of air.

However, the card positioned having notches 52 at those aperture locations 51 corresponding to the selected pair of rods inserted into the cartridge are not restrained from upward movement under the action of the jet of air. Consequently, the card having the conforming set of notches 52 is driven upwardly. Since the jet of air from the nozzle 336 is not positioned under the point common to the lower set of drive and pressure rolls 470L and 471L, respectively, when the card is driven upwardly by the air jet, the upper or leading edge 27 of the card 50 is gripped between the lower drive and pressure rolls 470L and 471L. The moving lower drive and pressure rolls transport the card upwardly through the slot 489 between the platen plates 470 and 471.

When the selected card is positioned between the lower set of drive or pressure rolls 470L and 471L, the switch S6 of FIG. 43 transfers from the position shown, energizing the relay K2. The relay K2 upon energization transfers contact K2-1 interrupting the circuit to the scan motor 333, deenergizing the scan motor which brings the shaft 325 to rest. At this point, the cartridge is in the position shown in FIG. 34 relative to the platen 319 and blower nozzle 336.

Further rotation of the drive roll motor 475 drives the selected card upwardly to a point where it is positioned between the upper set of drive and pressure rolls 470H and 471H. When the selected card is in this position, the switch S7 transfers from the position shown in FIG. 43, energizing the relay K3. Contact K3-1 transfers from the position shown in FIG. 41 disabling one energization path for the scan motor 333. In addition, contact K3-3 transfers from the position shown in FIG. 42 interrupting the path between the grounded line P41 and the negative side of the relay K1 which path includes nontransferred contact K5-3, transferred contact S8, and nontransferred contact S18. This deenergizes relay K1 after a suitable delay determined by the R-C network including resistor R24 and capacitor CK1. When relay K1 becomes deenergized the contact K1-2 transfers to the position shown, interrupting the circuit to the up drive roll motor 475, deenergizing the up drive roll motor.

When the up drive roll motor 475 stops, the selected card is positioned such that its leading edge 27 transfers the platen limit switch S20 from the position shown in FIG. 43, completing an energization circuit to the relay K13 which includes nontransferred contact K14-3, the grounded line P41 and the positive line P2. The energization of relay K13, in response to tripping of the platen limit switch 20 when the selected card arrives in viewing position in the platen, causes the contact K13-2 to transfer from the position shown in FIG. 41, interrupting one of the energization paths for the scan motor 333. In addition, the contact K13-4 transfers from the position shown in FIG. 41 completing an energization circuit to the lamp 487. The lamp 487 when energized directs a beam of light through the glass insert 480, the microfilm insert 20 of the selected card, and the movable glass insert 481, to the television camera 488. Thus, the system operator is provided with a visual image of the information contained on the selected card. The energization of relay K13 transfers contact K13-3 from the position shown in FIG. 42 conditioning the relay K14 for energization when the return switch 620 is energized, transferring contact 620 from the position shown in FIG. 43. Contact K13-1 also transfers, interrupting one energization path for the up drive roll motor.

When the selected card arrives at the viewing position shown in FIG. 43, in addition to energizing the relay K13, it is also effective to complete an energization circuit to the platen clamp solenoid L45 via a path which includes positive line P2, switch S20, nontransferred contact K14-3 and grounded line P41. The platen clamp solenoid L45, when energized, retracts its armature 494 moving the arm 495 toward the platen plate 470, which in turn moves the frame 490 carrying the glass insert 481 against the card positioned in the platen, clamping the card in the proper viewing position. When the solenoid L45 clamps the card switch S24 is opened, disabling the drive roll motor 475. The platen clamp solenoid L45 remains energized clamping the card until the relay contact K14-3 transfers in response to energization of the relay K14. Energization of relay K14 can occur either when the platen gate switch S22 transfers to the position shown when it is desired to expel the card from the platen, or when the return switch 620 is depressed closing the switch contact 62-1 which in turn pulses transistor Q6 when it is desired to drive the card back into the cartridge.

When the desired card is in the viewing position above the lower drive and pressure rolls, the switch S6 retransfers to the position shown in FIG. 43, deenergizing the relay K2, causing contact K2-1 to transfer to the position shown in FIG. 41, energizing the scan motor 333. The motor 333 drives the shaft 325 through an angle of approximately 25° whereupon the timing cam 318 trips cam switch S3 (see FIG. 40A). Switch S3 transfers from the position shown in FIG. 42. Transfer of switch S3 is ineffective to deenergize the relay K1 inasmuch as the relay K1 has already been deenergized by the transfer of contact K3-3 when relay K3 became energized as the selected card tripped switch S7.

The scan motor continues driving the shaft 325 for approximately 40° whereupon switch S4 transfers (FIG. 40A) from the position shown in FIG. 43, triggering the rectifier SCR4 which latches in through nontransferred contact K5-1. This energizes the compression finger solenoid L36 which is effective to move the compression fingers 430 and 431 to the position partially shown in phantom in FIG. 38 in which the shoulders 432 and 433 are aligned with the notches 39 of the cartridge located in the holder 350.

Continued rotation of the shaft 325 by the scan motor 333 moves the plate 386 to the right (FIG. 40B), causing the reset bar 397 to reset the sorting rods. Further scan motor rotation moves the plate 351 (see FIG. 40A) from the position in FIG. 34 to the position shown in FIG. 35 causing the shoulders 432 and 433 of the compression fingers 430 and 431 to move the cards leftwardly, as viewed in FIG. 35, leaving a space between the rightmost card and the cartridge wall adjacent the cartridge holder wall member 350B, which space is directly beneath the slot 489 formed by the platen plates 470 and 471.

Further rotation of the shaft 325 by the scan motor 333 moves the timing cam 318 (see FIG. 40A) to a position where switch S5 transfers from the position shown in FIG. 43 completing an energization circuit to the relay K7. The relay K7 transfers contact K7-1 causing the scan motor 333 to become deenergized. Contact K7-2 enables relay K14 for energization when the return contact 62-1 is closed. Contact K7-4 allows capacitor C10 to charge such that it can thereafter deenergize rectifier SCR4, to drop the compression finger solenoid L36 allowing the fingers 430 and 431 to return to their outer positions.

At this point, the card is clamped in the proper viewing position by the platen clamp solenoid L45, the drive motor 475 is deenergized, the scan motor 333 is at rest, the viewing lamp 487 is illuminated, the blower motor is off, the conveyor transport motor 264 is deenergized, the conveyor transport solenoid L39 is deenergized and the conveyor 247 in the lower position, the cartridge clamp solenoid L38 is deenergized allowing the spring biased cartridge clamp arm 461 to move to the position shown in FIG. 38, the spider fingers 413 are engaged with the cartridge, the timing cam 318 is in position 5, the cards are compressed by the fingers 430 and 431 (FIG. 35), and the sorting rods 370 are reset.

When it is desired to return the card to the cartridge and subsequently to return the cartridge to its storage compartment in the rear wall 13, the return key 620 is momentarily depressed transferring contact 62-1 from the position shown in FIG. 43. This pulses the base of transistor Q6 momentarily causing transistor Q6 to conduct. The conduction of transistor Q6 pulses relay K14 in the transistor emitter-collector path. The relay K14 becomes energized through a path including transferred contact K3-2, relay K3 being energized by the transferred switch S7 which is closed when a card is positioned in the platen slot 489 between the upper drive and pressure rolls 470H and 471H. The energization of relay K14 transfers contact K14-3 interrupting the energization path for the platen clamp solenoid L45 unclamping the card in the platen slot 489. Unclamping of the card then closes switch S24, enabling the drive roll motor 475. In addition, transferred contact K14-3 interrupts the energization path to the relay K13 deenergizing relay K13. Contact K13-4 transfers from the position shown extinguishing the microfilm illuminating lamp 487. Contact K14-2 transfers, energizing the down drive roll motor 475 via transferred contact K7-3, relay K7 being energized as long as switch S5 is closed. The card now begins to move downwardly.

When the card passes between the lower drive and pressure rolls 470L and 471L, the switch S6 transfers from position shown energizing the relay K2. The relay K2 transfers contact K2-2, enabling the relay K14 to remain energized and the contact K14-2 to remain transferred, energizing the down drive roll motor 475 via the transferred contact K7-3.

As the card leaves the point between the upper drive and pressure rolls 470H and 471H, the switch S7 transfers to the position shown, deenergizing the relay K3. The deenergizing of relay K3 transfers contact K3-2, enabling the relay K14 through contact K2-2 to continue to be energized and the contact K14-2 to continue to be transferred, energizing the down drive roll motor 475 via transferred contact K7-3. Switch S6 closes, energizing relay K6 before switch S7 opens, deenergizing relay K3. Thus, the energization periods for relays K6 and K7 overlap, providing continuous conditioning of relay K14 and continuous disabling of the scan motor 333. When the card leaves and passes below the lower drive and pressure rolls 470L and 471L, the contact S6 transfers to the position shown, deenergizing the relay K2. When relay K2 becomes deenergized, contact K2-2 transfers to the position shown in FIG. 47, removing the last energization path for relay K14. K14-2 then returns to the position shown in FIG. 41, interrupting the energization path for the down drive roll motor 475. The down drive roll motor 475 stops. At this point, the card is inserted into the space in the cartridge formed by the compression fingers 430 and 431.

While the card is in the viewing position or is being transported down from the viewing position, first through the upper drive and pressure rolls 470H and 471H and then through the lower drive and pressure rolls 470L and 471L, and finally into the cartridge, the scan motor 333 is deenergized, the timing cam 318 is in position 5, and the switch S5 is transferred from the position shown in FIG. 43. Specifically, when the card is in the proper position within the platen and the platen limit switch S20 is transferred from the position shown in FIG. 43, the relay K13 is energized transferring contact K13-2 from the position shown interrupting one portion of the energization path for the scan motor 333. As long as the card is properly positioned in the platen and the platen limit switch S20 is transferred, the relay K13 is energized and the scan motor 333 is locked out.

When the card starts moving downwardly, the relay K13 becomes deenergized in response to the transfer of contact K14-3, and the contact K13-2 which forms one portion of an enabling path for the scan motor 333, closes. However, the upper drive roll switch S7 remains closed for a limited amount of time, energizing relay K3 which transfers contact K3-1, disabling one portion of an enabling path for the scan motor 333. Thus, the scan motor 333 remains locked out notwithstanding the closing of contact K13-2.

When the card has been driven downwardly until it no longer contacts the upper drive and pressure rolls 470H and 471H, the switch S7 transfers to the position shown and the relay K3 becomes deenergized, closing contact K3-1 thereby completing an additional portion of an enabling path for the scan motor 333. However, at this point the card is between the lower drive and pressure rolls 470L and 471L and the switch S6 is transferred from the position shown in FIG. 43, energizing the relay K2. Relay K2, via transferred contact K2-1 (FIG. 41) locks out the scan motor 333. Thus, the scan motor 333 is still locked out notwithstanding the closing of contacts K13-2 and K3-1.

When the card finally passes below the lower drive and pressure rolls 470L and 471L, the relay K2 becomes deenergized in response to the transferring to the position shown of switch contact S6. Contact K2-1 transfers to the position shown completing the remaining portion of an energization path for the scan motor 333 which includes contacts K2-1, K3-1, K13-2, K14-1, and K6-2. Thus, as long as a card is properly positioned in the platen or between the upper and lower drive and pressure rolls, one or more of the relays K2, K13 or K3 is energized, in turn transferring one or more of the contacts K2-1, K3-1, or K13-2 which interrupt one or more portions of the energization path for the scan motor 333.

The relay K14 which enables the drive roll motor 475 for either upward or downward card motion to either expel a card from the platen or return it to the cartridge, once energized by depression of the rest key 620, remains energized as long as a card is either positioned against the card stop 486 or between the upper and lower drive rolls. This result obtains inasmuch as in these positions one or more of the switches S20, S7, or S6 are transferred, energizing one or more of relays K13, K3, and K2, respectively, transferring one or more of contacts K13-3, K3-2, and K2-2, respectively, completing one or more parallel energization paths to the relay K14.

However, once the card has been driven down into the cartridge or expelled from the platen, none of the switches S6, S7 or S20 are closed and none of the relays K2, K3 or K13 are energized. Consequently, none of the contacts K2-2, K3-2 and K13-3 are transferred from the positions shown, completing an energization circuit to the relay K14. The result is that the relay K14 is deenergized, transferring its contact K14-2 to the position shown in FIG. 41, thereby disabling the down drive roll motor.

With the card in the cartridge and the relay K14 deenergized, the contact K14-1 transfers to the position shown in FIG. 41, and an energization circuit is completed for the scan motor 333 via transferred contact K6-2, contact K6-2 being transferred from the position shown due to the energization of relay K6 which is latched through transferred contact K6-1, transferred contact S8 and nontransferred contact S18. The scan motor 333 now operates, driving the shaft 325 which moves the timing cam 318 off position 5, whereupon switch S5 transfers to the position shown, deenergizing relay K7.

The deenergization of the relay K7 transfers to contact K7-3 of FIG. 41 to the position shown, further disabling the energization circuit to the down drive roll motor 475. In addition, contact K7-1 transfers to the position shown, completing an alternative energization path for the scan motor 333 via transferred contact K6-2 and nontransferred contact K2-1. Contact K6-2 is transferred when the timing cam 318 moved off position number 1 and remains transferred until the timing cam once again returns to position 1. The contact K2-1 is in the position shown, as long as a card is not positioned between the lower drive and pressure rolls 470L and 471L thereby tripping switch S6. Contact K7-4 transfers, deenergizing the compression finger solenoid L36, returning the compression fingers 430 and 431 to their outer position clear of the cartridge.

Simultaneously with the energization of the relay K14 in response to depressing the return key 620 and transferring the contact 620-1 to effectively start the drive roll motor 475 in the downward direction, the relay K9 becomes energized through a path including the nontransferred browse contact 622-2. Relay K9 once energized latches through contact K9-1. Contact K9-2 transfers completing a circuit to the direct and bulk access transport motors via nontransferred contacts S14 and S15. Contact S14, when closed, indicates that the gate 294 at the direct access port 54 is in the down position, such that a cartridge transferred by the conveyor assembly 21 to the direct access port cannot be conveyed through the direct access port into the carriage space 17. The switch S15 indicates a similar gate condition at the bulk access port 53.

The contact K9-5 transfers from the position shown in FIG. 43, energizing the spider finger solenoid L37 which in turn moves the spider fingers 413 leftwardly, as viewed in FIG. 32, moving the spider fingers clear of the cartridge. Movement of the spider body 410 trips switch S11, energizing the cartridge clamp solenoid L38. The solenoid L38 retracts its armature 464 drawing the arm 461 leftwardly, moving the free end of the arm 465 clear of the cartridge, allowing the cartridge to be removed from the cartridge holder 350.

When the scan motor 333 drives the timing cam 318 to position number 1, the switch S1 transfers to the position shown in FIG. 42, interrupting the latching path for the relay K6, deenergizing this relay. Contact K6-2 transfers to the position shown in FIG. 41, interrupting the energization path to the scan motor 333 bringing the shaft 325 to rest. The contact K6-3 transfers to the position shown in FIG. 43, energizing the conveyor transport solenoid L39. This is effective to drive the eccentric pin 272 upwardly raising the parallel linkage and thereby lifting the conveyor belts 261, 262 and the shelf 247 to a point slightly above the shelf 276 of the cartridge holder 350. With the conveyor belts so positioned and the conveyor transport motor 264 energized, the cartridge is withdrawn from the cartridge holder 350 and transferred to the direct access station.

At the direct access station, the upper corner of the cartridge 308, depicted in FIG. 30, abuts the depending end of the gate 294. The gate 294 pivots rightwardly carrying with it the arm 296 which actuates the switches S12-1 and S14. The actuation of switch S14 interrupts the energization circuit to the bulk and direct access transport motors 264, deenergizing them and bringing to rest the moving conveyor belts 261 and 262. The actuation of the switch S12-1 transfers the contact S12-1 of FIG. 43 from the position shown, allowing the capacitor C13, which is uncharged, to being charging through resistor R19 and positive line P3. When the capacitor C13 charges up to a predetermined level, the unijunction transistor Q5 fires, triggering and firing the rectifier SCR6 which in turn energizes the lift gate solenoid L41. The solenoid L41, when energized, retracts its armature 289 pivoting the lever 290 in a counterclockwise direction which is effective to lift the gate 294 to a point such that its lower end rises upwardly clear of the upper corner 308 of the cartridge. When the gate has been raised, the arm 299 trips the switch S13-1.

At this point, the carriage is still at a position opposite the direct access station. The carriage is maintained in this position by the latched condition relays KXR1 and KYR1-1. These relays, via their transferred contacts KXR1-1 and KYR1-1 couple the resistors RXR1 and RY5 to the differential amplifiers 102A and 162A. This coupling provides voltages on lines 775 and 765 which, when compared to the voltages on lines 774 and 763, produce error signals input to the X and Y servo motors 102 and 162 of a magnitude and polarity such that the X and Y carriage components, once driven to a position opposite the direct access port 54, remains so positioned. In addition, the movable contact of the stepper KSZ1-A is at position 2 and the contact K9-3 is transferred from the position shown, conditioning the relay KZ4, the relay K9 having been energized upon the actuation of the return key 620. Finally, there are X and Y nulls. Consequently, the X and Y null contacts are in the position shown in FIG. 49. Thus, the actuation of the switch S13-1 by the raised gate arm 299 transferring contact S13-1 from the position shown is effective to complete an energization path to the relay KZ4. Contact KZ4-1 transfers, completing an energization circuit to solenoid LZ1 and relays KZ9 and KSZ1, initiating the X–Y null present sequence, which includes engaging the clutch 210, disengaging the Z servo brake 209, enabling the Z servo motor, and cocking the stepper.

The energization of relay KZ4 transfers contact KZ4-4, latching the relay. Also, the contact KZ4-2 transfers which, in combination with previously transferred contact KZ1-3, couples the resistor RZ3 to the input line 783 of the Z differential amplifier 201A. The coupling of resistor RZ3 to the differential amplifier 201A inputs a voltage to the differential amplifier line 783 which, when compared to the voltage input to the differential amplifier on line 782, is effective to generate an error signal. This error signal is input to the Z servo motor 201 and has a magnitude and polarity such that the tang 184 is driven in a direction and for a period sufficient to transfer the cartridge from the direct access port 54 to the carriage.

When the cartridge is on the carriage and a Z null is achieved, the relay KZ8 becomes energized via the Z null contact switch, transferred contact KZ4-3, and transferred switch contact S19. The energization of relay KZ8 transfers contact KZ8-1 from the position shown in FIG. 49, deenergizing the relays KYR1 and KXR1. When relays KYR1 and KXR1 become deenergized, their associated contacts KXR1-1 and KYR1-1 transfer from the position shown in FIGS. 47 and 48, decoupling resistors RXR1 and RY5 from the differential amplifiers 102A and 162A and instead coupling the resistors RX24 and RY6 to the differential amplifiers. The coupling of these resistors RX24 and RY6 to the differential amplifiers 102A and 162A produces voltages which, in combination with the voltages present on lines 774 and 763 cause an error signal to be generated having a magnitude and polarity such that the X and Y servo motors 102 and 162 drive the X and Y carriage components to a position opposite the storage compartment 324 of the rear wall 13.

As the carriage returns from the direct access port 54 to the storage location, the X–Y null is lost, opening the X and Y null contacts of FIG. 49, interrupting the energization path to the relay KZ-4 which, in turn, opens the contact KZ4-1. The transfer of contact KZ4-1 to the open position interrupts the energization path to the solenoid LZ-1 and the relays KZ9 and KSZ1, terminating the X–Y null present sequence, which includes advancing the movable contact of the cocked stepper to position 3, disengaging the Z servo clutch 210, engaging the Z servo brake 209, and disabling the Z servo motor 201.

When the carriage arrives at the storage location an X–Y null is produced, transferring the X and Y null contacts to the position shown in FIG. 49, thereby completing an energization circuit to the relay KZ5. Contact KZ5-1 transfers, energizing the clutch solenoid LZ1 and the relays KZ9 and KSZ1, initiating the X–Y null present sequence which engages the Z servo clutch 210, disengages the Z servo brake 209, enables the Z servo motor 210, and cocks the stepper. Contact KZ5-2 of FIG. 46 transfers from the position shown coupling the resistor RZ6 to the differential amplifier 201A via previously transferred contact KZ1-4. The coupling of RZ6 supplies a voltage to the differential amplifier input line 783 which, when compared with the voltage on line 782 corresponding to the existing position of the tang 184, generates an error signal. This error signal is input to the Z servo motor 201 and has a magnitude and direction such that the tang 184 is caused to move in a direction and for a period sufficient to transfer the cartridge from the carriage to the storage compartment 324 of the rear wall 13.

The energization of relay KZ5 also transfers the contact KZ5-3 from the position shown, allowing the capacitor CZ2 to charge through nontransferred contact KZ6-3, resistor RZ9 and stepper position 3. When the capacitor CZ2 charges to a predetermined level, the unijunction transistor QZ1 fires, triggering the silicon controlled rectifier SCRZ1 which fires, energizing the relay KZ7. The energization of relay KZ7 in turn transfers contact KZ7-1 from the position shown in FIG. 49, interrupting the energization path through transferred contact KZ5-1 to the solenoid LZ1 and the relays KZ9 and KSZ1, terminating the X–Y null present sequence. This is effective among other things, to deenergize the stepper relay KSZ1 advancing the movable contact of the cocked stepper from position 3 to position 4. The movement of the movable contact from position 3 deenergizes the relay KZ5.

With the stepper at position 3, relay KZ6 becomes energized through contact KZ7-1 which has retransferred to the position shown in FIG. 49, inasmuch as relay KZ7 has become deenergized when the movable stepper contact left stepper position 3. Contact KZ6-1 transfers from the position shown, completing an energization circuit to the solenoid LZ1 and the relays KZ9 and KSZ1 via S18, the X and Y null contacts, nontransferred contact KZ7-1, initiating the X–Y null present sequence. This engages the Z servo motor clutch 210, disengages the Z servo brake 209, enables the Z servo motor 201, and cocks the stepper for movement from position 4 to position 5.

In addition, contact KZ6-2 associated with the Z servo potentiometer 757 transfers from the position shown, coupling the resistor RZ5 to the differential amplifier 201A via nontransferred reset contact K8-3. The coupling of resistor RZ5 provides an input voltage on differential amplifier input line 783 which, when compared with the voltage on line 782 corresponding to the present position of the tang 184, generates an error signal. This error signal is input to the Z servo motor 210 and has a magnitude and polarity such that the tang 184 is reset to the home position depicted in FIG. 19.

The transfer of contact KZ6-3 from the position shown in FIG. 49 completes a charging circuit for the capacitor CZ2 via resistor RZ9 and stepper position 4. When the capacitor CZ2 charges to a predetermined level, the unijunction transistor QZ1 again fires, again triggering silicon controlled rectifier SCRZ1, which, in turn, again energizes the relay KZ7. Contact KZ7-1 transfers from the position shown interrupting the energization circuit through relay contact KZ6-1 to the solenoid LZ1, and the relays KZ9 and KSZ1, terminating the X–Y null present sequence. The stepper now advances to position 5. The movement of the stepper from position 4 interrupts the energization circuit for relays KZ6 and KZ7, deenergizing these two relays.

During the time that relays KZ6 and KZ7 are both energized, which occurs during the finite amount of time that it takes relay KZ6 to become deenergized as a consequence of contact KZ7-1 transferring to interrupt the energization circuit for stepper relay KSZ1 and thereby advance the stepper from position 4 to position 5, both relay contacts KZ7-2 and KZ6-4 of FIG. 43 are transferred from the position shown, interrupting the connection between positive line P1 and positive line P2. The interruption of lines P1 and P2 causes an interruption of power on lines P3 and P6 input to the keyboard of FIGS. 44 and 45. These interruptions are effective to reset all the relays and SCRs of the sequencer 631 and the digit memory 630. The resetting of all of the storage elements of the digit memory 630 in turn, is effective to deenergize all the relays of FIG. 48. The interruption of the power on line P2 is also effective to deenergize the various relays and solenoids of the direct and bulk access station control circuits of FIGS. 41, 42 and 43. Thus, the keyboard and the various control circuits are now fully reset and ready for a subsequent retrieval cycle.

Manual Card Removal

During the course of the card retrieval cycle described above, should it be desired to manually remove the card from the platen for modification or updating of the information thereon the platen gate 26 is opened by moving the finger tab 501 to the right, as viewed in FIG. 32. This swings the card stop 486 rightwardly clear of the upper edge 27 of the card 50 positioned in the slot 489 formed by the platen plates 470 and 471. The movement of the card stop 486 clear of the card 50 allows the card stop 486 to pivot downwardly, transferring the platen limit switch S20 to the position shown in FIG. 43. The transfer of switch contact S20 to the open position interrupts the energization path for the platen clamp solenoid L45 allowing the solenoid armature 495, depicted in FIG. 39, to extend. This permits the arm 493 to move away from the plate 471 carrying with it the frame 490 and the glass insert 481, effectively unclamping the card between the plates 480 and 481. With the platen unclamped, the switch S24 is tripped, closing contact S24 of FIG. 41, thereby enabling the drive roll motor 475. In addition, the transfer of switch contact S20 to the open position interrupts the energization circuit for the relay K13 which, among other things, transfers contact K13-4 to the position shown in FIG. 41 extinguishing the illuminating lamp 487.

The movement of the finger tab 501 rightwardly pivoting the member 497A about pin 498A triggers the switch S22 transferring it from the position shown in FIG. 43, thereby completing an energization circuit to the relay K10. The contact K10-1 closes, energizing the enabled up drive roll motor 475 via nontransferred contact K14-2, relay K14 being deenergized inasmuch as the return key contact 620-1 has not transferred and pulsed the transistor Q6.

With the platen clamp solenoid L45 deenergized and the up drive roll motor 475 energized, the card is expelled from the platen.

In the course of expelling the card from the platen, the card passes above the upper drive and pressure rolls 470H and 471H, transferring the switch S7 to the position shown, thereby deenergizing the relay K3. The deenergization of relay K3 transfers contact K3-1 completing an energization path to the scan motor 333 via nontransferred contacts K2-1, K3-1, K13-2, K14-1, and K6-2. Contact K2-1 is nontransferred since there is no card between the lower drive and pressure rolls 470L and 471L effective to transfer the switch S6 from the position shown to energize the relay K2. Contact K13-2 is nontransferred since the relay K13 has been deenergized by the opening of the platen limit switch S20 when the card stop 486 is moved clear of the card in the course of opening the platen gate 26. Contact K14-1 is closed since the relay K14 is deenergized, the return contact 620-1 not having been transferred by depression of the return key 620. The contact K6-2 is transferred since the relay K6 is energized when the timing cam 318 moves from position 1, the timing cam presently being in position 5 to which it was driven subsequent to the card selection operation.

With the scan motor 333 energized, the timing cam 318 moves from position 5, transferring switch contact S5 to the position shown in FIG. 43, thereby interrupting the energization circuit to the relay K7, causing it to become deenergized. Contact K7-1 then transfers to the position shown in FIG. 41 providing an alternative energization path for the scan motor 333. Contact K7-4 transfers to the position shown in FIG. 43 energizing the compression finger solenoid L36 which is effective to move the compression fingers 430 and 431 to their outer positions shown in FIG. 38.

Continued movement of the shaft 325 of FIG. 32 in response to continued energization of the scan motor 333 moves the timing cam 318 to a position such that switch S1 is transferred to the position shown in FIG. 42. This interrupts the energization path for the relay K6, deenergizing this relay. Contact K6-2 then transfers to the position shown in FIG. 41, interrupting the energization path to the scan motor 333, causing the scan motor to come to rest at position 1.

The up drive roll motor 475 continues to remain energized as long as the return key 620 is not actuated or the platen gate 26 is open. With the platen gate 26 open, switch S22 closes and remains closed energizing relay K10. With relay K10 energized, contact K10-1 is in the transferred position completing a portion of the energization circuit to the up drive roll motor 475. With the return key 620 not yet depressed and the contact 620-1 not yet transferred, the transistor Q6 is not pulsed and thereby relay K14 is not energized. Hence, contact K14-2 is in the position shown in FIG. 41, thereby completing the other portion of the energization circuit to the up drive roll motor 475.

In addition, the conveyor belts 261 and 262 are not moving since the relay K9 is not energized, the return key 620 not having been actuated, and the contact K9-2 not transferred to the position shown in FIG. 41. Contact K9-5 is also not transferred and the cartridge clamp solenoid L38 and spider solenoid L37 are still deenergized, causing the cartridge to be clamped and the spider fingers 413 to be engaged with the cartridge, respectively. The conveyor is not raised due to the presence of contact K9-1 in the position shown. To stop the up drive roll motor while the card removed from the platen is examined, the platen gate 26 is closed by returning the finger tab 501 to its normal position, as viewed in FIG. 32, opening the switch S22 and thereby deenergizing the relay K10 which transfers contact K10-1 to the position shown, interrupting the energization circuit via nontransferred contact K14-2 to the up drive roll motor 475.

Should it be desired to return the card to the cartridge, the platen gate 26 is opened, closing switch S22, which energizes relay K10. Relay K10 when energized transfers contacts K10-1 and K10-2 to condition the drive roll motor 475. Switch S23 also closes and energizes relay K3, transferring contact K3-1 which disables an energization path for the scan motor 333. The infile key 625 is depressed momentarily transferring contact 625-1. This completes the energization circuit from line P40 to the relay K6 energizing relay K6. Contact K6-2 transfers from the position shown in FIG. 41 completing an energization circuit to the scan motor 333. The scan motor 333 moves the timing cam off position 1, causing cam switch S1 to transfer and latch relay K6.

The continued energization of relay K6 maintains contact K6-2 transferred from the position shown in FIG. 41, maintaining the scan motor 333 energized. The continued energization of the scan motor 333 drives the shaft 325, moving the timing cam 318 to position 2. At position 2, the contact S2 transfers from the position shown in FIG. 42. However, the transfer of contact S2 is ineffective to fire the silicon controlled rectifier SCR-2 inasmuch as relay contact K1-1 is in the position shown in FIG. 42, the relay K1 not having been energized by the depression of the search key 617. Relay K1 was deenergized during the previous timing cam cycle upon the transfer of the contact K3-3. Since SCR-2 does not fire, the oscillator does not become operative and the blower motor 334 does not become energized.

The movement of the plate 351 from the position shown in FIG. 33 through a distance X1 is ineffective to move the sorting rods 370 into the cartridge inasmuch as the switch S10 during the previous retrieval cycle has reset all of the finger solenoids L1-L35. The continued energization of relay K6 continues driving the scan motor 333 via transferred contact K6-2, in turn rotating the shaft 325 to position the timing cam at position 3, transferring the contact S3. The transfer of contact S3 is ineffective to terminate operation of the blower motor 334 inasmuch as the blower motor had not previously been operated by cam switch S2.

The motor 333 continues to be energized by transferred contact K6-2 moving the timing cam to position 4 where cam switch S4 transfers. The transfer of cam switch S4 pulses the silicon controlled rectifier SCR-4 which fires, energizing the compression finger solenoid L36 which in turn moves the compression fingers 430 and 431 to their inner positions.

The scan motor 333 continues driving the shaft 325 moving the timing cam to position 5. In the course of moving from position 4 to position 5, the shaft 325 also drives the plate 351 to the right as viewed in FIG. 32, compressing, in cooperation with the inwardly positioned compression fingers 430 and 431, the cards located in the cartridge.

At position 5, switch S5 transfers from the position shown in FIG. 43, energizing the relay K7. Since contact K3-1 is open, when contact K7-1 transfers from the position shown in FIG. 41, the energization path to the scan motor 333 is interrupted, stopping the scan motor at position 5.

At this point, the cards in the cartridge are compressed and a removed or substitute card may be returned to the cartridge. To effect return of the card to the cartridge, the platen gate 26 is open, transferring platen gate switch S22 from the position shown in FIG. 43, coupling the positive line P2 to the positive side of relay K14 enabling this relay. It is now necessary to depress the return key 620 and thereby transfer contact 620-1. This completes the circuit to the base of transistor Q6, pulsing transistor Q6 and completing an energization path through the relay K14. Relay K14 latches via contact K14-3. Contact K14-2 completes an energization path to the down drive roll motor 475 via transferred contact K7-3. Relay K7 is energized when the timing cam is at position 5.

Upon insertion of the card into the platen, the card enters the upper drive and pressure rolls 470H and 471H. The platen gate switch S23 is transferred from the position shown, energizing the relay K3. Contact K3-2 transfers and maintains relay K14 energized. Contact K14-1 transfers disabling the scan motor 333. As the card continues moving downwardly it enters the lower drive and pressure rolls 470L and 471L, transferring switch S6 from the position shown in FIG. 43 and energizing relay K2. Contact K2-2 closes to maintain energization of relay K14. Contact K2-1 opens to continue disabling scan motor 333. When the card passes below the upper drive and pressure rolls 470H and 471H, switch contact S7 opens, but is ineffective to deenergize relay K3 since relay K3 is held energized by transferred gate switch S23. When the card passes below the lower drive and pressure rolls 470L and 471L, switch contact S6 transfers to the position shown in FIG. 43, deenergizing relay K2 which contact K2-1 to the position shown in FIG. 41 completing a portion of the energization circuit for the scan motor 333. It is now necessary to close the platen gate, opening switch contacts S22 and S23 and deenergizing relays K14 and K3. Contact K14-2 stops the drive roll motor 475. Contact K14-1 transfers, completing the energization circuit to the scan motor 333 via nontransferred contacts K2-1, K3-1, K13-2, K14-1, and K6-2.

At this point, the card is in the cartridge, the down drive roll motor 475 is deenergized, and the scan motor 333 is energized. The energization of the scan motor moves the shaft 325, driving the timing cam 318 from position 5 toward position 1. From this point on the return of the cartridge to the storage compartment 324 in the rear wall 13 is effected in the same manner as described in the previous discussion of the operation of the system in which the card is not removed from the platen but merely viewed via the screen 25 without being removed from the platen.

Should it be desired to return the cartridge to its storage compartment after having removed the selected card from the platen without returning the card to the cartridge, it is only necessary to close the platen gate 26 and hit the return key 620. When the platen gate 26 is closed, the timing cam 318 moves from position 5 to position 1. Relay K9 unclamps the cartridge, removes the spider fingers, and starts the conveyor. Switch S1 unlatches relay K6, energizing the transport solenoid L39 to raise the conveyor and move the cartridge to the direct access station where it is picked up by the carriage in the usual manner for return to its storage compartment.

Card Missing Mode of Operation

Should a six digit card address be entered into the keyboard and, upon the depression of the search key 617, the selection operation fail to retrieve the desired card from the cartridge and deliver it to the platen assembly 319, the relay K5 becomes energized and the contact K5-2 transfers from the position shown in FIG. 41. The closing of contact K5-2 bypasses contact K7-1, energizing the scan motor 333, notwithstanding the transfer of the contact K7-1 which occurs when the scan motor drives the timing cam 318 to position number 5. Consequently, upon arrival of the timing cam at position 5, the scan motor 333 is not deenergized, thereby stopping at position number 5, as in the normal mode of operation should the desired card be selected and transferred to the platen, but rather contact K5-2 provides an energization path for the scan motor 333 allowing the scan motor to continue moving to position number 1 without stopping.

At position number 1, the switch S1 transfers to the position shown, deenergizing relay K6 which in turn transfers contact K6-2 to the position shown in FIG. 41, deenergizing the scan motor 333, causing it to come to rest at switch position number 1. At this time, the up drive roll motor 475 is also deenergized, the contact K1-2 having transferred to the position shown when the cam switch S3 transfers, deenergizing relay K1. In addition to the energization of relay K5 in response to a missing card condition which permits the scan motor to drive the timing cam 318 to position number 1, the card missing lamp becomes illuminated providing a visual indication on the keyboard that the card is missing from the cartridge.

A second scanning of the cartridge in an effort to select the desired card may be initiated, if desired, by depressing the card missing key 628, momentarily transferring contact 628-2 of FIG. 43. This momentarily interrupts the connection of positive potential to line P6, deenergizing the storage elements 687 and 696, and thereby erasing the last two digits of the six digit address, that is, the two digits identifying the particular card desired within the selected cartridge. The interruption of the positive line P6, also deenergizes relays KA5 and KA6. Contact KA6-4 transfers enabling relays KA7 and KA8. Contacts KA4-2 and KA5-2 transfer to permit, upon the depression of the desired digit key identifying the card of the selected cartridge, storage of the card address in the last two digit positions of the digit memory 630. The energization of relays KA5 and KA6 also transfers contacts KA6-1 and KA6-2 of FIG. 42. The digit keys 607 and 606 are now momentarily successively depressed storing the digits 7 and 6 in storage elements 687 and 696, respectively, in the manner described previously in connection with the previous entry into the keyboard of the last two digits of the card address.

The depression of the card missing key 628, in addition to the erasing of the last two digits from the memory, is also effective to transfer contact 628-1, deenergizing relay K5 and extinguishing the card missing lamp. Contact K5-2 transfers to the position shown, eliminating the contact K7-1 bypass set up during the previous cycle when the card was initially found to be missing.

The search key 617 is now depressed to initiate the second scanning operation in an effort once again to select the desired card. In response to depressing search key 617 the system operates in the same manner as described previously with respect to initiating the search. Should the desired card still fail to be selected from the cartridge, the relay K5 becomes energized and the card missing lamp again becomes illuminated.

The cartridge can be returned to the carriage for retransfer to the storage compartment should the second scan fail to uncover the card, by depressing the return key 620. This energizes the relay K9 to start the conveyor motor, unclamp the cartridge, and remove the spider fingers in a manner described previously. The conveyor is already in the raised position since the relay K6 is deenergized as a consequence of the contact K5-2 completing an energization path to the scan motor 333 when the second scan cycle fails to retrieve the card causing the scan motor to drive the timing cam to position 1. Thus, when the return key 620 is depressed, energizing relay K9 to start the conveyor motor 264, unclamp the cartridge, and remove the spider fingers 413, the conveyor, already being in the raised position, immediately transfers the cartridge from the cartridge holder 350 of the direct access station to the direct access port 54 where it is transferred The Browse Mode of Operation Should it be desired to operate the system in the browse mode, the browse key 622 is depressed. This key is bistable and consequently remains depressed. When initially depressed, the key contact 622-2 transfers completing a circuit to the browse lamp illuminating this lamp and providing a visual indication on the keyboard that the system is being operated in a browse mode. The transfer of contact 622-2 also disables the relay K9. With relay K9 disabled when the return switch contact 620-1 is transferred in response to momentary actuation of the return key 620, the relay K9 cannot become energized. As a consequence, the contact K9-5 remains open and the spider solenoid L37 deenergized, leaving the spider fingers 413 engaged with the cartridge and the cartridge clamped in the direct access station. In addition, the failure of relay K9 to become energized upon depression of the return key 620, prevents contact K9-2 of FIG. 41 from transferring and starting the bulk and direct access transport motors 264A and 264.

Assuming that a six digit address has been entered into the keyboard 23 in the usual manner, resulting in the storage of the six digit address, the search key 617 is depressed, causing the scanning operation to be initiated and the desired card to be selected and transported to the platen. Once in the platen the card can be removed from the platen and the cartridge returned toits storage compartment in the manner described previously. Likewise, the selected card may be returned to the cartridge by depression of the return key 620.

However, in the browse mode, unlike when the system is not operated in the browse mode, depression of the return key 620 is not effective to return the cartridge to the carriage for subsequent transfer to its storage compartment. In the browse mode of operation, depression of the return key 620 is only effective to return the card to the cartridge. Return of the card to the cartridge is effected in the same manner in the browse mode of operation as it is in the normal mode of operation. However, since the relay K9 is locked out, the depression of the return key 620, which transfers contact 620-1, is ineffective to start the transport motor 264 and energize the spider finger and clamp solenoids L37 and L38 to thereby release the cartridge. Consequently, when the return key 626 is depressed, the card returns to the cartridge, but the cartridge fails to be transferred to the direct access port and then to the storage compartment.

Except for the dissimilarities between the browse mode of operation and the nonbrowse mode described immediately above, the system operates in the same manner in the browse mode when the return key 620 is depressed as it does in the nonbrowse mode, that is, the scan motor 333 is driven to the point where the timing cam 318 arrives at position 1, deenergizing the scan motor.

The momentary depression of the return key 620 to return the card to the cartridge is also effective to transfer contact 620-2, momentarily interrupting the circuit between line P6 of the keyboard and line P4. This momentary interruption of the potential on line P6 erases the last two digits of the card address stored in the digit memory 630. With the last two digits of the keyboard memory 630 erased, it is now possible to enter into the keyboard two additional digits for storage. Having entered the two digits corresponding to the desired card in the cartridge which is to be selected, the search key 617 is depressed to initiate the scanning and selection cycle in the same manner as described previously in this section of the operational description. Thus, the system goes through a scanning operation transmitting the desired card to the platen.

Should it be desired to return a card to the cartridge, the return button 620 is again depressed and the card returned to the cartridge. As before, the last two digits of the address are erased from the keyboard memory 630. The selection of another card from the cartridge may be initiated in the same manner by entering the two digits corresponding thereto, and depressing the search key 617.

Should it be desired to return the cartridge to its storage compartment, the browse key 622 is depressed returning it to its normally off condition. This enables relay K9 such that when the return key 620 is subsequently depressed, the relay K9 becomes energized, permitting the cartridge to be unclamped, the spider fingers 413 removed, and the transport motor 264 energized for returning the cartridge to its storage location in the same manner as described previously with respect to the other modes of operation.

Bulk Access Mode of Operation

In the bulk access mode of operation, the bulk access key 618 is depressed, transferring contact 618-2 from the position shown in fig. 42, enabling the relay K0. The bulk access key 618 is a bistable key and once depressed remains in the depressed state until released by subsequently depressing the key. With the relay K0 enabled, the relay K0 becomes energized upon the transfer of contact KA4-1 upon entering the fourth digit into the keyboard, energizing relay KA4 and transferring contact KA4-1. The energization of relay K0 completes a circuit to the transport motors 264 and 264A via contact K0-4, driving the conveyors of the direct and bulk access transports in a direction such as to convey cartridges from the access port to the access station.

Depression of the bulk access key 618 also transfers contact 618-2, energizing relay K11. Contact K11-2 transfers, conditioning the bulk access motor 264A. Contacts K11-4 and K11-3 transfer completing circuits from the resistor RXR2 to the differential amplifier 102A and from the resistor RY8 to the differential amplifier, thereby setting up the X and Y servo motors 102 and 162 for moving the carriage to the bulk access port when the cartridge has been transferred from the storage wall to the carriage.

The energization of relay K0, in addition, transfers contact K0-1 of the Z programmer, causing the Z servo motor to operate in the manner described previously, transferring the cartridge from the storage location onto the carriage and subsequently causing the carriage to move to a position opposite the bulk access station where the cartridge is transferred to the bulk access port 53 for subsequent transfer to the bulk access station 28 by the bulk access transport. When the cartridge arrives in the bulk access station 28 the switch S18 transfers from the position shown in FIG. 42 deenergizing the relay K0. Contact K0-3 transfers to the position shown in FIG. 41 deenergizing the transport motor 264.

The arrival of the cartridge in the bulk access station is also effective to transfer contact S17 of FIG. 43 from the position shown, completing an energization circuit to the solenoids L43, which effectively clamps the cartridge in the bulk access station. When the cartridge is properly clamped, the switch S16 transfers from the position shown in FIG. 43, completing an energization circuit to the card lift or ram solenoid L42 raising the cards out of the cartridge for manual removal.

When it is desired to return the cards to the cartridge and thereafter to return the cartridge to the appropriate storage compartment, the return key 620 is depressed. The momentary transfer of contact 620-1 energizes the relay K9 which latches. Contact K9-1 transfers, deenergizing the ram solenoid L42 lowering the ram. When the ram is lowered, the switch S17 is transferred to the position shown in FIG. 43 unclamping the cartridge. The cartridge is now transported from the bulk access station 28 to the bulk access port 53 by the energized conveyor, the conveyor having been energized when the contact K9-2 transferred to the position shown in FIG. 41 as a consequence of energizing the relay K9 in response to momentarily depressing the return key 620.

The cartridge upon arrival at the bulk access port cooperates with a gate of the type shown in FIGS. 30 and 31. The bulk access gate contains the switch S15 depicted in FIG. 41 which is equivalent to the switch S14 of the direct access gate and when transferred from the position shown in FIG. 41 deenergizes the transport motor 264A. The bulk access station also includes a switch S12-2 (not shown) which functions in the same manner as the switch S12-1, to start a timer, which, after a suitable delay, energizes a solenoid (not shown) to raise the gate. The bulk access gate further includes a switch S13-2 which functions in the same manner as switch S13-1 to effect extraction of the cartridge from the bulk access port for subsequent transfer to the carriage and then to its storage compartment.

Thus, a system has been described in which one of 100 cards randomly stored in one of 1,000 cartridges may be selected by merely entering into a keyboard the six digit address corresponding to the identification of the particular card desired. Once the selected card is positioned in the platen it is possible to view the card on television screen or remove the card for inspection updating, destruction, substitution, or the like. Should the card be removed it is possible to return the cartridge to its storage location, or return the removed card to the cartridge and thereafter return the card and cartridge to its storage location, or return a new card to the cartridge and thereafter return the new card and cartridge to its storage location.

Alternatively, after a six digit address is entered into the keyboard and the selected cartridge transmitted to the direct access station where the desired card is selected, it is possible to thereafter enter successive pairs of card-identifying digits for successively viewing or extracting cards. The selected cards may be returned to the cartridge which, when desired, may itself be returned to its storage compartment.

Alternatively, a four digit address may be entered into the keyboard identifying a particular one of 2,000 cartridges, and the selected cartridge then transported to the bulk access station where the entire contents of the cartridge are accessible for extraction and review. The extracted cards may be returned to the cartridge, substitute cards may be returned to the cartridge, or the cartridge may be left partially or completely empty and returned to its storage compartment.

Various other modifications of the preferred embodiment of the invention disclosed herein may be made without departing from the spirit and scope of the invention. For example, it is contemplated that additional bulk and/or direct access stations may be utilized in conjunction with one or both of the storage walls instead of the single bulk and direct access stations disclosed herein.

Additionally, it is contemplated that the television screen and keyboard may be located remotely from the storage unit. For example, in bank applications where the aperture cards contain microfilmed facsimiles of depositors' signatures, the storage unit may be located in the basement of the bank building and the keyboard and viewing screen in the cashier's office. Thus, by entering the depositor's account number into the system, the cashier can in a matter of seconds verify a customers signature. If desired, additional keyboards and viewing screens may be placed in every teller's cage. In this manner, each teller can, using the same stored signature data contained in the same storage unit, verify signatures without leaving his window. It is also contemplated that the television screen may be omitted altogether and the card merely be presented to the operator for manual retrieval.

It is also conceived to be within the scope of this invention to utilize, instead of the television camera for viewing the selected card, other utilization devices for performing different functions. For example, each selected card may be transmitted to card duplication means where copies of the selected card are made using conventional card-to-card or card-to-roll film copiers, or the like. Thus, copies of stored date are made without the card being removed from the system. In addition, the card may be transported to a card reader, such as a character recognition device, where the card is read and the data processed in any suitable fashion. The selected card may also be sent to an information writing device which modifies, updates or enters additional information on the selected card.

It is further considered to be within the scope of this invention to store cards other than aperture cards. For example, punch or tabulating cards may be used as well as cards having magnetizable information-bearing strips, spots, or the like formed thereon. Also, documents other than cards may be stored as, for example, ledger sheets, photographs, maps, drawings, etc. Still further, it should be understood that the retrieval techniques and inventive principles herein described with respect to a cartridge of microfilm operation cards are also applicable, among other things to (1) cartridges containing roll microfilm, (2) cartridges containing roll magnetic tape of the multiple track type, (3) cartridges containing magnetic cards (multitrack like magnetic tape only in card form), or (4) cards or tape rolls containing a combination of optical and magnetic information. Obviously the output station would be of different construction than that shown in the present embodiment in order to perform the new retrieval function when the cartridge was registered in the output position. Also, it is contemplated that different card and cartridge addressing schemes may be used. Instead of a digital addressing scheme based on the decimal system, binary may be used or a combination of binary and decimal. For example, the cartridges may be identified by decimal numbers and the cards by binary numbers. Further, it is contemplated that various types of keyboard coding devices may be used to permit, for example, entry of a person's name to initiate retrieval of a card having a digital address. Finally, selection of a desired card from a cartridge may be accomplished using sorting systems other than the McBee edge-notch system described. In fact, any of the conventional card selection methods may be adapted for use with the retrieval system of this invention.

I claim:

1. A document retrieval system comprising:

a stationary rack having a plurality of immovable storage compartments each identified by an address, said rack being substantially planar and having a front and a rear, said rack further having a centrally located delivery port communicating with said front and rear of said rack, a plurality of movable document-containing cartridges normally positioned in different ones of said addressable storage compartments, a cartridge receiving station located adjacent said rear of said rack in communication with said delivery port and including means for removing at least one document from a cartridge positioned thereat, cartridge transporting means, including a carriage selectively movable relative to said front of said stationary rack to selected different ones of said storage compartments, responsive to command signals for selectively transporting cartridges on said carriage between one of said addressable storage compartments and said delivery port whereat a cartridge can be inserted through said delivery port for transport between said carriage and said receiving station, thereby reducing the mean travel path between said storage compartments and said receiving station, and control means for generating said command signals to cause said carriage assembly to transfer a selected cartridge between said cartridge receiving station and one of said storage compartments via said delivery port.

2. The system of claim 1 wherein the documents of a cartridge are randomly stored to permit rapid and error-free infiling of documents into their respective cartridges and uniquely coded with a document address to be distinguishable one from another within a given cartridge and wherein said cartridge receiving station includes a selectively operable mechanized individual document selector for automatically retrieving an addressed card from a deck of documents randomly stored in a cartridge positioned at said cartridge receiving station.

3. The system of claim 2 wherein said second cartridge receiving station further includes a selectively operable bulk document selector for bulk retrieval of documents stored in a cartridge positioned at said second cartridge receiving station.

4. A document retrieval system comprising:

a rack having a plurality of storage compartments each identified by an address, a plurality of document-containing cartridges normally positioned in different ones of said addressable storage compartments, each of said cartridges including one of a detent lug and locating slot engageable with said lug, each of said compartments having a. a cartridge stop engageable with said cartridge and b. the other of said detent lug and locating slot engageable with said lug, said cartridge stop upon insertion of said cartridge into said storage compartment applying a force to said cartridge for seating said detent lug in said locating slot and thereby properly registering said inserted cartridge in said storage compartment, a cartridge receiving station including means for removing at least one document from a cartridge positioned thereat, cartridge transporting means, including a carriage, responsive to command signals for selectively transporting cartridges between said cartridge receiving station and one of said addressable storage compartments, and control means for generating said command signals to cause said carriage assembly to transfer a selected cartridge between said cartridge receiving station and one of said storage compartments.

5. The system of claim 4 wherein said carriage assembly includes a pivotally mounted cartridge-engaging element operative when pivoted in one direction to engage a cartridge properly registered in a storage compartment for simultaneously disengaging said lug and slot and withdrawing said cartridge from said compartment, and when pivoted in the other direction is operative to insert into a compartment a cartridge with which it is engaged.

6. The system of claim 5 wherein said cartridge-engaging element is a tang having its inner end mounted on an endless loop trained over spaced wheels and its free end engageable with a recess formed in said cartridge for transferring cartridges to and from said carriage from and to said storage compartment, respectively, when said loop is driven in said one and other directions, respectively.

7. The system of claim 6 wherein said carriage assembly further includes a cartridge pusher pivotally mounted on said loop for further inserting into said storage compartment a cartridge preliminarily inserted therein by said tang, thereby causing said cartridge stop to abut said cartridge and apply a force thereto for seating said lug in said locating slot.

8. The system of claim 7 wherein said detent lug depends from said cartridge and said locating slot is formed in said compartment.

9. In a carriage system having an X carriage component movable in an X direction relative to a grid and a Y carriage component mounted on said X carriage component for movement in a Y direction relative to said grid, an actuator for moving independently of the movement of said X and Y carriage components, a member movably mounted on said Y carriage component, said actuator comprising:

an effectively endless cable having a first X-directed reach trained over rotatable wheels fixed to opposite corners of one side of said grid, second and third X-directed reaches, each having one of their ends connected, respectively, to opposite ends of said first reach and each having their other ends trained, respectively, over different rotatable wheels fixed to said X carriage component at the end adjacent said one grid side, and fourth and fifth Y-directed reaches, each having one of their ends connected, respectively, to different ones of said other ends of said second and third reaches and their other ends connected to each other and trained over a rotatable wheel fixed to the opposite end of said X carriage component, a selectively operable drive member fixed to said grid and engaged with one of said first, second or third reaches for driving said cable, and a driven member rotatably mounted on said Y carriage component and engaged with one of said fourth and fifth reaches for actuating said movable member in response to rotation of said driven member by said one reach engaged therewith.

10. In a carriage having an X carriage component movable in an X direction relative to a rack of storage compartments and a Y carriage component mounted on said X carriage component for movement in a Y direction relative to said rack, a Z carriage component for transferring cartridges between said carriage and said rack, said Z carriage component comprising:

a cartridge-engaging element mounted on said Y carriage component for pivotal motion in a plane perpendicular to said rack, said element being operative when pivoted in one direction to engage a cartridge is one of said storage compartments for simultaneously disengaging a depending cartridge lug seated in a cartridge locating slot formed in said compartment bottom and withdrawing said cartridge from said compartment, and being operative when pivoted in the other direction to insert into a compartment a cartridge with which it is engaged, seating said lug in said slot, an effectively endless cable having a first X-directed reach trained over rotatable wheels fixed to opposite corners of one side of said rack, second and third X-directed reaches each having one of their ends connected, respectively, to opposite ends of said first reach and each having their other ends trained, respectively, over different rotatable wheels fixed to said X carriage component at the end adjacent said one rack side, and fourth and fifth Y-directed reaches, each having one of their ends connected, respectively, to different ones of said other ends of said second and third reaches and their other ends connected to each other and trained over a rotatable wheel fixed to the opposite end of said X carriage component, a selectively operable drive member fixed to said rack and engaged with one of said first, second and third reaches for driving said cable, and a driven member rotatably mounted on said Y carriage component for pivoting said cartridge engaging element in said one and other directions to transfer cartridges between said storage compartment and said carriage in response to rotation of said drive member.

11. The carriage of claim 10 wherein said driven member is one of a pair of wheels rotatably mounted on said Y carriage component and wherein said cartridge-engaging element is a tang having its inner end mounted on an endless loop trained over said spaced wheels, and its free end engageable with a downwardly extending recess formed in said cartridge for transferring cartridges to and from said carriage when said loop is rotated by said driven member in said one and other directions, respectively.

12. A retrieval system comprising:

a rack having a plurality of storage compartments, each identified by an address, and having a delivery port with opposite ends communicating with opposite sides of said rack, a plurality of cartridges normally positioned in different ones of said addressable storage compartments, each of said cartridges including one of a detent lug and locating slot engageable with said lug, and each of said compartments including a cartridge stop engageable with said cartridge and the other of said detent lug and locating slot, said cartridge stop upon insertion of said cartridge into said storage compartment applying a force to said cartridge for seating said detent lug in said locating slot and thereby properly registering said inserted cartridge in said storage compartment, a cartridge receiving station communicating with one of said opposite ends of said delivery port, a cartridge transporting means, including a carriage movable to the other of said opposite ends of said delivery port, responsive to command signals for selectively transporting cartridges via said delivery port between said cartridge receiving station and one of said addressable storage compartments, and control means for generating said command signals to cause said carriage assembly to transfer a selected cartridge between said cartridge receiving station and one of said storage compartments.

13. The system of claim 12 wherein said cartridge stop includes an elongated rod member having each of its ends engageable with opposite walls of storage compartment and having a central flexible portion for allowing said ends to be moved toward each other, permitting said stop to be readily inserted and removed from its proper position spanning the said walls of a storage compartment.

14. The system of claim 12 wherein said carriage includes a pivotally mounted cartridge-engaging element operative when pivoted in one direction to engage a cartridge properly registered in a storage compartment for simultaneously disengaging said lug and slot and withdrawing said cartridge from said compartment, and when pivoted in the other direction operative to insert into a compartment a cartridge with which it is engaged.

15. The system of claim 14 wherein said cartridge-engaging element is a tang having its inner end mounted on an endless loop trained over spaced wheels rotatably mounted on said carriage, and its free end engageable with a recess formed in said cartridge for transferring cartridges to and from said carriage from and to said storage compartments, respectively, when said loop is driven in said one and other directions, respectively.

16. The system of claim 15 wherein said carriage further includes a cartridge pusher pivotally mounted on said loop for further inserting into said storage compartment a cartridge preliminarily inserted therein by said tang, thereby causing said cartridge stop to abut said cartridge and apply a force thereto for seating said lug in said locating slot.

17. A carriage for selectively transferring cartridges between two points of an X–Y matrix, said carriage comprising:

an X carriage component movable in the X direction, a Y carriage component slidably mounted on said X carriage component for relative movement in the Y direction, a cartridge engaging element mounted on said Y carriage component for pivotal motion in a plane perpendicular to said X–Y matrix, and cable drive means coupling stationary motors to said carriage components for selectively moving said X and Y carriage components to position said cartridge engaging element opposite a cartridge and for pivoting said cartridge engaging element in first and second directions to transfer cartridges to and from said matrix, respectively.

18. A method of retrieving a predetermined document from a plurality of documents comprising:

randomly storing groups of documents in each of a plurality of cartridges, storing each of said cartridges in different ones of a plurality of addressable storage compartments, moving a cartridge transporting device, in response to a compartment address, to the particular compartment in which is stored the cartridge containing said predetermined document, transporting said predetermined document-containing cartridge from said particular compartment to a document selecting station, physically restraining all of the documents within said transported cartridge except said predetermined card against movement, and sequentially directing a gaseous stream against said documents in said transported cartridge for moving said predetermined card relative to said physically restrained documents.

19. A method for properly positioning a cartridge having a depending lug formed on the front of the bottom surface thereof in a compartment having a cartridge abutment in the upper rear thereof and a lug-engaging slot formed in the front of the cartridge supporting surface thereof, said method comprising:

initially positioning the rear of said cartridge bottom surface on said front of said cartridge supporting surface of said compartment, and driving said cartridge into said compartment with a force sufficient to cause the rear wall member of said cartridge to strike said abutment subsequent to the termination of the driving force whereby a force is applied to said cartridge urging said front of said cartridge downwardly to seat said lug in said slot and thereby properly position said cartridge in said compartment.

20. The document retrieval system as set forth in claim 1 further including a second delivery port communicating with said front and rear of said rack and a second cartridge receiving station located adjacent said rear of said rack in communication with said second delivery port and including means for removing at least one document from a cartridge positioned thereat and wherein said cartridge transporting means includes only one carriage, said carriage being responsive to command signals for selectively transporting cartridges on said carriage between one of said addressable storage compartments and either of said delivery ports whereat a cartridge can be inserted through the delivery port for transport between said carriage and the cartridge receiving station associated with the delivery port, thereby further reducing the mean travel path between said storage compartments and said receiving stations.